US011920743B2

(12) United States Patent
Wang et al.

(10) Patent No.: US 11,920,743 B2
(45) Date of Patent: Mar. 5, 2024

(54) LED TUBE LAMP

(71) Applicant: JIAXING SUPER LIGHTING ELECTRIC APPLIANCE CO., LTD, Jiaxing (CN)

(72) Inventors: Guang-Dong Wang, Jiaxing (CN); Ji-Feng Xu, Jiaxing (CN); Ming-Bin Wang, Jiaxing (CN); Zi-Xiang Zou, Jiaxing (CN); Dong-Mei Zhang, Jiaxing (CN)

(73) Assignee: JIAXING SUPER LIGHTING ELECTRIC APPLIANCE CO., LTD, Jiaxing (CN)

( * ) Notice: Subject to any disclaimer, the term of this patent is extended or adjusted under 35 U.S.C. 154(b) by 0 days.

(21) Appl. No.: 17/871,006

(22) Filed: Jul. 22, 2022

(65) Prior Publication Data

US 2023/0175653 A1 Jun. 8, 2023

(30) Foreign Application Priority Data

Dec. 1, 2021 (CN) ......................... 202111452773.X
Mar. 2, 2022 (CN) ......................... 202210201621.0
(Continued)

(51) Int. Cl.
*F21K 9/272* (2016.01)
*F21K 9/27* (2016.01)
(Continued)

(52) U.S. Cl.
CPC ................ *F21K 9/272* (2016.08); *F21K 9/27* (2016.08); *F21K 9/275* (2016.08); *F21S 2/005* (2013.01);
(Continued)

(58) Field of Classification Search
CPC ........ F21K 9/272; F21V 21/005; F21V 23/06; F21S 2/005
See application file for complete search history.

(56) References Cited

U.S. PATENT DOCUMENTS 6,365,841 B1 4/2002 Takigami
6,435,697 B1 * 8/2002 Simmons ................. F21S 4/20 362/225

(Continued)

FOREIGN PATENT DOCUMENTS

CN 2802892 Y 8/2006
CN 102216671 A 10/2011

(Continued)

OTHER PUBLICATIONS

IPR2023-00269, Petition for Inter Partes Review Under 35 U.S.C. § 312 for U.S. Pat. No. 10,560,989, 97 pages, Dated Dec. 14, 2022.

(Continued)

*Primary Examiner* — William N Harris
(74) *Attorney, Agent, or Firm* — Andrew M. Calderon; Calderon Safran & Cole, PC

(57) ABSTRACT

An LED tube lamp includes a first and second members and a connection member. Each of the first and second members includes lighting part and an end part. Each lighting part includes LED light strip. The connection member includes electrical connection portions and joining portions for the first and second members. The connection member connects the first member with the second member by the joining portions and the electrical connection portions and makes the first member substantially coaxial to the second member.

44 Claims, 38 Drawing Sheets

(30) Foreign Application Priority Data

| | | |
|---|---|---|
| Mar. 10, 2022 | (CN) | 202210234803.8 |
| Apr. 11, 2022 | (CN) | 202210374677.6 |
| May 26, 2022 | (CN) | 202210578870.1 |

(51) Int. Cl.

| | |
|---|---|
| ***F21K 9/275*** | (2016.01) |
| ***F21S 2/00*** | (2016.01) |
| ***F21V 3/06*** | (2018.01) |
| ***F21V 21/005*** | (2006.01) |
| ***F21V 23/06*** | (2006.01) |
| ***F21Y 103/10*** | (2016.01) |
| ***F21Y 115/10*** | (2016.01) |

(52) U.S. Cl.
CPC .......... *F21V 3/0615* (2018.02); *F21V 21/005* (2013.01); *F21V 23/06* (2013.01); *F21Y 2103/10* (2016.08); *F21Y 2115/10* (2016.08)

(56) References Cited

U.S. PATENT DOCUMENTS

| | | | | |
|---|---|---|---|---|
| 6,846,094 | B2 | 1/2005 | Luk | |
| 7,114,830 | B2 | 10/2006 | Robertson et al. | |
| 8,360,599 | B2 | 1/2013 | Ivey et al. | |
| 8,461,602 | B2 | 6/2013 | Lerman et al. | |
| 8,558,255 | B2 | 10/2013 | Bisberg | |
| 8,591,057 | B2 | 11/2013 | KaWabata et al. | |
| 8,833,965 | B2 | 9/2014 | Shimasaki et al. | |
| 9,151,475 | B2 | 10/2015 | Huang et al. | |
| 9,206,970 | B2 | 12/2015 | Halliwell et al. | |
| 9,271,354 | B2 | 2/2016 | Takahashi et al. | |
| 9,328,874 | B2 | 5/2016 | Demuynck et al. | |
| 9,338,853 | B2 | 5/2016 | Guang | |
| 9,726,330 | B2 | 8/2017 | Wilcox et al. | |
| 9,970,640 | B2 | 5/2018 | Zhao | |
| 11,402,083 | B1 * | 8/2022 | Lu | F21K 9/272 |
| 2009/0267533 | A1 * | 10/2009 | Lee | F21S 2/005 362/555 |
| 2014/0071668 | A1 * | 3/2014 | Ai | F21V 19/009 362/217.17 |
| 2014/0218908 | A1 | 8/2014 | Kawashima et al. | |
| 2016/0109109 | A1 | 4/2016 | Yingchun | |
| 2017/0276332 | A1 * | 9/2017 | Pearson | F21V 21/005 |

FOREIGN PATENT DOCUMENTS

| | | | |
|---|---|---|---|
| CN | 102518972 | A | 6/2012 |
| CN | 203036295 | U | 7/2013 |
| CN | 203517436 | U | 4/2014 |
| CN | 203615157 | U | 5/2014 |
| CN | 103899939 | A | 7/2014 |
| CN | 103939773 | A | 7/2014 |
| CN | 203757616 | U | 8/2014 |
| CN | 203797412 | U | 8/2014 |
| CN | 104019378 | A | 9/2014 |
| CN | 204442771 | U | 7/2015 |
| JP | 2014103000 | A | 6/2014 |
| WO | 20130152485 | A1 | 10/2013 |

OTHER PUBLICATIONS

IPR2023-00269, Declaration of Donald E. Ackley, Ph.D, for U.S. Pat. No. 10,560,989, 111 pages, Dated Dec. 14, 2022.
IPR2023-00271 Petition for Inter Partes Review Under 35 U.S.C. § 312, for U.S. Pat. No. 10,295,125, 109 pages, Dated Dec. 14, 2022.
Declaration of R. Jacob Baker, Ph.D., P.E. for U.S. Pat. No. 10,295,125, 92 pages, Dated Dec. 14, 2022.
IPR2023-00272, Petition for Inter Partes Review Under 35 U.S.C. § 312 for U.S. Pat. No. 10,830,397, 98 pages, Dated Dec. 14, 2022.
IPR2023-00272, Declaration of Michael Lebby, Ph.D. for U.S. Pat. No. 10,830,397, 105 pages, Dated Dec. 14, 2022.
Case. No. 6:22-CV-534-ADA-DTG, Defendant Current Lighting Solutions, LLC d/b/a GE Current's Preliminary Invalidity Contentions, 63 pages, Dated Dec. 22, 2022.
Yingchun, U.S. Appl. No. 62/065,959, 15 pages, filed Oct. 20, 2014.
IPR2020-00162, Declaration of Regan Zane, Ph.D., for U.S. Pat. No. 9,897,265, 100 pages, Dated Nov. 18, 2019.
IPR2020-00162, Zane Curriculum Vitae, 28 pages, Dated Nov. 2019.
PTAB IPR2020-00162, Petition for Inter Parte Review of U.S. Pat. No. 9,897,265, 101 pages, Dated Nov. 18, 2019.
Case No. 2:19-cv-04047-PSG-MAA, Max Lite Non infringement and Invalidity Contentions Disclosures, 85 pages, Dated Jul. 20, 2020.
20200519, Keystone, KT-LED18T8-48G-850-D T8 LED Lamp Data Sheet, 2 pages.
20200519, Max Lite, LEDT8—Linear Replacement Lamp, Data Sheet, 3 pages.
20200519, Philips InstantFit LED T8 Lamps, Data sheet, 4 pages.
20200720, “Cree announces residential-targeted LED T8, new rural outdoor fixture”, LEDs, 14 pages.
20200720, “Cree Recalls LED T8 Lamps Due to Burn Hazard; Includes T8 Lamps Provided as Replacements in Previous Recall”, Cree, 8 pages.
20200720, “Cree LED T8 Replacement Lamp—General Information”, Cree, 11 pages.
20200720, “Hands-on testing of popular LED T8 lamps linear fixtures reveals promises and pitfalls”, LEDs, 29 pages.
Case No. 2:19-cv-04047-PSG-MAA, Max Lite Non infringement and Invalidity Contentions Disclosures, 68 pages, Dated May 19, 2020.
20200720, “Show Colors True and Natural” LED TW Series, 1 page.
Case No. 6:20-cv-00018-ADA, Elliott Preliminary Invalidity Contentions, 59 pages, Dated Jun. 25, 2020.

* cited by examiner

LED TUBE LAMP

CROSS-REFERENCES TO RELATED APPLICATIONS

This non-provisional application claims priorities under 35 U.S.C. § 119(a) to Patent Application No. 202210201621.0 filed in China on Mar. 2, 2022, Patent Application No. 202210234803.8 filed in China on Mar. 10, 2022, Patent Application No. 202210374677.6 filed in China on Apr. 11, 2022, and Patent Application No. 202210578870.1 filed in China on May 26, 2022, the entire contents of which are hereby incorporated by reference.

BACKGROUND

Technical Field

The present disclosure relates to a LED tube lamp, and in particular, to a LED tube lamp with multiple lighting member.

Related Art

With the development of lighting technology, LED tube lamps gradually replace traditional tube lamps, like fluorescent tube lamp, due to LED's advantages, like long life time, small size, low power consumption, etc.

In some design, the power of LED tube lamp depends upon the length of the LED tube lamp. The longer the length of the LED tube lamp is, the higher the power is. To meet requirements of high power, the LED tube lamp inevitably become longer.

SUMMARY

To address the above-mentioned issue, the present disclosure provides an LED tube lamp with multiple lighting members.

In some embodiments, the LED tube lamp comprises a first member, a second member and a connection member. The first member comprises a first lighting part and a first end part. The first end part is disposed at an end of the first lighting part. The first lighting part comprises a first LED light strip. The second member comprises a second lighting part and a second end part. The second end part is disposed at an end of the second lighting part. The second lighting part comprises a second LED light strip. The connection member comprises a first connection part and a second connection part. The first connection part is disposed at another end of the first lighting part. The first connection part comprises a first electrical connection portion and a first joining portion. The first electrical connection portion is electrically connected to the first LED light strip. The second connection part is disposed at another end of the second lighting part. The second connection part comprising a second electrical connection portion and a second joining portion. The second electrical connection portion electrically connected to the second LED light strip. The second electrical connection portion is configured to be electrically connected with the first electrical connection portion. The second joining portion is configured to be connected with the first joining portion to make the first member substantially coaxial to the second member.

According to some embodiments, the first lighting part comprises a plurality of LED chips on the first LED light strip 408. The second lighting part comprises a plurality of LED chips on the second LED light strip 428. A shortest distance between one of the LED chips on the first LED light strip and one of the LED chips on the second LED light strip is greater than or equal to a length of the connection member.

According to some embodiments, beam angles of the two LED chips having the shortest distance are $\alpha$ and $\beta$, respectively. A height of the first member is H. The length of the connection member is smaller than $(H^*\tan(0.5\alpha)+H^*\tan(0.5\beta))$.

According to some embodiments, a unit weight of a portion of the first member corresponding to the first end part is greater than or equal to a unit weight of a portion of the first and second members corresponding to the connection member. A unit weight of a portion of the second member corresponding to the second end part is greater than or equal to the unit weight of a portion of the first and second members corresponding to the connection member.

According to some embodiments, a ratio of a length of the connection member to a length of the LED tube lamp is less than 1.5%.

According to some embodiments, the first electrical connection portion comprises a first plug element and a first receptacle element. The first plug element and the first receptacle element are respectively electrically connected to the first LED light strip. The second electrical connection portion comprises a second plug element and a second receptacle element. The second plug element and the second receptacle element are respectively electrically connected to the second LED light strip. The first plug element is configured to match and be electrically connected to the second receptacle element. The second plug element is configured to match and be electrically connected to the first receptacle element.

According to some embodiments, the first electrical connection portion further comprises a first electric conduction element disposed in the first receptacle element. The first receptacle element is electrically connected to the first LED light strip via the first electric conduction element. The second plug element is electrically connected to the first electric conduction element when the second plug element matches the first receptacle element. The second electrical connection portion further comprises a second electric conduction element disposed in the second receptacle element. The first plug element is electrically connected to the second electric conduction element when the first plug element matches the second receptacle element.

According to some embodiments, the first electrical connection portion comprises a plurality of first pairs of the first plug element and the first receptacle element. The first plug element and the first receptacle element of each first pair are on a first line. The first lines are parallel to each other. The second electrical connection portion comprises a plurality of second pairs of the second plug element and the second receptacle element. The second plug element and the second receptacle element of each second pair are on a second line, and the second lines are parallel to each other.

According to some embodiments, the first connection part comprises a first wall. The second connection part comprises a second wall. The first electrical connection portion comprises a plurality of first pairs of the first plug element and the first receptacle element. The first plug elements are arranged substantially along a first circle on the first wall. The second electrical connection portion comprises a plurality of second pairs of the second plug element and the second receptacle element. The second plug elements are arranged substantially along a second circle on the second wall. The second circle is greater than the first circle.

According to some embodiments, the first plug element and the first receptacle element of each first pair are along a first line, the first lines are not parallel to each other.

According to some embodiments, the first electrical connection portion comprises a plurality of first pairs of the first plug element and the first receptacle element. The second electrical connection portion comprises a plurality of second pairs of the second plug element and the second receptacle element. The first plug elements are arranged substantially along a line and the second plug elements are arranged substantially along a line.

According to some embodiments, the first electrical connection portion comprises a plurality of first pairs of the first plug element and the first receptacle element. The second electrical connection portion comprises a plurality of second pairs of the second plug element and the second receptacle element. The first plug elements surround the first joining portion. The second plug elements surround the second joining portion.

According to some embodiments, the first electrical connection portion comprises a plurality of first receptacle elements. The second electrical connection portion comprises a plurality of second plug elements. The plurality of first receptacle elements is electrically connected to the first LED light strip. The plurality of second plug elements is electrically connected to the second LED light strip. The plurality of first receptacle elements matches and are electrically connected to the plurality of second plug elements, respectively.

According to some embodiments, the first electrical connection portion further comprises a plurality of first electric conduction elements and a plurality of second electric conduction elements. The plurality of first electric conduction elements is respectively disposed inside the plurality of first receptacle elements. The plurality of second electric conduction elements is respectively disposed at an end of the plurality of first receptacle elements and respectively electrically connected to the first LED light strip and the plurality of first electric conduction elements. The plurality of second plug elements is respectively connected to either the plurality of first electric conduction elements or the plurality of second electric conduction elements.

According to some embodiments, the first joining portion comprises a plurality of first hook holes. The second joining portion comprises a plurality of second hook elements. The plurality of second hook elements is configured to be hooked to the plurality of first hook holes, respectively.

According to some embodiments, the first hook holes surround the first electrical connection portion. The second hook elements surround the second electrical connection portion.

According to some embodiments, the first connection part comprises a first wall. The second connection part comprises a second wall. The first electrical connection portion and the first joining portion are on the first wall. The second electrical connection portion and the second joining portion are on the second wall. The first joining portion comprises a first hook element and a first hook hole. The second joining portion comprises a second hook hole and a second hook element. The first hook hole is configured to be connected with the second hook element. The first hook element is configured to be connected with the second hook hole.

According to some embodiments, the first connection part further comprises a first abutting portion. The second connection part further comprises a first fastening portion. The third connection part comprises a second fastening portion and a second abutting portion. The first fastening portion is configured to be fastened to the second fastening portion to make the first abutting portion abut against the second abutting portion.

According to some embodiments, the first connection part comprises a first wall. The second connection part comprises a second wall. The first wall substantially contacts the second wall when the first fastening portion is fastened to the second fastening portion.

According to some embodiments, An LED tube lamp comprises a first member, a second member and a connection member. The first member comprises a first lighting part and a first end part. The first end part is disposed at an end of the first lighting part. The first lighting part comprises a first LED light strip. The second member comprises a second lighting part and a second end part. The second end part is disposed at an end of the second lighting part. The second lighting part comprises a second LED light strip. The connection member comprises a first connection part, a second connection part and a third connection part. The first connection part is disposed at another end of the first lighting part. The first connection part comprises a first electrical connection portion and a first joining portion. The first electrical connection portion electrically connected to the first LED light strip. The second connection part is disposed at another end of the second lighting part. The second connection part comprises a second electrical connection portion and a second joining portion. The second electrical connection portion electrically connected to the second LED light strip. The third connection part, comprises a third electrical connection portion 484 and at least two third joining portions. The at least two third joining portions are connected to the first joining portion and the second joining portion respectively to make the first electrical connection portion be electrically connected to the second electrical connection portion via the third electrical connection portion and to make the first member substantially coaxial to the second member.

According to some embodiments, the first joining portion comprises a first engaging element. The second joining portion comprises a second engaging element. The at least two third joining portions comprises a first butting element and a second butting element. The first engaging element is configured to engage with the first butting element. The second engaging element is configured to engage with the second butting element.

According to some embodiments, the first electrical connection portion comprises a first plug element. The second electrical connection portion comprises a second plug element. The third electrical connection portion comprises a sleeve. When the first engaging element is engaged with the first butting element, and the second engaging element is engaged with the second butting element, the sleeve aligns the first plug element with the second plug element as well as makes the first plug element connected with the second plug element.

According to some embodiments, the first electrical connection portion further comprises a first plug element. The second electrical connection portion comprises a second plug element. The third electrical connection portion comprises a sleeve which is electrically conductive. When the first engaging element is engaged with the first butting element and the second engaging element is engaged with the second butting element, the sleeve aligns and is electrically connected the first plug element with the second plug element.

According to some embodiments, the first electrical connection portion further comprises a first plug element. The second electrical connection portion comprises a second plug element. The third electrical connection portion comprises a sleeve which is electrically conductive. When the first engaging element is engaged with the first butting element and the second engaging element is engaged with the second butting element, the sleeve aligns and electrically connects the first plug element with the second plug element.

According to some embodiments, the first connection part comprises a first wall. The second connection part comprises a second wall. The third connection part has a first bottom wall and a second bottom wall opposite to the first bottom wall. The first wall is close to or in contact with the first bottom wall when the first engaging element is engaged with the first butting element. The second wall is close to or in contact with the second bottom wall when the second engaging element is engaged with the second butting element.

According to some embodiments, the connection member comprises a first connection part, a second connection part, a third connection part and a fourth connection part. The first connection part is disposed at another end of the first lighting part. The first connection part comprises a first electrical connection portion and a first joining portion. The first electrical connection portion is electrically connected to the first LED light strip. The second connection part is disposed at another end of the second lighting part. The second connection part comprises a second electrical connection portion and a second joining portion. The second electrical connection portion is electrically connected to the second LED light strip. The third connection part comprises a third electrical connection portion and at least two third joining portions. The fourth connection part comprises a fourth electrical connection portion and at least two fourth joining portions. The first joining portion, the second joining portion, the at least two third joining portions and the at least two fourth joining portions are joined together to make the first electrical connection portion be electrically connected to the second electrical connection portion via the third electrical connection portion and the fourth electrical connection portion, and to make the first member substantially coaxial to the second member.

According to some embodiments, the at least two third joining portions comprise a first butting element and a first fixing element. The at least two fourth joining portions comprise a second butting element and a second fixing element. The first joining portion comprises a first engaging element. The second joining portion comprises a second engaging element. The first engaging element is configured to engage with the first butting element. The second engaging element is configured to engage with the second butting element. The first fixing element is configured to be connected with the second fixing element. When the engaging elements are engaged with the butting elements, and the first fixing element is connected with the second fixing element, the connection makes the first member substantially coaxial to the second member.

According to some embodiments, the at least two third joining portions comprise a first butting element and a first fixing element. The at least two fourth joining portions comprise a second butting element and a second fixing element. The first joining portion comprises a first engaging element. The second joining portion comprises a second engaging element. The first engaging element is configured to engage with the first butting element. The second engaging element is configured to engage with the second butting element. The first fixing element is configured to be connected with the second fixing element. When the engaging elements are engaged with the butting elements, and the first fixing element is connected with the second fixing element, the connection makes the first member is substantially coaxial to the second member.

According to some embodiments, the first sleeve is a through hole formed on the third connection part and the second sleeve is a through hole formed on the fourth connection part. The third connection part further comprises an electric conduction piece disposed in the first sleeve and the second sleeve. The electric conduction piece electrically connects the first plug element with the second plug element when the first plug element and the second plug element are inserted into the through holes, respectively.

DETAILED DESCRIPTION

Figure 1:
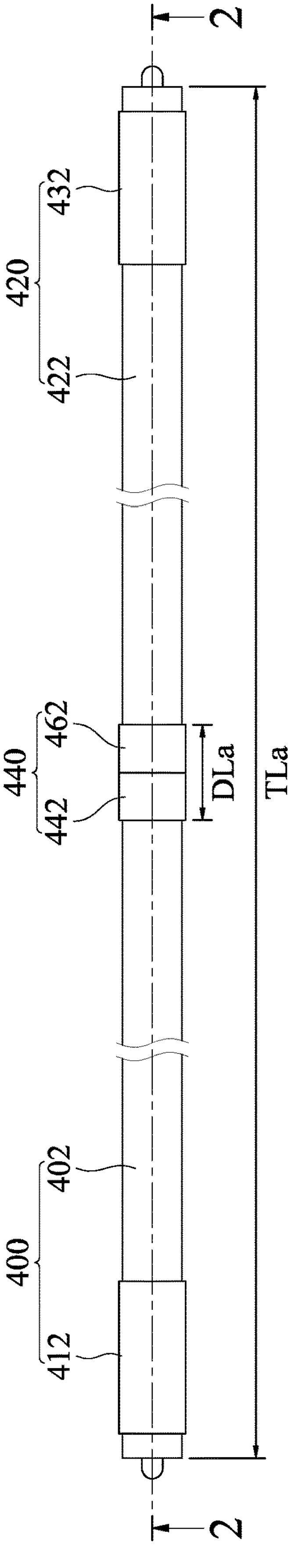
FIG. 1 illustrates a schematic plan view of a LED tube lamp according to some embodiments of the present disclosure.

Hereinafter the disclosure will be more comprehensively described with reference to the accompanying drawings and exemplary embodiments provided therein. The following descriptions of various embodiments of this invention are presented herein for purpose of illustration and giving examples only. It is not intended to be exhaustive or to be limited to the precise form disclosed. As people skilled in the art will learn, the embodiments described herein may be modified in various manners without departing from the spirit or scope of the invention.

In the drawings, the size and relative sizes of components may be exaggerated for clarity. Like numbers refer to like elements throughout.

It will be understood that, although the terms first, second, third etc. may be used herein to describe various elements, components, regions, layers, or steps, these elements, components, regions, layers, and/or steps should not be limited by these terms. Unless the context indicates otherwise, these terms are only used to distinguish one element, component, region, layer, or step from another element, component, region, or step, for example as a naming convention. Thus, a first element, component, region, layer, or step discussed below in one section of the specification could be termed a second element, component, region, layer, or step in another section of the specification or in the claims without departing from the teachings of the present disclosure. In addition, in certain cases, even if a term is not described using "first," "second," etc., in the specification, it may still be referred to as "first" or "second" in a claim in order to distinguish different claimed elements from each other.

It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to direct contact (i.e., touching) unless the context indicates otherwise.

Embodiments described herein will be described referring to three-dimensional views, plan views and/or cross-sectional views by way of ideal schematic views. Accordingly, the exemplary views may be modified depending on manufacturing technologies and/or tolerances. Therefore, the disclosed embodiments are not limited to those shown in the views, but include modifications in configuration formed on the basis of manufacturing processes. Therefore, regions exemplified in figures may have schematic properties, and shapes of regions shown in figures may exemplify specific shapes of regions of elements to which aspects of the invention are not limited.

Spatially relative terms, such as "beneath," "below," "lower," "above," "upper," "top," "bottom," "right," "left," "vertical," "horizontal" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Terms such as "same," "equal," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to reflect this meaning.

Terms such as "about" or "approximately" may reflect sizes, orientations, or layouts that vary only in a small relative manner, and/or in a way that does not significantly alter the operation, functionality, or structure of certain elements. For example, a range from "about 0.1 to about 1" may encompass a range such as a 0%-5% deviation around 0.1 and a 0% to 5% deviation around 1, especially if such deviation maintains the same effect as the listed range.

Terms such as "parallel," as "perpendicular," "coaxial" and the like maybe used herein for ease of description to describe one element's or feature's relationship to another element(s) or feature(s) as illustrated in the figures. It will be understood that the terms are intended to encompass relationship in a way that does not significantly alter the operation, functionality, or structure of the modified element(s) or feature(s). The term "substantially" may be used herein to reflect this meaning. For example, where two elements are substantially perpendicular to each other may encompass their creating angle from 60 to 120 degrees as long as the operation, functionality, or structure of the two elements is not altered.

Figure 2:
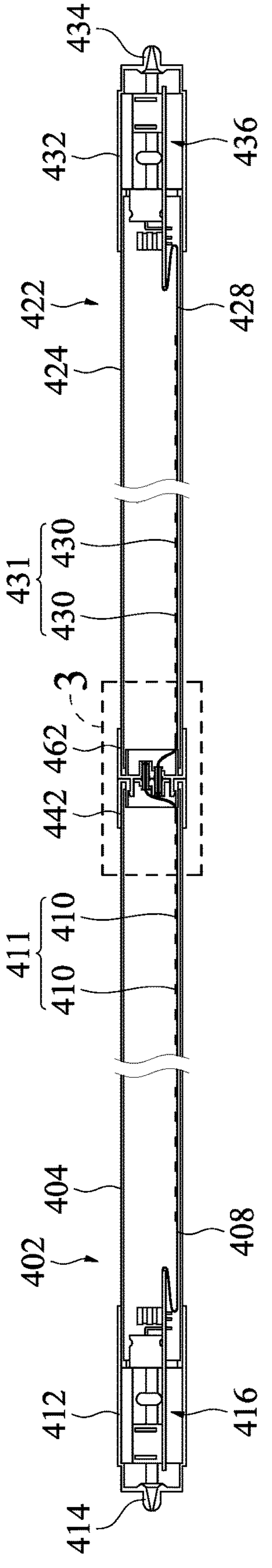
FIG. 2 illustrates a cross-sectional view of the LED tube lamp of FIG. 1 along a section line 2-2.
Figure 3:
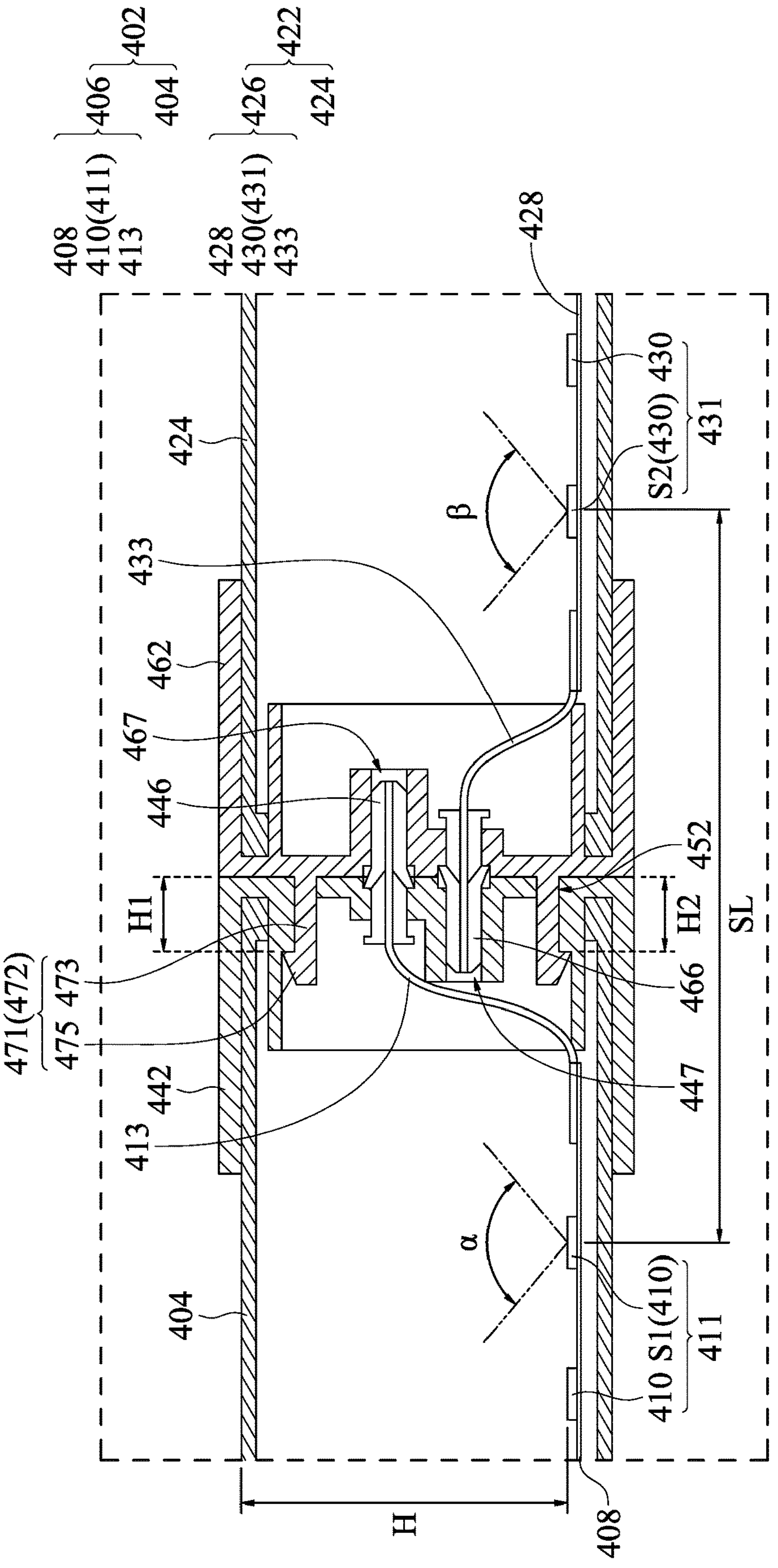
FIG. 3 illustrates a schematic enlarged view of the region 3 shown in FIG. 2.

Please refer to FIGS. 1-3. FIG. 1 illustrates a schematic plan view of a LED tube lamp according to some embodiments of the present disclosure. FIG. 2 illustrates a cross-sectional view of the LED tube lamp of FIG. 1 along a section line 2-2. FIG. 3 illustrates a schematic enlarged view of the region 3 shown in FIG. 2. In some embodiments, an LED tube lamp comprises a first member 400, a second member 420 and a connection member 440.

The first member 400 comprises a first lighting part 402 and a first end part 412. The first end part 412 is disposed at an end of the first lighting part 402. The first lighting part 402 comprises a first LED light strip 408. The second member 420 comprises a second lighting part 422 and a second end part 432. The second end part 432 is disposed at an end of the second lighting part 422. The second lighting part 422 comprises a second LED light strip 428. The connection member 440 comprises a first connection part 442 and a second connection part 462. The first connection part 442 is disposed at another end of the first lighting part 402. The first connection part 442 comprises a first electrical connection portion 444 and a first joining portion 452. The first electrical connection portion 444 is electrically connected to the first LED light strip 408. The second connection part 462 is disposed at another end of the second lighting part 422. The second connection part 462 comprises a second electrical connection portion 464 and a second joining portion 472. The second electrical connection portion 464 is electrically connected to the second LED light strip 428. The second electrical connection portion 464 is configured to be electrically connected with the first electrical connection portion 444. The second joining portion 472 is configured to be connected with the first joining portion 452 to make the first member 400 substantially coaxial to the second member 420.

Thus, the first member 400 could be connected with the second member 420 by the connection member 440. The connection of the first electrical connection portion 444 and the second electrical connection portion 464 provides electrical connection between the first LED light strip 408 and the second LED light strip 428. The connection between the first electrical connection portion 444 and the second electrical connection portion 464 may comprise connection for electrical power and/or control signals. The connection of the first joining portion 452 and the second joining portion 472 provides mechanical strength and maintains substantially coaxial relationship between the first member 400 and the second member 420.

The connection relationship between the first joining portion 452 and the second joining portion 472 maybe a hooking relationship, an attaching relationship, or magnetic attracting relationship. The connection relationship between the first electrical connection portion 444 and the second electrical connection portion 464 maybe a relationship between a male and female connectors (a plug and a receptacle) and any other physical connection relationship. In the embodiments where the first joining portion 452 and the second joining portion 472 are the hooking relationship (discussed later), the first member 400 and the second member 420 is firmly connected with each other and could not be separated without any damages after the first joining portion 452 is connected to the second joining portion 472.

In some embodiment, each of the first lighting part 402 and the second lighting part 422 is in the shape of a tube. Users could assemble the first member 400 and the second member 420 by connecting the first electrical connection portion 444 with the second electrical connection portion 464, and connecting the first joining portion 452 with the second joining portion 472 to have a LED tube lamp with a loner length than the length of each of the first member 400 and the second member 420. As mentioned above, the first member 400 and the second member 420 of the LED tube lamp are substantially coaxial to each other. Thus, the LED tube lamp could be used in some situations where a longer length of the lamp is required. In some situation where a longer length of the lamp is not required but connection of two lighting members is required due to control, power, electricity or other reasons, the LED tube lamp meets the requirements.

Additionally, when a user assembles the first member 400 and the second member 420, the LED tube lamp is not powered on and there is no risk of electric shock.

Further, the LED tube lamp includes the first member 400 and the second member 420. The first member 400 and the second member 420 could be packed separately. The lengths of each of the packed members 400, 420 are shorter than total length of the LED tube lamp. Consequently, the shorter length of each of the packed members 400, 420 will be less possible to be damaged by external force or shock during shipping or transportation than the LED tube lamp with a longer length.

In some embodiments, referring to FIG. 3, the first lighting part 402 comprises a first lamp tube 404 and a first LED light assembly 406. The first LED light assembly 406 comprises the first LED light strip 408 and a plurality of LED chips 410 (may referred to first LED chips) on the first LED light strip 408. The second lighting part 422 comprises a second lamp tube 424 and a second LED light assembly 426. The first chip group 411 comprises the plurality of LED chips 410 (first LED chips). The second LED light assembly 426 comprises the second LED light strip 428 and a plurality of LED chips 430 (may referred to second LED chips) on the second LED light strip 428. The second chip group 431 comprises the plurality of LED chip 430 (second LED chips). The light emitted from the plurality of first LED chips 410 and the plurality of second LED chips 430 are toward substantially the same direction. For example, the light is emitted vertically upward as shown in FIG. 2.

In some embodiments, the first lamp tube 404 and the second lamp tube 424 are made of transparent materials; for example, glass or plastic. The first lamp tube 404 and the second lamp tube 424 maybe one-piece components. In some embodiments, the first lamp tube 404 and the second lamp tube 424 are made of translucent materials which allow most of light emitted from the plurality of LED chips 410, 430 to pass through thereof. In some embodiments, the surfaces of the first lamp tube 404 and the second lamp tube 424 are coated or attached with a light diffusion layer which prevents the first lamp tube 404 and the second lamp tube 424 from being seen-through and the users would not recognize the LED chips 410, 430 inside. The light diffusion layer may be on the inner or outer surfaces of the first lamp tube 404 and the second lamp tube 424. In the embodiments where the light diffusion layer is on the outer surfaces, the light diffusion layer may be a light diffusion sleeve.

Please referring to FIGS. 2 and 3, the first end part 412 covers an end of the first lamp tube 404. The first connection part 442 covers another end of the first lamp tube 404. The second end part 432 covers an end of the second lamp tube 424. The second connection part 462 covers another end of the second lamp tube 424. In some embodiments, the first end part 412, the second end part 432, the first connection part 442 and the second connection part 462 are made of opaque materials. The first end part 412, the second end part 432, and the connection member 440 are the first dark section, the second dark section and the third dark section in comparison with other portions of the first lamp tube 404 and the second lamp tube 424. Please refer to FIG. 1. A length DLa of the connection member 440 is not greater than 0.05, 0.04, 0.03, 0.02 or 0.015 times the total length TLa of the LED tube lamp. In some embodiments, a ratio of the length DLa of the connection member 440 to the length TLa of the LED tube lamp is less than 1.5%. The length configuration is to shorten the length of the dark sections and minimize visual discontinuity of the LED tube lamp caused by the connection member 440. In some embodiments, the length DLa of the connection member 440 is not smaller than 20 mm. In some embodiments, the length DLa of the connection member 440 is not greater than 35, 40, 45 or 50 mm.

In some embodiments, please referring FIG. 3 as well, the shortest distance SL between one of the first LED chips 410 on the first LED light strip 408 and one of the second LED chips 430 on the second LED light strip 428 is greater than or equal to the length DLa of the connection member 440. As shown in FIG. 3, at least a portion of light emitted from the LED chips 410, 430 nearby the connection member 440 goes toward the connection member 440. In some embodiment, the connection member 440 is made of transparent or translucent materials and the light from the LED chips 410, 430 is refracted by the connection member 440. Consequently, the dark section caused by the connection member 440 is eliminated.

In some embodiments, please referring FIG. 3, the first LED chip S1 (410) closest to the connection member 440 has a first beam angle α and the second LED chip S2 (430) closest to the connection member 440 has a second beam angle β. The first beam angle α and the second beam angle β may be the same or different. The distance from the emitting surface of the first LED chip 410 to the surface of the first lamp tube 404 which the first LED chips 410 face is H (or from the emitting surface of the second LED chip 430 to the surface of the second lamp tube 424 which the second LED chips 430 face). In practice, the thickness of the first LED chip 410 or the second LED chip 430 may be ignored. In other words, H may be the diameter of the first lamp tube 404 or the second lamp tube 424 (or the height of the first lamp tube 404 along vertical direction on FIG. 3). H may be the height of the first member 400 or the second member 420. In some embodiments, the length DLa of the connection member 440 equals to or smaller than $(H*\tan(0.5*\alpha)+H*\tan(0.5*\beta))$. Consequently, light emitted from the first LED chip S1 (410) and the second LED chip S2 (43) closest to the connection member 440 illuminates the connection member 440 and the third dark section (corresponding to the connection member 440) could be mostly eliminated. In some embodiments, the height (Ha) of the first member 400 differs the height (Hb) of the second member 420. The length DLa of the connection member 440 equals to or smaller than $(Ha*\tan(0.5*\alpha)+Hb*\tan(0.5*\beta))$.

Figure 4A:
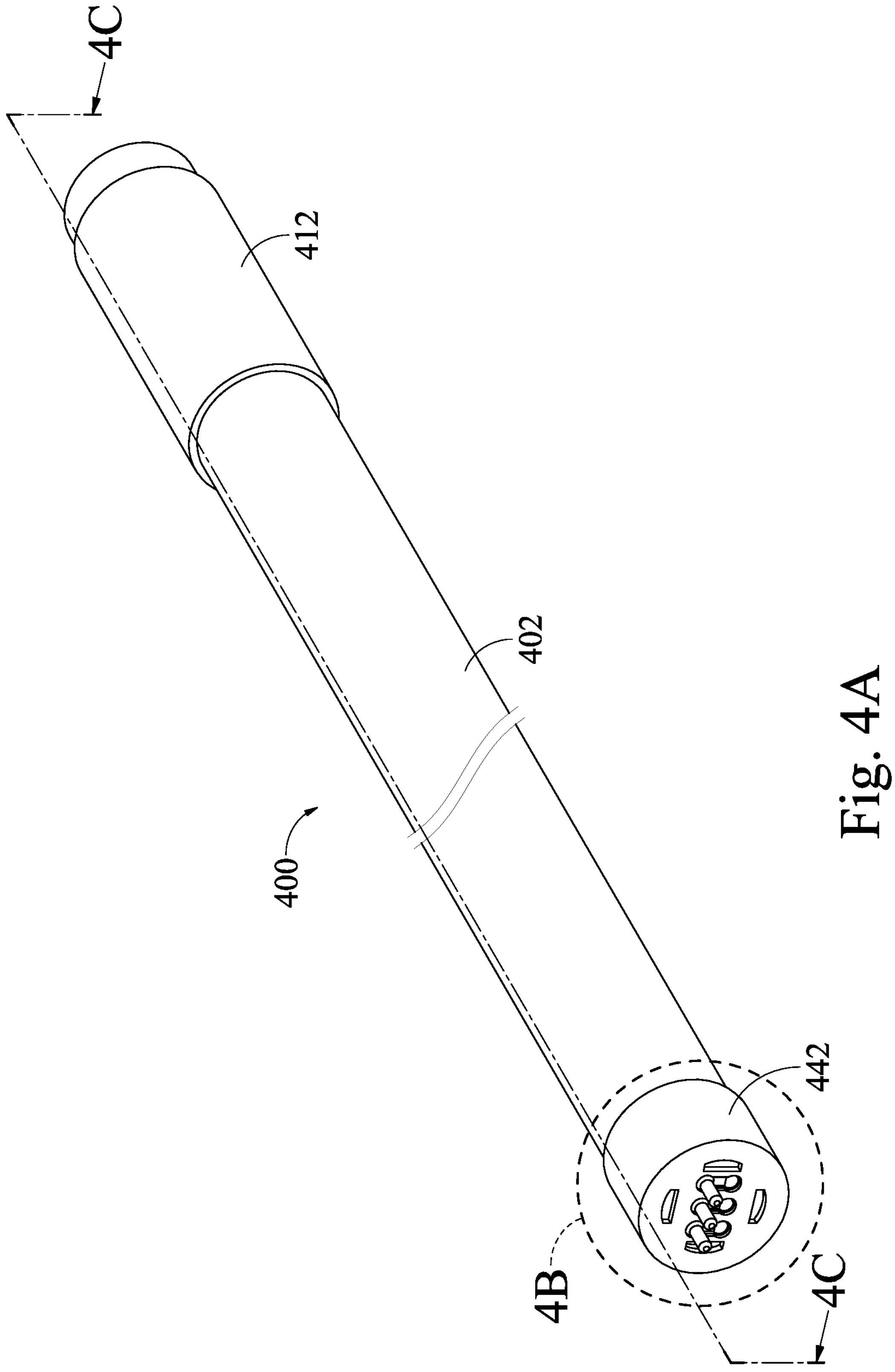
FIG. 4A illustrates a schematic three-dimensional view of a first member and a first connection part according to the embodiments of FIG. 1.
Figure 4B:
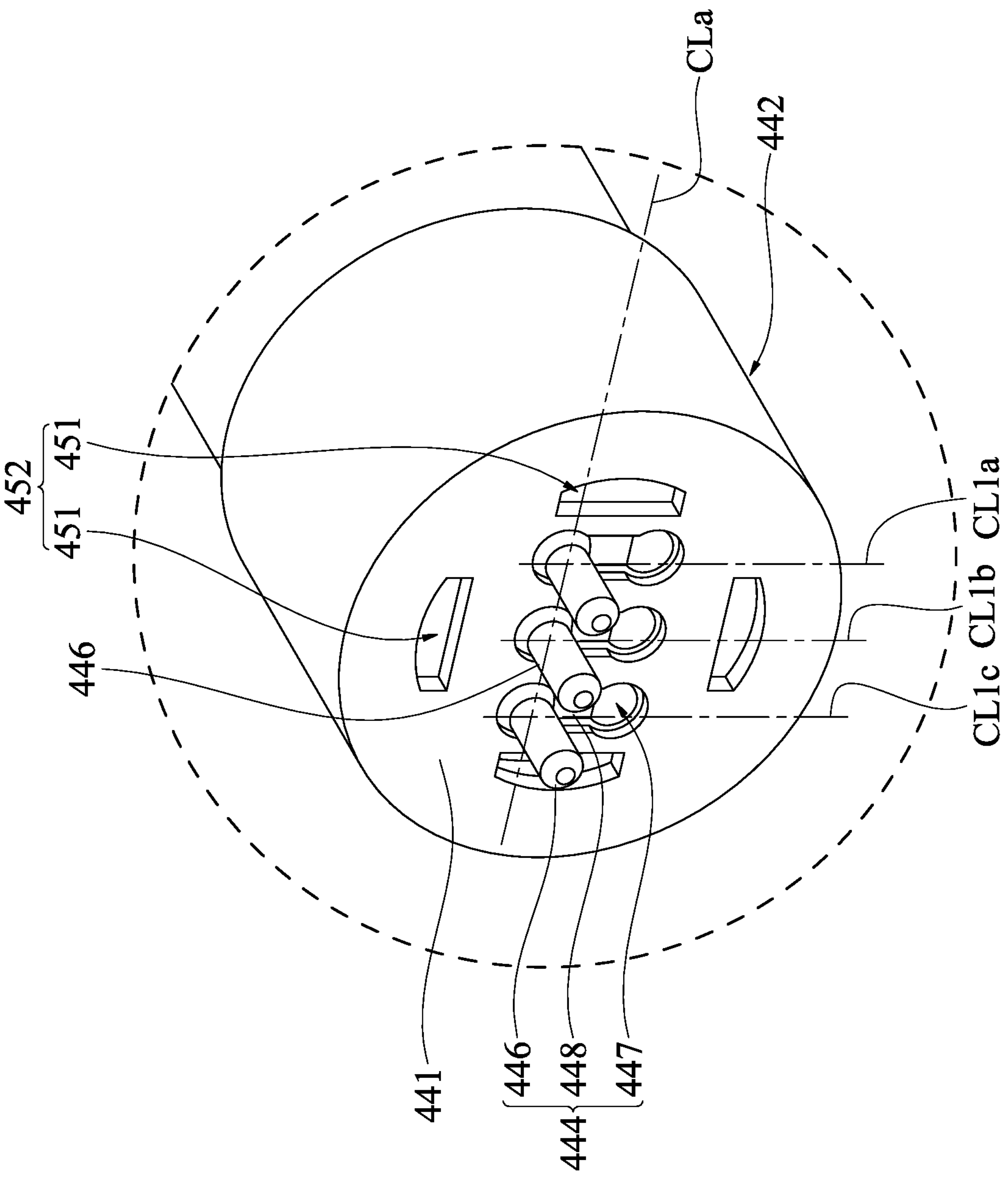
FIG. 4B illustrates a schematic enlarged view of the region 4B shown in FIG. 4A.
Figure 4C:
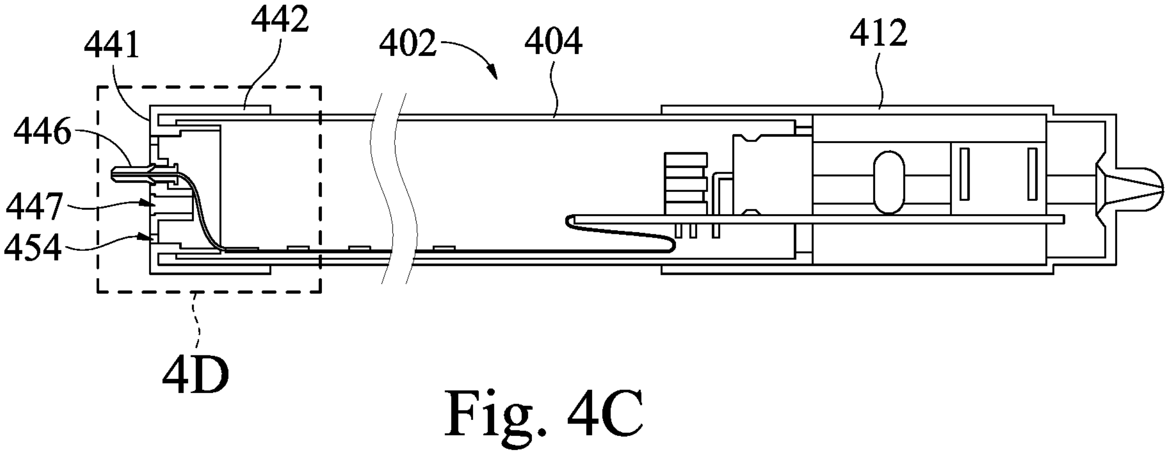
FIG. 4C illustrates a cross-sectional view along a section line 4C-4C shown in FIG. 4A.
Figure 4D:
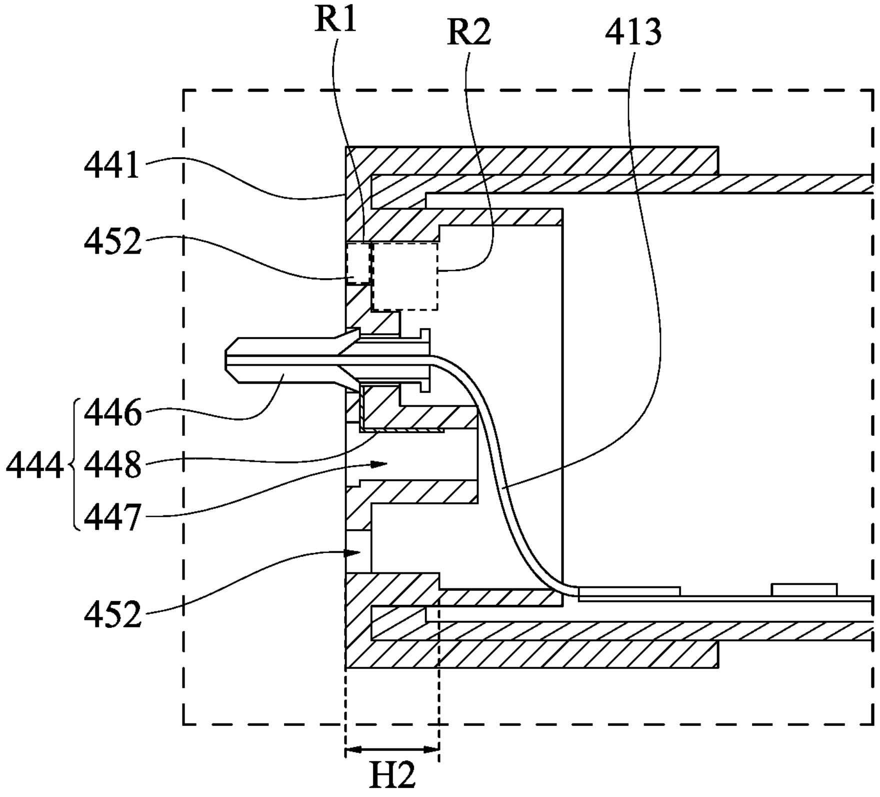
FIG. 4D illustrates a schematic enlarged view of the region 4D shown in FIG. 4C.
Figure 5A:
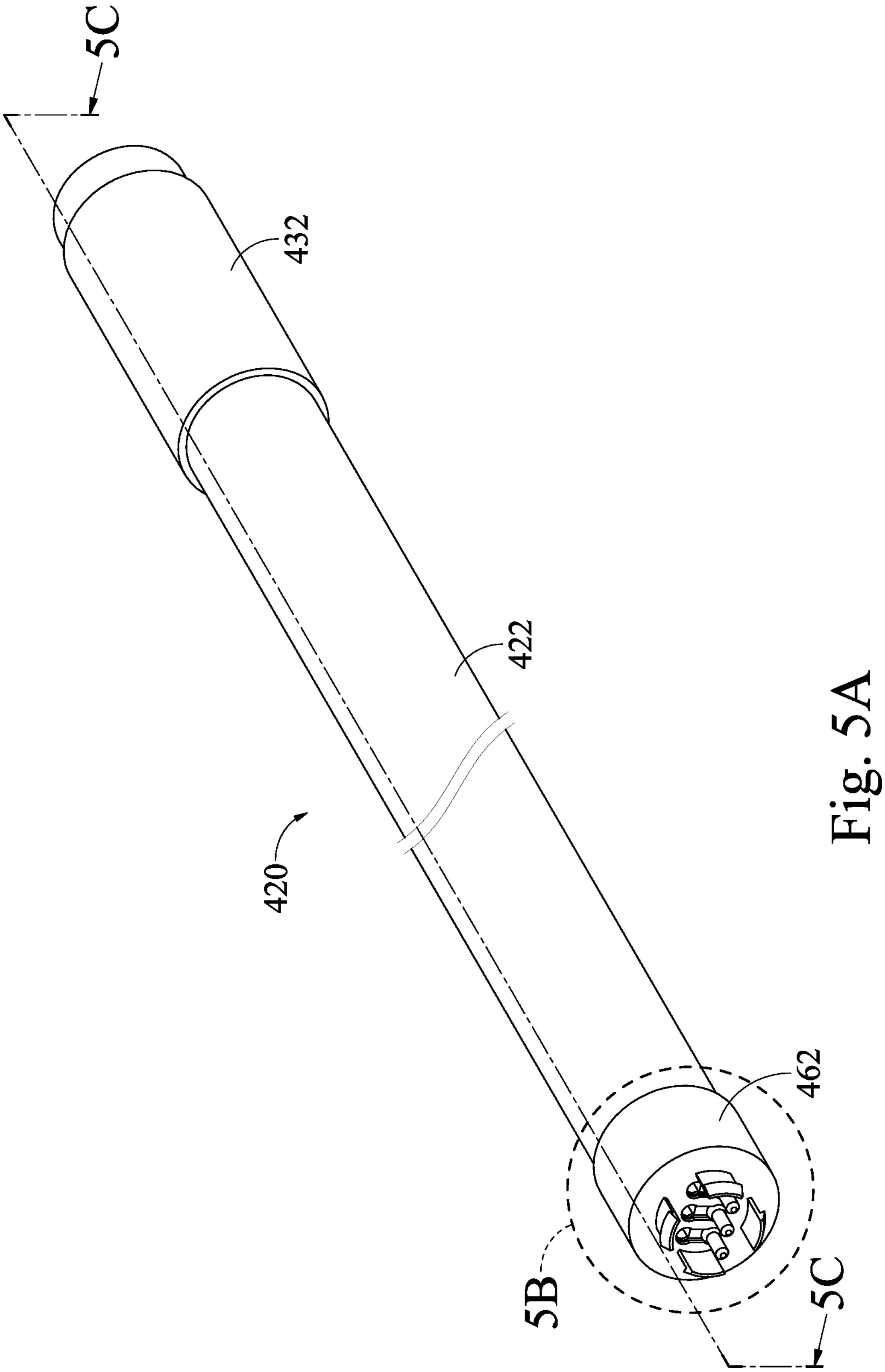
FIG. 5A illustrates a schematic three-dimensional view of a second member and a second connection part according to the embodiments of FIG. 1.
Figure 5B:
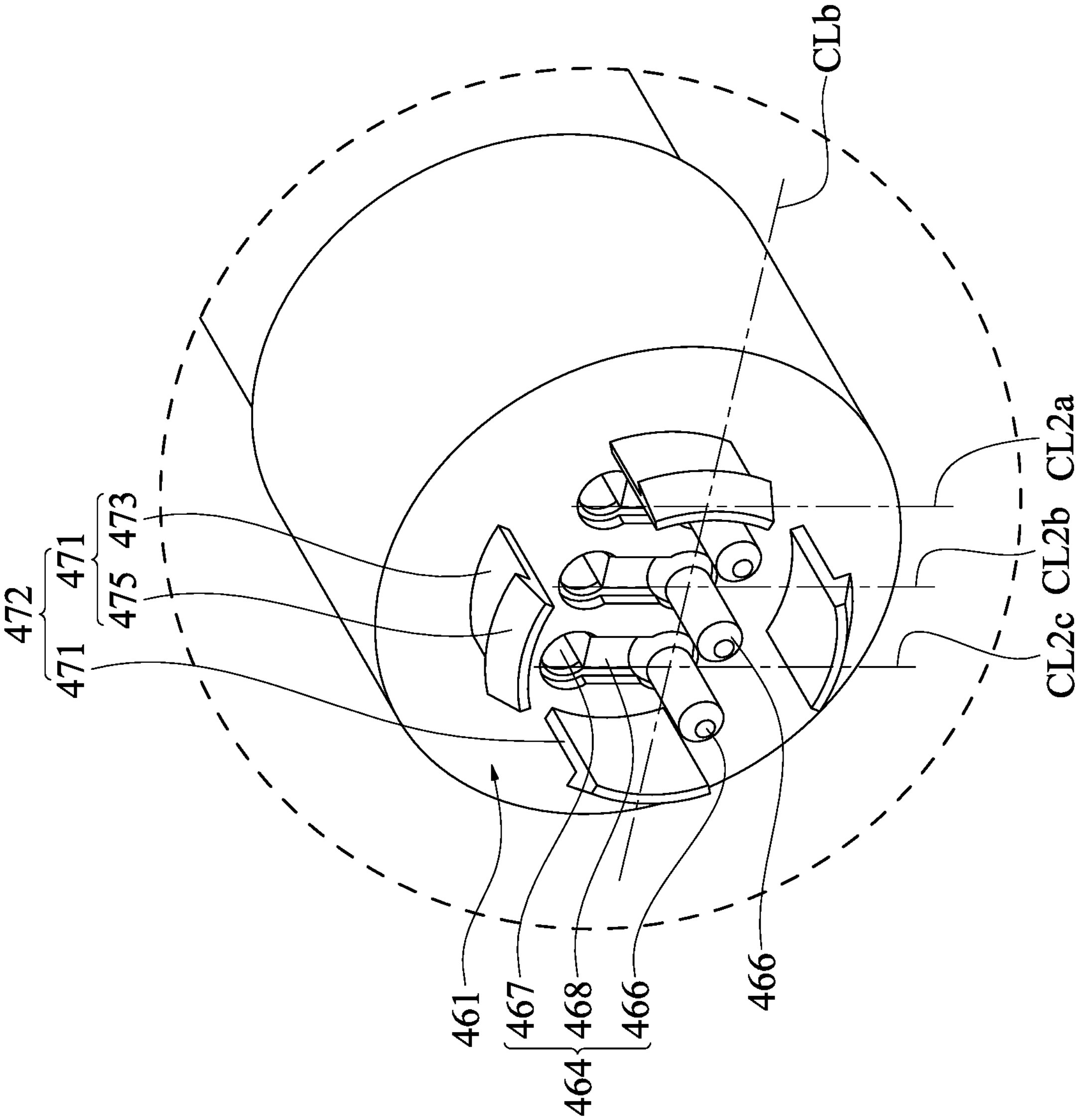
FIG. 5B illustrates a schematic enlarged view of the region 5B shown in FIG. 5A.
Figure 5C:
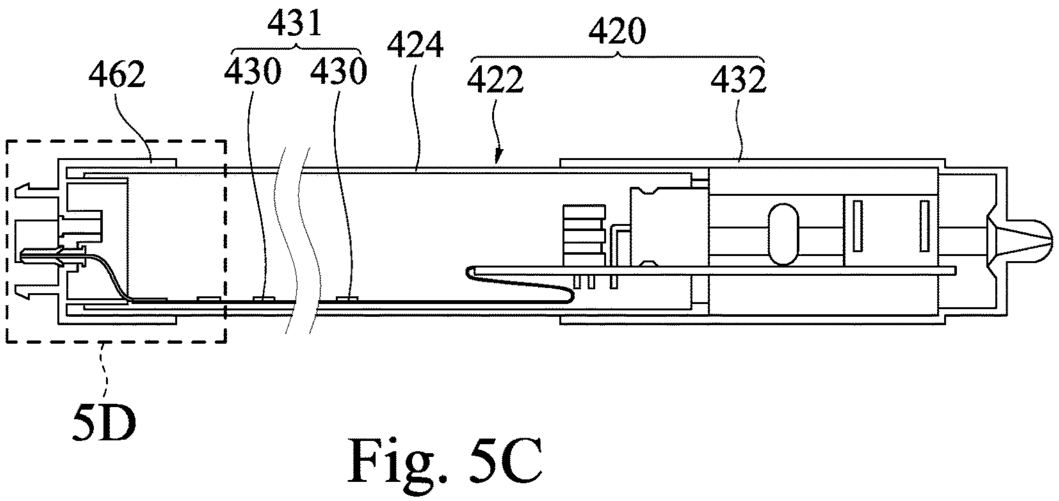
FIG. 5C illustrates a cross-sectional view along a section line 5C-5C shown in FIG. 5A.
Figure 5D:
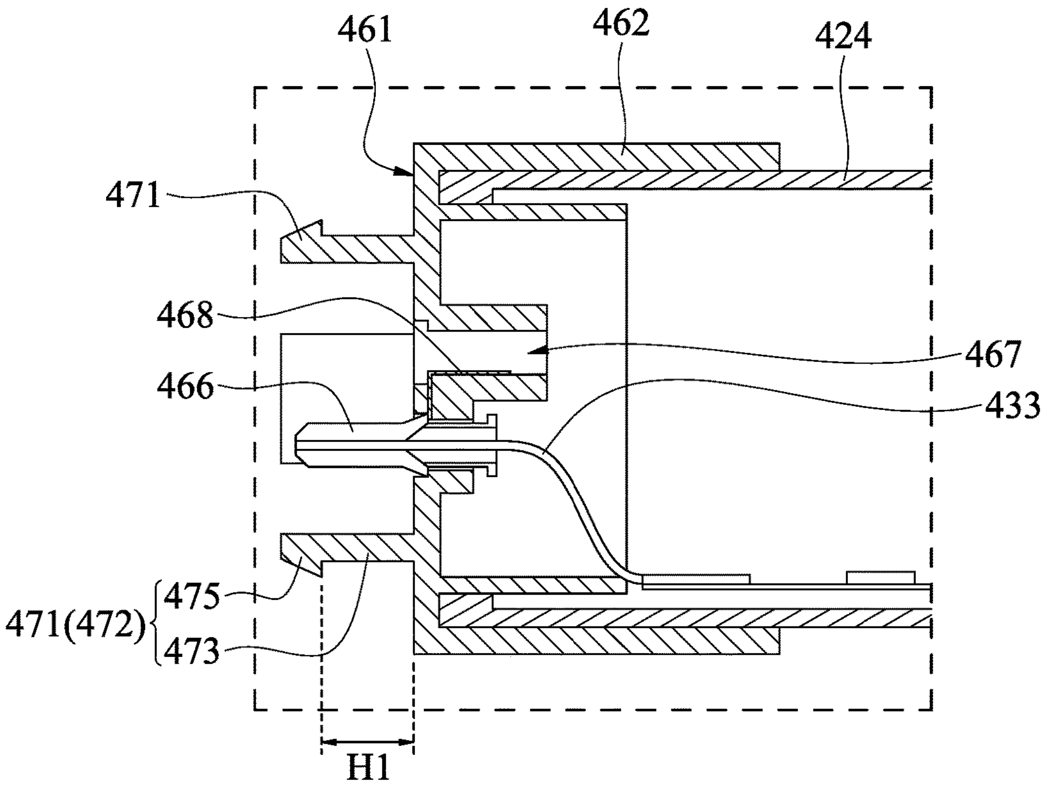
FIG. 5D illustrates a schematic enlarged view of the region 5D shown in FIG. 5C.

Please refer to FIGS. 4A-5D. FIG. 4A illustrates a schematic three-dimensional view of a first member 400 and a first connection part 442 according to the embodiments of FIG. 1. FIG. 4B illustrates a schematic enlarged view of the region 4B shown in FIG. 4A. FIG. 4C illustrates a cross-sectional view along a section line 4C-4C shown in FIG. 4A. FIG. 4D illustrates a schematic enlarged view of the region 4D shown in FIG. 4C. FIG. 5A illustrates a schematic three-dimensional view of a second member 420 and a second connection part 462 according to the embodiments of FIG. 1. FIG. 5B illustrates a schematic enlarged view of the region 5B shown in FIG. 5A. FIG. 5C illustrates a cross-sectional view along a section line 5C-5C shown in FIG. 5A. FIG. 5D illustrates a schematic enlarged view of the region 5D shown in FIG. 5C.

The first connection part 442 comprises a first wall 441. The second connection part 462 comprises a second wall 461. In some embodiments, the first electrical connection portion 444 is on the first wall 441 and the second electrical connection portion 464 is on the second wall 461. The first joining portion 452 is on the first wall 441 and the second joining portion 472 is on the second wall 461. In some embodiments, the distance between the first wall 441 and the second wall 461 is not greater than 1 mm when the first joining portion 452 is connected with the second joining portion 472.

In some embodiments, referring to FIGS. 4B and 5B, the first joining portion 452 comprises a plurality of first hook holes 451. The second joining portion 472 comprises a plurality of second hook elements 471. The plurality of second hook elements 471 is configured to be hooked to the plurality of first hook holes 451, respectively. Each of the second hook elements 471 comprises a hook post 473 and a hook portion 475 connected to the hook post 473. In some embodiment, referring to FIG. 3, the height of the hook post 473 is H1 (shown on FIG. 5D, the distance between the hook portion 475 to the second wall 461) and the depth of the first hook hole 451 is H2 (shown on FIG. 4D). In some embodiments, H1 is substantially the same as or 1 mm smaller than H2. Hence, the first wall 441 contacts the second wall 461 when the first joining portion 452 is connected with the second joining portion 472 (when the second hook elements 471 are hooked to the first hook holes 451). This makes the first member 400 and the second member 420 substantially coaxial and prevents the LED tube lamp from being bended at the connection member 440.

In some embodiments, referring to FIGS. 4D and 5D, the first hook hole 451 has a first accommodating zoom R1 and a second accommodating zoom R2. When the second hook element 471 is inserted into the first hook hole 451, the hook portion 475 enters in sequence the first accommodating zoom R1 and the second accommodating zoom R2 and then stops at the second accommodating zoom R2 due that the hook portion 475 is hooked the first hook hole 451. Further, the second hook element 471 is not easily to be released from the first hook hole 451 because the length along the radial direction of the first wall 441 of the first accommodating zoom R1 (along the vertical direction on FIG. 4D) is shorter than that of the second accommodating zoom R2.

In some embodiments, referring to FIGS. 4B and 5B, the first joining portion 452 comprises four first hook holes 451. The second joining portion 472 comprises four second hook elements 471. However, the quantity of the first hook holes 451 maybe one, two or more. The quantity of the second hook elements 471 maybe one, two or more. For example, referring to FIGS. 21A and 21B, the first joining portion 452 comprises one first hook hole 451. The second joining portion 472 comprises one second hook element 471.

In some embodiments, the first electrical connection portion 444 comprises a first plug element 446 and a first receptacle element 447. The second electrical connection portion 464 comprises a second plug element 466 and a second receptacle element 467. The first plug element 446 extends along the length direction of the first member 400 and the second plug element 466 extends along the length direction of the second member 420. The first receptacle element 447 is configured to match and be electrically connected to the second plug element 466. The second receptacle element 467 is configured to match and be electrically connected to the first plug element 446. The plug elements 446, 466 maybe electric conduction pins and the receptacle elements 447, 467 maybe electric conduction holes. Accordingly, the first receptacle element 447 is electrically connected with the second plug element 466 and the second receptacle element 467 is electrically connected with the first plug element 446 when the first joining portion 452 is connected with the second joining portion 472. In the some embodiments, referring to FIGS. 4B and 5B, the first electrical connection portion 444 comprises three first plug elements 446 and three first receptacle elements 447. The second electrical connection portion 464 comprises three second plug elements 466 and three second receptacle elements 467. The first receptacle elements 447 are respectively electrically connected with the second plug elements 466, and the second receptacle elements 467 are respectively electrical connected with the first plug element 446 when the first joining portion 452 is connected with the second joining portion 472. In some embodiment, the first plug elements 446 and the first receptacle elements 447 are electrically connected with the first LED light strip 408, respectively. The second plug elements 466 and the second receptacle elements 467 are electrically connected with the second LED light strip 428, respectively. Thus, the quantity of electric connections in the embodiments is six.

The electrical connections between the first member 400 and the second member 420 maybe for electric power and control signals. The quantity of electric connections may vary according to design requirements. For example, the quantity of electrical connections maybe one, two, three or more.

In some embodiments, the first electrical connection portion 444 further comprises a first electric conduction element 448 electrically connected with the first plug element 446 and the first receptacle element 447. The second electrical connection portion 464 further comprises a second electric conduction element 468 electrically connected with the second plug element 466 and the second receptacle element 467. The first plug element 446 is electrically connected with the first LED light strip 408. The second plug element 466 is electrically connected with the second LED light strip 428. Thus, the first receptacle element 447, the first electric conduction element 448, the first plug element 446, the second receptacle element 467, the second electric conduction element 468 and the second plug element 466 constitute an electrical connection when the first joining portion 452 is connected with the second joining portion 472.

In some embodiments, referring to FIGS. 4B and 5B, the first electrical connection portion 444 comprises three first electric conduction elements 448 and the second electrical connection portion 464 comprises three second electric conduction elements 468. Consequently, there are three electrical connections between the first member 400 and the second member 420.

In some embodiments, referring to FIG. 3, the first plug element 446 is electrically connected with the first LED light strip 408 by a first conductive wire 413 and the second plug element 466 is electrically connected with the second LED light strip 428 by a second conductive wire 433. In the embodiments where the electric conduction elements 448, 468 exist, the receptacle elements 447, 467 are electrically connected to the LED light strips 408, 428, respectively, by the electric conduction elements 448, 468 and the conductive wire 413, 433. In some embodiments, the receptacle elements 447, 467 per se are not electric conductive. Please refer to FIGS. 4D and 5D. A portion of the first electric conduction element 448 extends inside the first receptacle element 447 and a portion of the second electric conduction element 468 extends inside the second receptacle element 467. Hence, the first plug element 446 is electrical connected to the second LED light strip 428 through the second electric conduction element 468 and the second wire 433 when the first plug element 446 is inserted into the second receptacle element 467. The second plug element 466 is connected to the first LED light strip 408 through the first electric conduction element 448 and the first wire 413 when the second plug element 466 is inserted into the first receptacle element 447. In the embodiments where the electric conduction elements 448, 468 respectively extend inside the receptacle elements 447, 467, the receptacle elements 447, 467 still could be electrically conductive. Hence, the electrical connection is ensured.

In some embodiments, referring to FIGS. 4D and 5D, the first conductive wire 413 is rivetedly connected to the first plug element 446 to electrically connect the first LED light strip 408 with the first plug element 446. The second conductive wire 433 is rivetedly connected to the second plug element 466 to electrically connect the second LED light strip 428 with the second plug element 466. By the way of the riveted connection, the manufacturing process is simplified and the electrical connection is stable. In some embodiments, an end of each of the plug elements 446, 466 is inserted into a corresponding hole (not given a numeral) on the walls 441, 461. In addition, the end of each of the plug elements 446, 466 is exposed out of the corresponding hole and pivoted with the corresponding wires 413 or 433.

Figure 21B:
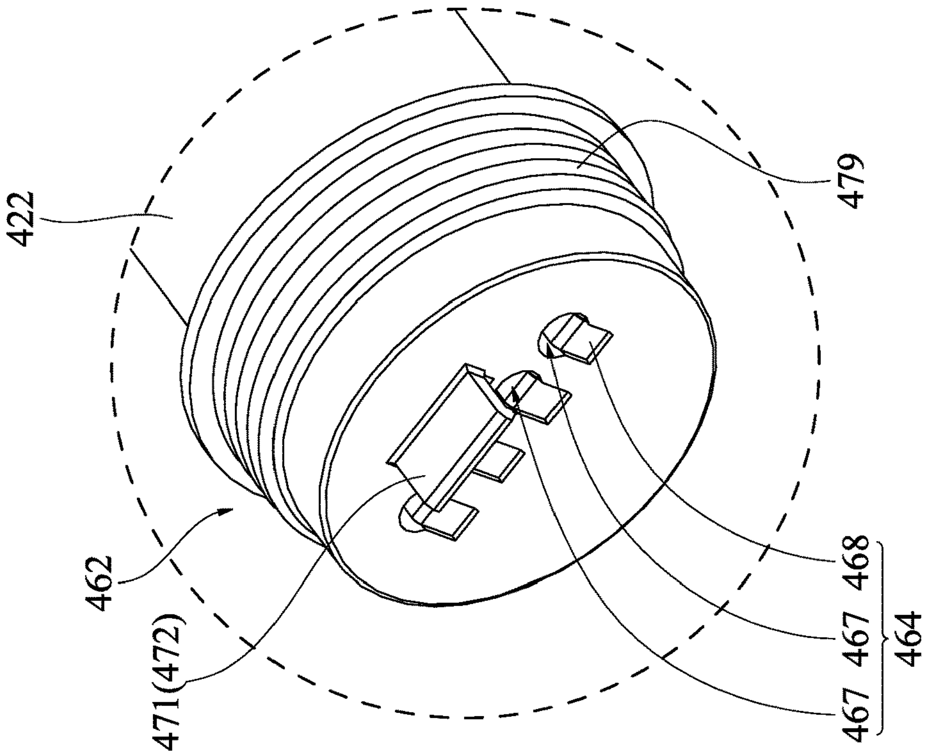
FIGS. 21A and 21B respectively illustrate schematic partial three-dimensional views of a first connection part and a second connection part according to some embodiments of the present disclosure.
Figure 21A:
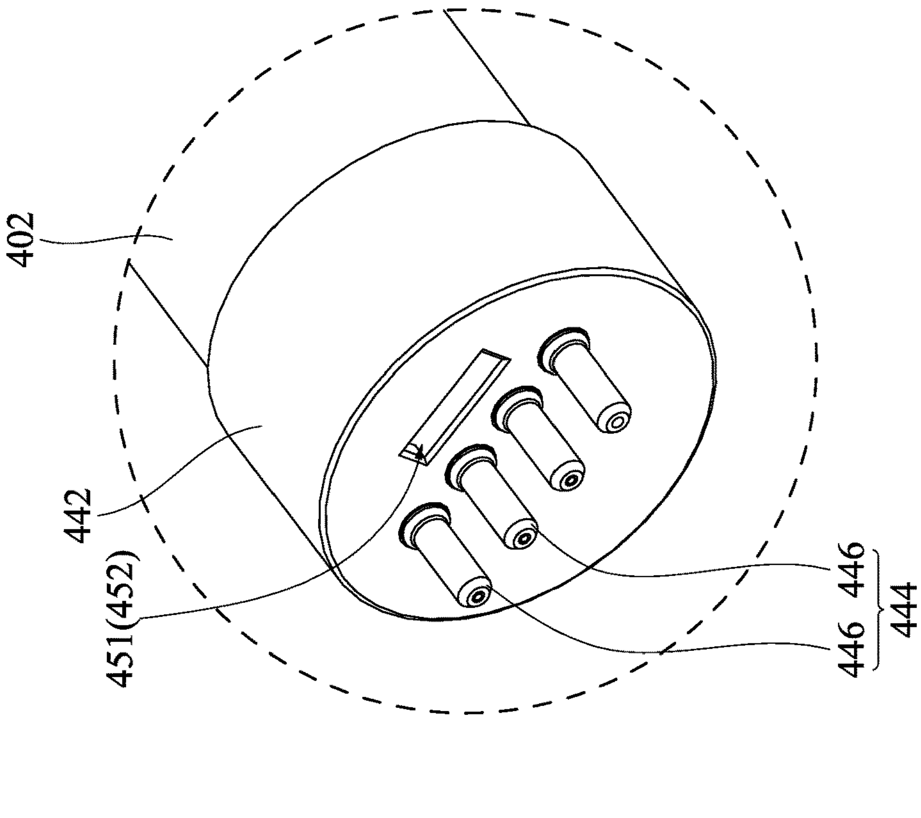

In some embodiments, referring to FIGS. 21A and 21B, the first electrical connection portion 444 comprises a first plug element 446 and the second electrical connection portion 464 comprises a second receptacle element 467 and a second electric conduction element 468. In the embodiments of FIGS. 21A and 21B, there are four first plug elements 446, four second receptacle elements 467 and four second electric conduction elements 468. Thus, the LED tube lamp has four electrical connections between the first member 400 and the second member 420.

In some embodiments, referring to FIGS. 4B and 5B, the first electrical connection portion 444 comprises a plurality of first plug elements 446. The second electrical connection portion 464 comprises a plurality of second plug elements 466. The first plug elements 446 are arranged substantially along a line CLa. For example, the line CLa passes centers of the first plug elements 446. The second plug elements 466 are arranged substantially along a line CLb. For example, the line CLb passes centers of the second plug elements 466.

In some embodiments, referring to FIGS. 4B and 5B, the first electrical connection portion 444 comprises a plurality of first pairs of the first plug element 446 and the first receptacle element 447. The first plug element 446 and the first receptacle element 447 of each first pair are arranged along a first line CL1*a*, CL1*b*, CL1*c*. For example, each of the first lines CL1*a*, CL1*b*, CL1*c* passes through corresponding centers of the first plug element 446 and the first receptacle element 447 of each first pair. The first lines CL1*a*, CL1*b*, CL1*c* are parallel to each other. The second electrical connection portion 464 comprises a plurality second pairs of the second plug element 466 and the second receptacle element 467. The second plug element 466 and the second receptacle element 467 of each second pair are arranged along a second line CL2*a*, CL2*b*, CL2*c*. For example, each of the second lines CL2*a*, CL2*b*, CL2*c* passes though corresponding centers of the second plug element 466 and the second receptacle element 467. The second lines CL2*a*, CL2*b*, CL2*c* are parallel to each other.

In some embodiments, the electrical connection portions 444, 464 are closer to the centers of the walls 441, 461 than the joining portions 452, 472. For example, referring to FIGS. 4B and 5B, the joining portions 452, 472 are located near corresponding outer edges of the walls 441, 461 while the electrical connection portions 444, 464 are located around corresponding centers of the walls 441, 461. In some embodiments, referring to FIGS. 4B and 5B, the four first hook holes 451 surround the first plug elements 446, the first receptacle elements 447 and the first electric conduction element 448. The four second hook elements 471 surround the second plug elements 466, the second receptacle elements 467 and the second electric conduction elements 468. Refer to FIG. 5B. In the embodiments where second hook elements 471 surround the second electrical connection portions 464, the second hook elements 471 provide protection for the second electrical connection portions 464. Specifically, users would not easily touch the second electrical connection portions 464. This could prevent users from getting an electric shock when assembling the first member 400 and the second member 420. Additionally, the second electrical second connection portions 464 are prevented from being damaged by an external force. In some embodiments, the length of at least one of the second hook elements 471 (along the horizontal direction of FIG. 5D) is longer than that of the second plug elements 466 to provide better protections for the second plug elements 466, as shown in FIGS. 5B and 5D.

In some embodiments, referring to FIG. 2, the first end part 412 comprises a first power module 416 and a first electrical connection component 414. The second end part 432 comprises a second power module 436 and a first electrical connection component 434. The electrical connection components 414, 434 are respectively configured to be electrically connected to an external power source(s), for example 220 V AC or 110 V AC. The power modules 416, 436 receive and convert the external power source respectively from the electrical connection components 414, 434 into a driving power to drive LED chips 410, 430 on the LED light strips 408, 428. In some embodiments, the LED tube lamp has single power module 416 or 436. In other words, one of the first and second power modules 416, 436 is removed. The remained power module 416 or 436 provides the driving power to the first and the second LED chips 410, 430.

In some embodiments, please referring to FIGS. 3, 4B and 5B, the first connection part 442 is a single piece component and the second connection part 462 is a single piece component. However, in some embodiments, the first connection part 442 is formed by integrating multiple elements and the second connection part 462 is formed by integrating multiple elements.

Figure 6A:
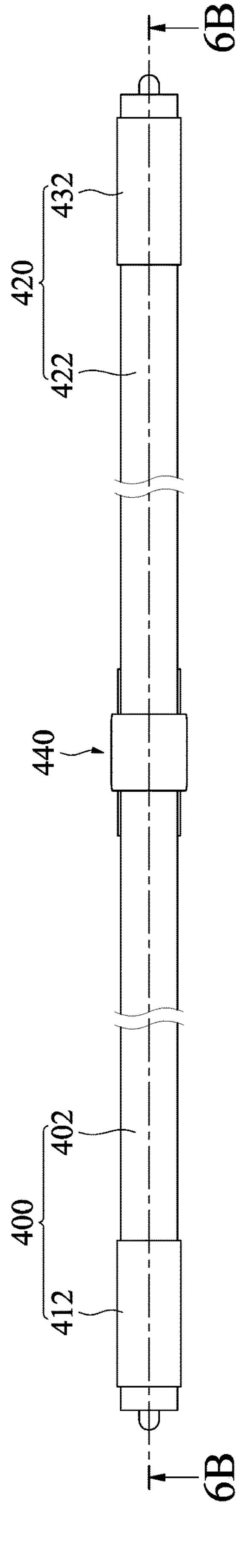
FIG. 6A illustrates a schematic plan view of a LED tube lamp according to some embodiments of the present disclosure.
Figure 6B:
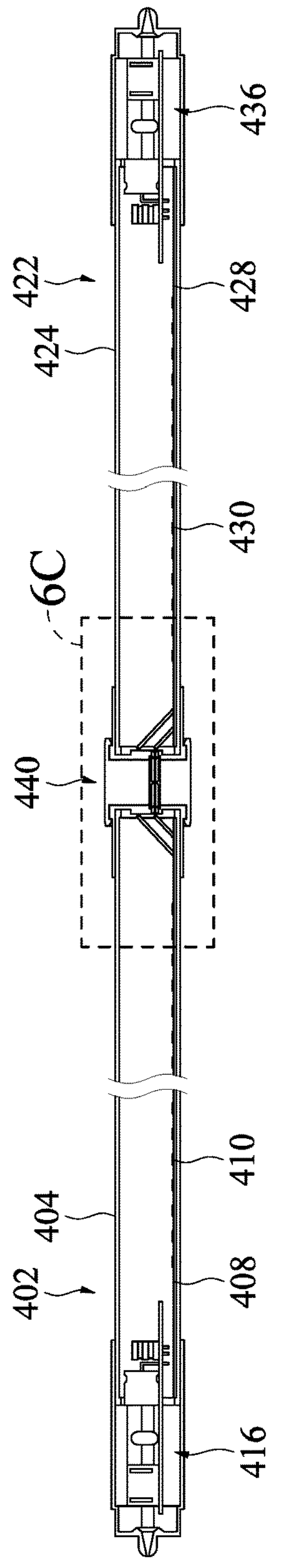
FIG. 6B illustrates a cross-sectional view of the LED tube lamp of FIG. 6A along a section line 6B-6B.
Figure 7A:
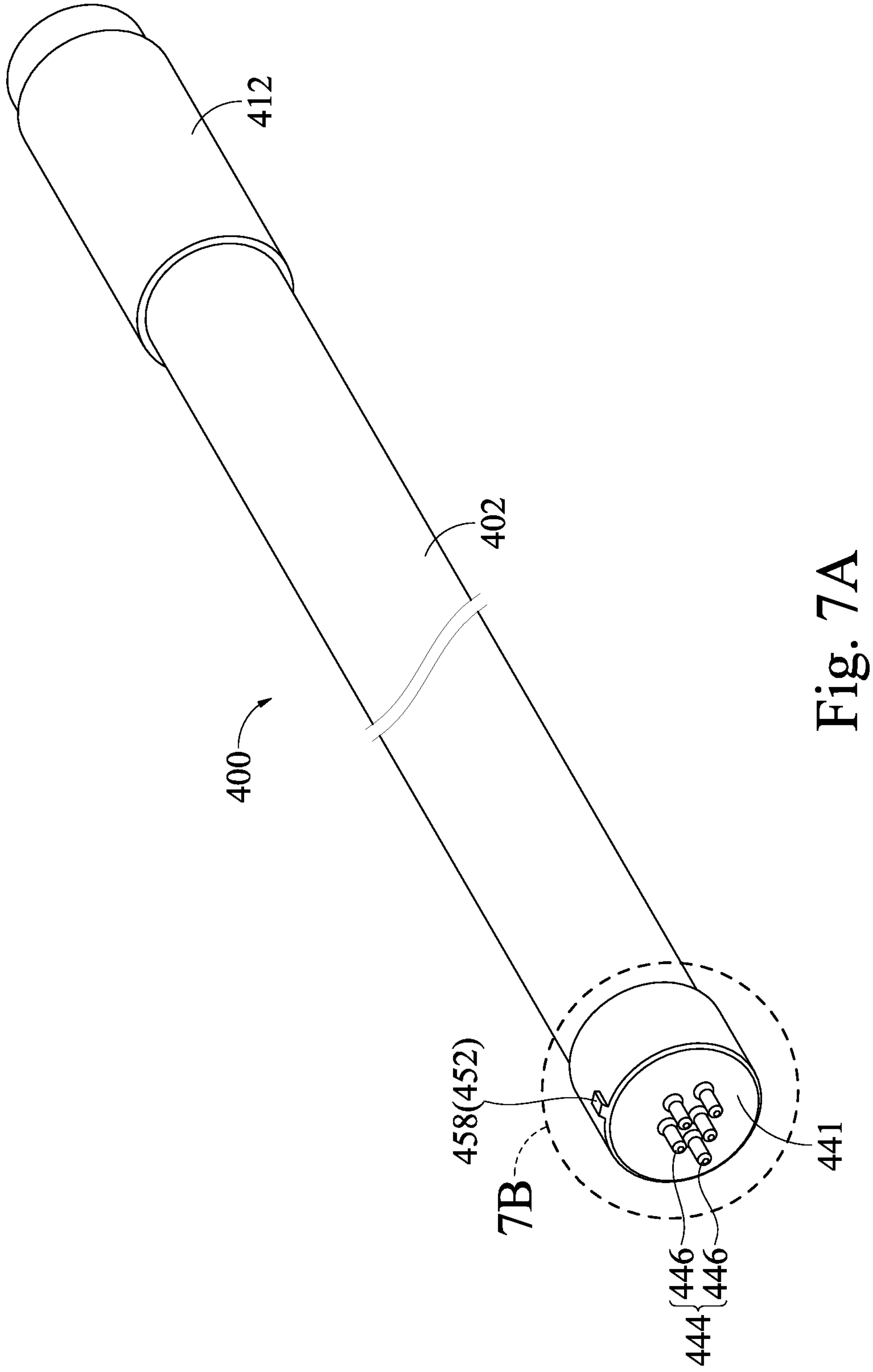
FIG. 7A illustrates a schematic three-dimensional view of a first member and a first connection part according to the embodiments of FIG. 6A.
Figure 8A:
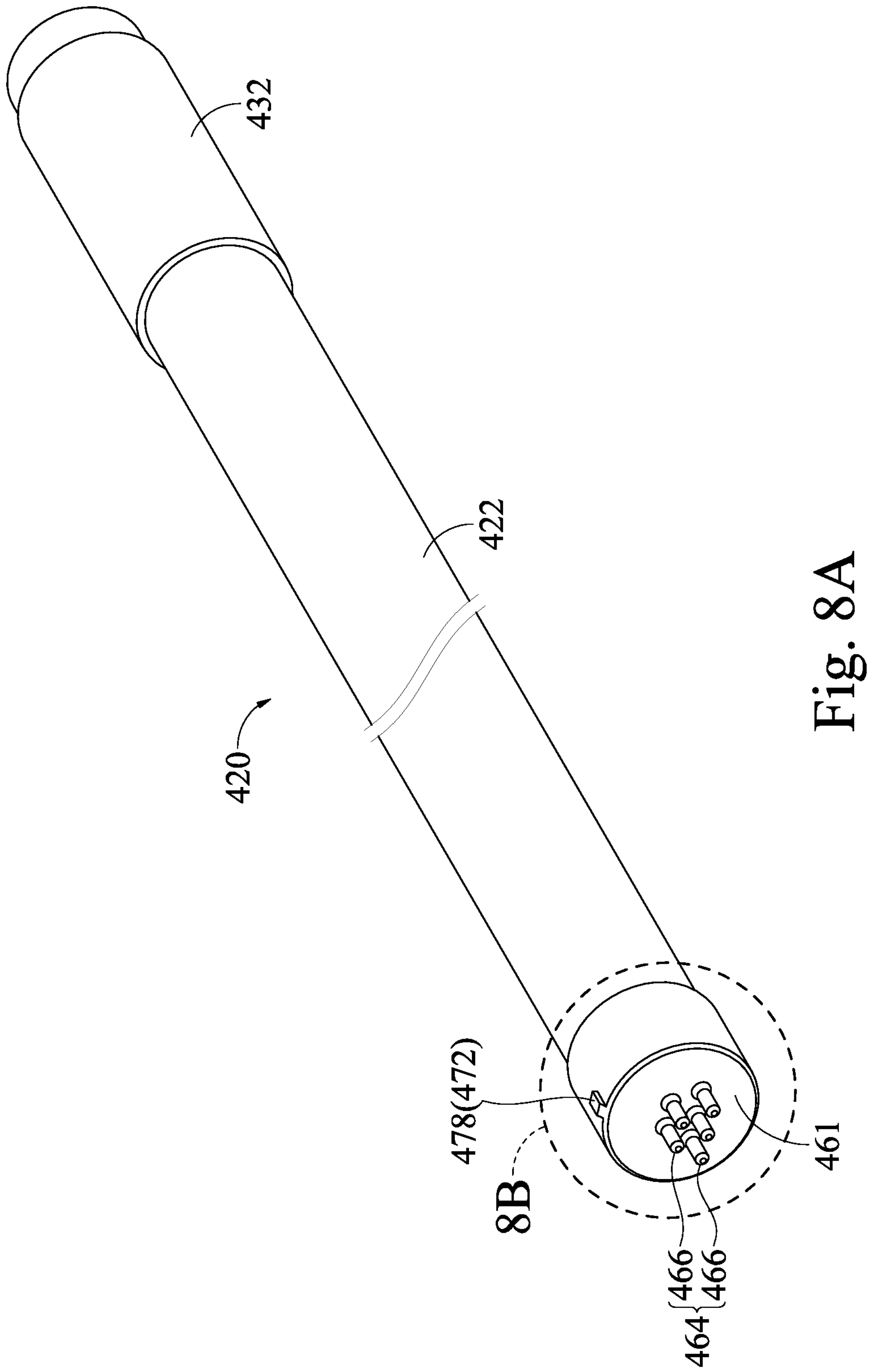
FIG. 8A illustrates a schematic three-dimensional view of a second member and a second connection part according to the embodiments of FIG. 6A.
Figure 9A:
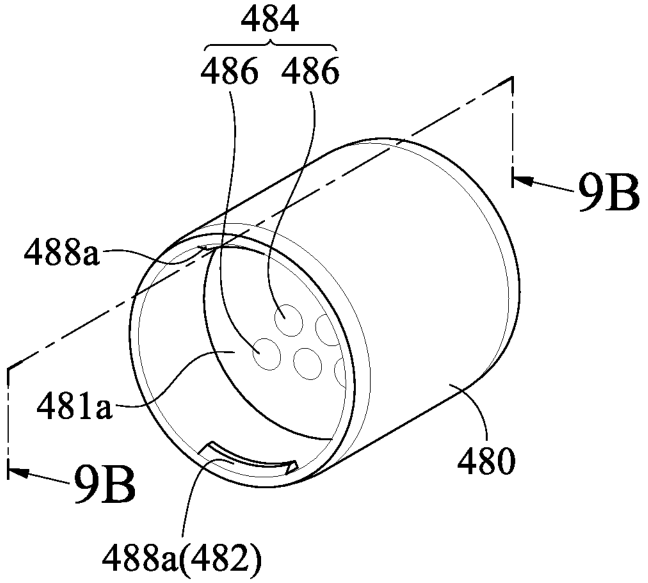
FIG. 9A illustrates a schematic three-dimensional view of a third connection part according to the embodiments of FIG. 6A.

Please refer to FIGS. 6A, 6B, 7A, 8A and 9A. FIG. 6A illustrates a schematic plan view of a LED tube lamp according to some embodiments of the present disclosure. FIG. 6B illustrates a cross-sectional view of the LED tube lamp of FIG. 6A along a section line 6B-6B. FIG. 7A illustrates a schematic three-dimensional view of a first member and a first connection part according to the embodiments of FIG. 6A. FIG. 8A illustrates a schematic three-dimensional view of a second member and a second connection part according to the embodiments of FIG. 6A. FIG. 9A illustrates a schematic three-dimensional view of a third connection part according to the embodiments of FIG. 6A.

In some embodiments, an LED tube lamp comprises a first member 400, a second member 420 and a connection member 440. The first member 400 comprises a first lighting part 402 and a first end part 412. The first end part 412 is disposed at an end of the first lighting part 402. The first lighting part 402 comprises a first LED light strip 408. The second member 420 comprises a second lighting part 422 and a second end part 432. The second end part 432 is disposed at an end of the second lighting part 422. The second lighting part 422 comprises a second LED light strip 428. The connection member 440 comprises a first connection part 442, a second connection part 462 and a third connection part 480. The first connection part 442 is disposed at another end of the first lighting part 402. The second connection part 462 is disposed at another end of the second lighting part 422. The third connection part 480 covers at least a portion of the first connection part 442 and at least a portion of the second connection part 462.

Figure 6C:
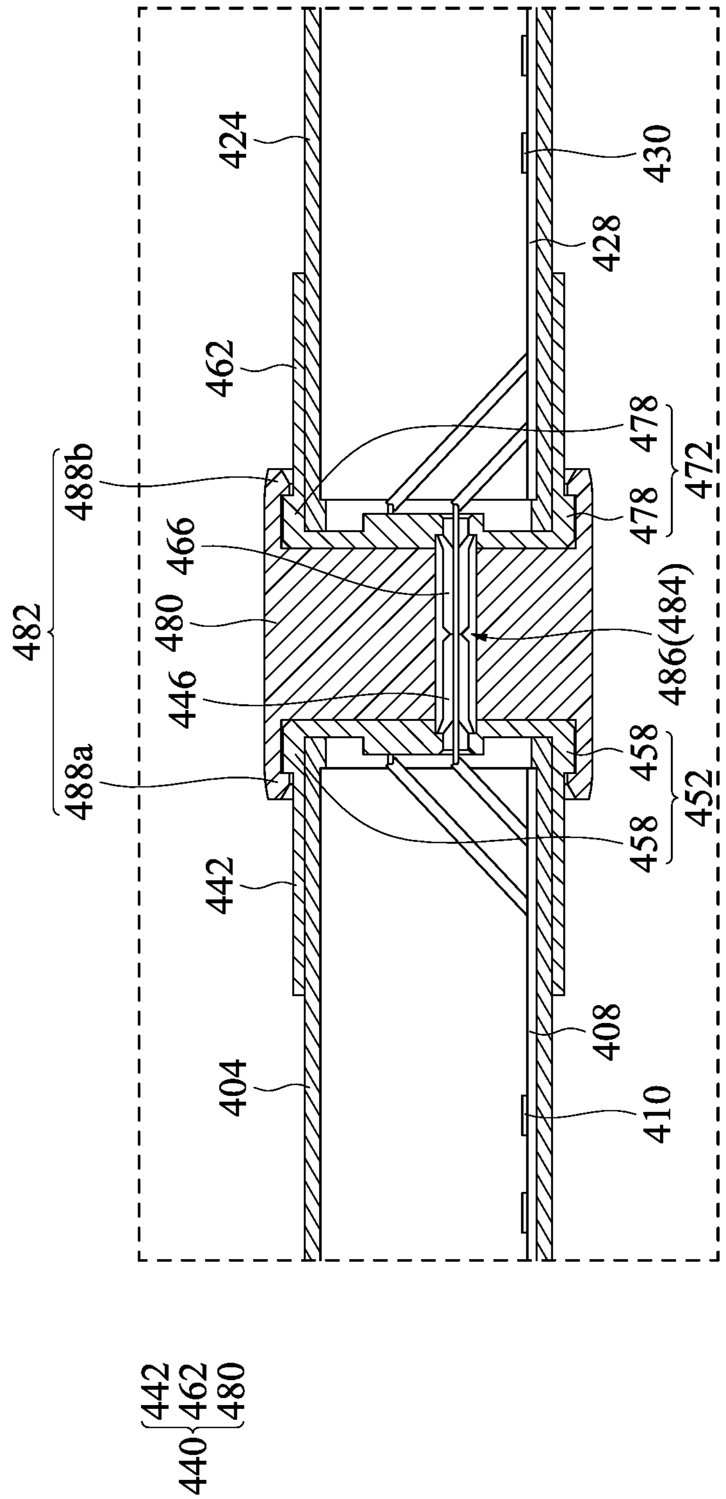
FIG. 6C illustrates a schematic enlarged view of the region 6C shown in FIG. 6B.
Figure 7B:
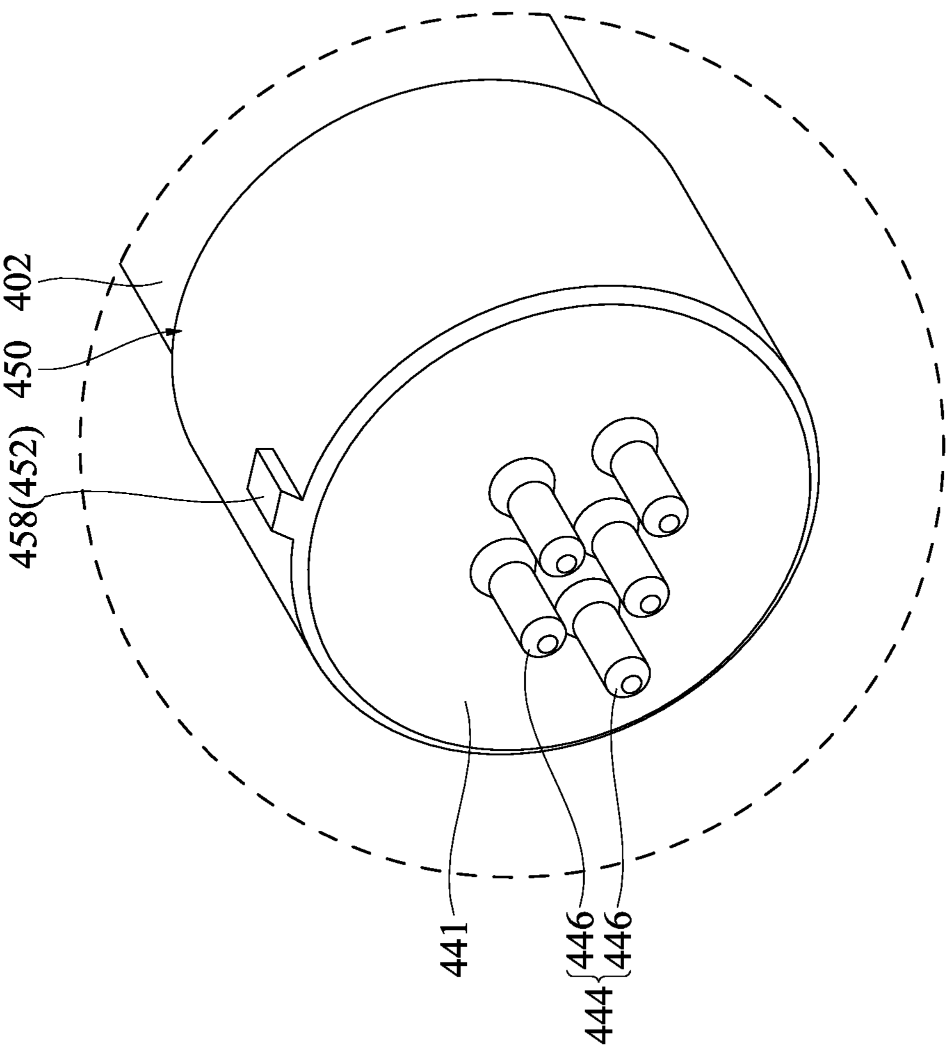
FIG. 7B illustrates a schematic enlarged view of the region 7B shown in FIG. 7A.
Figure 8B:
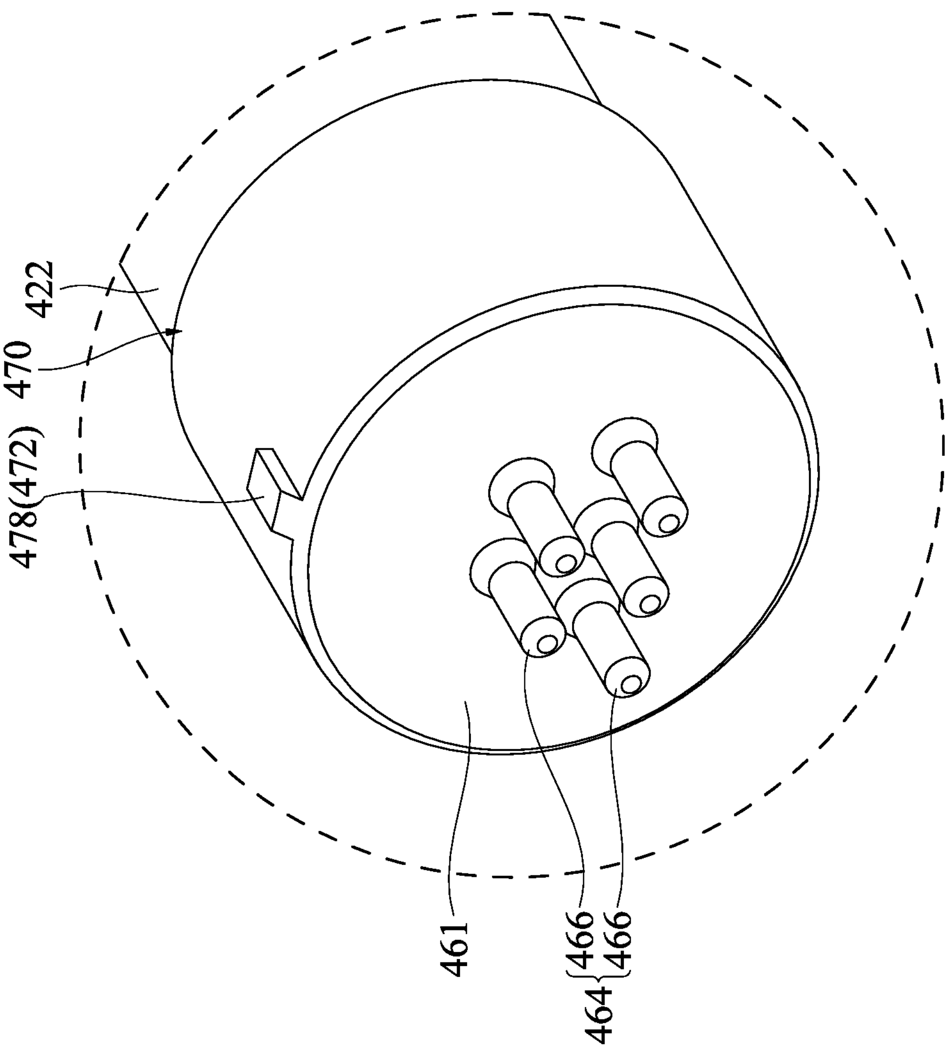
FIG. 8B illustrates a schematic enlarged view of the region 8B shown in FIG. 8A.
Figure 9B:
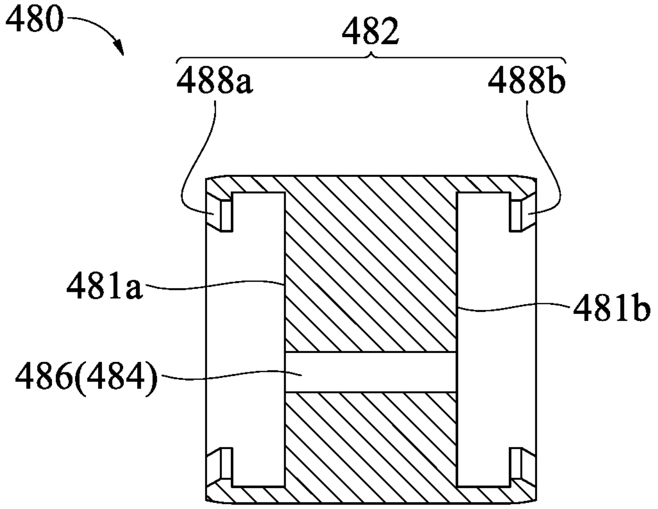
FIG. 9B illustrates a cross-sectional view of the third connection part of FIG. 9A along a section line 9B-9B.

Please refer to FIGS. 6C, 7B, 8B, 9A and 9B. FIG. 6C illustrates a schematic enlarged view of the region 6C shown in FIG. 6B. FIG. 7B illustrates a schematic enlarged view of the region 7B shown in FIG. 7A. FIG. 8B illustrates a schematic enlarged view of the region 8B shown in FIG. 8A. FIG. 9B illustrates a cross-sectional view of the third connection part of FIG. 9A along a section line 9B-9B.

The first connection part 442 comprises a first electrical connection portion 444 and a first joining portion 452. The first electrical connection portion 444 is electrically connected to the first LED light strip 408. The second connection part 462 comprises a second electrical connection portion 464 and a second joining portion 472. The second electrical connection portion 464 is electrically connected to the second LED light strip 428. The third connection part 480 comprises a third electrical connection portion 484 and at least two third joining portions 482. The at least two third joining portions 482 are respectively connected to the first joining portion 452 and the second joining portion 472 to make the first electrical connection portion 444 be electrically connected to the second electrical connection portion 464 via the third electrical connection portion 484 and to make the first member 400 substantially coaxial to the second member 420. The third connection part 480 enhances the connection strength between the first connection part 442 and the second connection part 462.

In some embodiments, the first joining portion 452 comprises a first engaging element 458. The second joining portion 472 comprises a second engaging element 478. The at least two joining portions 482 comprises a first butting element 488*a* and a second butting element 488*b*. The first engaging element 458 is configured to engage with the first butting element 488*a*. The second engaging element 478 is configured to engage with the second butting element 488*b*. The relationship between the engaging elements 458, 478 and the butting elements 488*a*, 488*b* may be a relationship between a protrusion and a hook element like FIG. 6C, or a relationship between a hook element and a recession. When the engaging elements 458, 478 are engaged with the butting elements 488*a*, 488*b*, the engagement makes the first member 400 substantially coaxial to the second member 420.

Please refer to FIG. 9B, the third connection part 480 has a first bottom wall 481*a* and a second bottom wall 481*b* opposite to the first bottom wall 481*a*. Please referring to FIG. 6C as well, the first wall 441 of the first connection part 442 is close to or in contact with the first bottom wall 481*a* of the third connection part 480 when the first engaging element 458 is engaged with the first butting element 488*a*. The second wall 461 of the second connection part 462 is close to or in contact with the second bottom wall 481*b* of the third connection part 480 when the second engaging element 478 is engaged with the second butting element 488*b*.

In some embodiments, referring to FIGS. 9A and 9B, the third connection part 480 has two first butting elements 488*a* and two second butting elements 488*b*. However, the quantity of the first butting elements 488*a* maybe three, four or more. The quantity of the second butting elements 488*b* maybe three, four or more. In the embodiment where the quantity is four, the first and second butting elements 488*a*, 488*b* maybe on the quadrants of two sides of the cylindrical connection part, respectively. However, the distance between adjacent two butting elements 488*a* or 488*b* may be the same as or differ from others.

In some embodiments, referring to FIGS. 7B, 8B and 9B, the first engaging element 458 is nearby the first wall 441 and the second engaging element 478 is nearby the second wall 461. The first butting element 488*a* and the second butting element 488*b* are at two end sides of the third connection part 480 (left and right sides shown in FIG. 9B). Consequently, the connection part 480 covers a portion of the first connection part 442 and a portion of the second connection part 462. However, each of the first engaging element 458 and second engaging element 478 maybe located at different position. For example, the first engaging element 458 may be nearby the back end 450 of the first connection part 442. Consequently, the first connection part 442 is almost fully covered by the third connection part 480. Alternatively, the first engaging element 458 may be at any location of the surface between the first wall 441 and the back end 450 of the first connection part 442. Likewise, the second engaging element 478 may be at the back end 470 of the second connection part 462. Alternatively, the second engaging element 478 may be at any location of the surface between the second wall 461 and the back end 470 of the first connection part 442.

In some embodiments, referring to FIG. 6C, the first electrical connection portion 444 comprises a first plug element 446. The second electrical connection portion 464 comprises a second plug element 466. The third electrical connection portion 484 comprises a sleeve 486. The sleeve 486 is between the at least two third joining portions 482 (488*a*, 488*b*). When the first engaging element 458 is engaged with the first butting element 488*a*, and the second engaging element 478 is engaged with the second butting element 488*b*, the sleeve 486 aligns the first plug element 446 with the second plug element 466 as well as makes the first plug element 446 electrically connected with the second plug element 466. In some embodiments, the sleeve 486 is a through hole formed on the third connection part 480 and has two openings on the first bottom wall 481*a* and the second bottom wall 481*b*, respectively, referring to FIG. 9B. The sleeves 486 maybe either electrically conductive or not. In the embodiments where the sleeves 486 are electric conductive, the sleeve 486 aligns and electrically connects the first plug element 446 with the second plug element 466. The electrical connection between the first plug elements 446 and the second plug elements 466 is ensured. The electrically conductive sleeve may be a through hole formed on the third connection part 480 and the through hole is coated with electrically conductive material. In some embodiments, the third electrical connection portion 484 further comprises an electric conduction piece inside the sleeve 486 for electrically connected the first plug elements 446 with the second plug elements 466. The electric conduction piece is not shown in FIGS. 6C and 9B, but is similar to the element with numeral 487 of FIG. 6D. The electric conduction piece may be a tube, a slit tube or an elongated element made of electrically conductive material and the tube, the slit tube or the elongated element (similar to the element with numeral 487 of FIG. 6D) is disposed in the sleeve 486 in the form of a through hole formed on the third connection part 480.

In some embodiments, the first electrical connection portion 444 comprises a plurality of first plug elements 446. The second electrical connection portion 464 comprises a plurality of second plug elements 466. The third electrical connection portion 484 comprises a plurality of sleeves 486 corresponding to the plurality of first plug elements 446 and the plurality of five second plug elements 466. Please referring to FIGS. 6C and 9B, the first electrical connection portion 444 comprises five first plug elements 446. The second electrical connection portion 464 comprises five second plug elements 466. The third electrical connection portion 484 comprises five sleeves 486 corresponding to the five first plug elements 446 and the five second plug elements 466. The sleeves 486 guide and align the first plug elements 446 and the second plug elements 466, respectively. The length of the sleeve 486 is substantially the same as or a little bit shorter than the total length of each of the first plug elements 446 and the corresponding second plug element 466. Consequently, the first plug elements 446 are, respectively, contact with the second plug elements 466 when the at least two third joining portions 482 are respectively connected to the first joining portion 452 and the second joining portion 472.

Figure 6D:
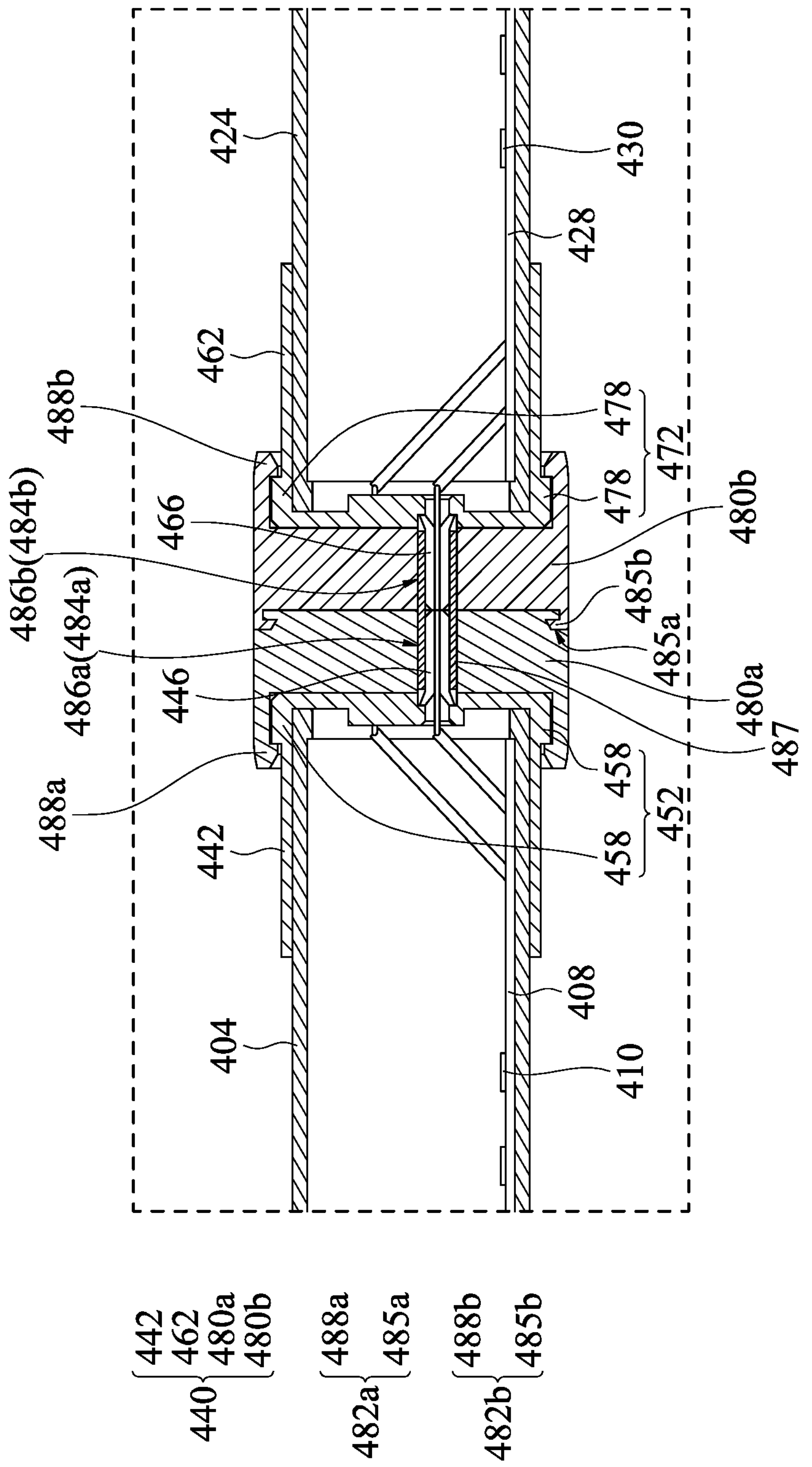
FIG. 6D illustrates a schematic enlarged cross-sectional view of a connection member according to some embodiments of the present disclosure.

Please refer to FIG. 6D which illustrates a schematic enlarged cross-sectional view of a connection member according to some embodiments of present disclosure. FIG. 6D is similar to FIG. 6C. The parts omitted in FIG. 6D are similar to those illustrated in FIGS. 6A-6C, 7B, 8B, 9A and 9B. In some embodiments, an LED tube lamp comprises a first member 400, a second member 420 and a connection member 440. The first member 400 comprises a first lighting part 402 and a first end part 412. The first end part 412 is disposed at an end of the first lighting part 402. The first lighting part 402 comprises a first LED light strip 408. The second member 420 comprises a second lighting part 422 and a second end part 432. The second end part 432 is disposed at an end of the second lighting part 422. The second lighting part 422 comprises a second LED light strip 428. The connection member 440 comprises a first connection part 442, a second connection part 462, a third connection part 480*a* and a fourth connection part 480*b*. The first connection part 442 is disposed at another end of the first lighting part 402. The second connection part 462 is disposed at another end of the second lighting part 422. The third connection part 480*a* covers at least a portion of the first connection part 442 and the fourth connection part 480*b* covers at least a portion of the second connection part 462.

The third connection part 480*a* comprises a third electrical connection portion 484*a* and at least two third joining portions 482*a*. The fourth connection part 480*b* comprises a fourth electrical connection portion 484*b* and at least two fourth joining portions 482*b*. The first joining portion 452, the second joining portion 472, the at least two third joining portions 482*a* and the at least two fourth joining portions 482*b* are joined together to make the first electrical connection portion 444 be electrically connected to the second electrical connection portion 464 via the third electrical connection portion 484*a* and the fourth electrical connection portion 484*b*, and to make the first member 400 substantially coaxial to the second member 420. The third connection part 480*a* and the fourth connection part 480*b* enhance the connection strength between the first connection part 442 and the second connection part 462.

In some embodiments, the at least two third joining portions 482*a* comprise a first butting element 488*a* and a first fixing element 485*a*. The at least two fourth joining portions 482*b* comprise a second butting element 488*b* and a second fixing element 485*b*. The first joining portion 452 comprises a first engaging element 458. The second joining portion 472 comprises a second engaging element 478. The first engaging element 458 is configured to engage with the first butting element 488*a*. The second engaging element 478 is configured to engage with the second butting element 488*b*. The first fixing element 485*a* is configured to be connected with the second fixing element 485*b*. When the engaging elements 458, 478 are engaged with the butting elements 488*a*, 488*b* and the first fixing element 485*a* is connected with the second fixing element 485*b*, the connection (including connection and engagement) makes the first member 400 substantially coaxial to the second member 420. In some embodiments, referring to FIG. 6D, the first fixing element 485*a* and the second fixing element 485*b* are a recession and a hook, respectively.

In some embodiments, the at least two third joining portions 482*a* comprise a plurality of first butting elements 488*a* and a plurality of first fixing elements 485*a*. The at least two fourth joining portions 482*b* comprise a plurality of second butting elements 488*b* and a plurality of second fixing elements 485*b*. The first joining portion 452 comprises a plurality of first engaging elements 458. The second joining portion 472 comprises a plurality of second engaging elements 478. The plurality of first engaging elements 458 is configured to engage with the plurality of first butting element 488*a*. The plurality of second engaging elements 478 is configured to engage with the plurality of second butting elements 488*b*. The plurality of first fixing elements 485*a* is configured to be connected with the plurality of second fixing elements 485*b*. When the plurality of engaging elements is engaged with the plurality of butting elements, and the plurality of first fixing elements is connected with the plurality of second fixing elements, the connection (including connection and engagement) makes the first member 400 substantially coaxial to the second member 420.

In some embodiments, referring to FIG. 6D, the third connection part 480*a* has two first butting elements 488*a* and two first fixing elements 485*a*. The fourth connection part 480*b* has two second butting elements 488*b* and two second fixing elements 485*b*. However, the quantity of the first butting elements 488*a* maybe three, four or more. The quantity of the second butting elements 488*b* maybe three, four or more. The quantity of the first fixing elements 485*a* maybe three, four or more. The quantity of the second fixing elements 485*b* maybe three, four or more.

In some embodiments, the first electrical connection portion 444 comprises a first plug element 446. The second electrical connection portion 464 comprises a second plug element 466. The third electrical connection portion 484*a* comprises a first sleeve 486*a*. The fourth electrical connection portion 484*b* comprises a second sleeve 486*b*. The first sleeve 486*a* corresponds to the second sleeve 486*b*. When the engaging elements 458, 478 are engaged with the butting elements 488*a*, 488*b* and the first fixing element 485*a* is connected with the second fixing element 485*b*, the first sleeve 486*a* and the second sleeve 486*b* align the first plug element 446 with the second plug element 466 as well as make the first plug element 446 electrically connected with the second plug element 466. The first sleeve 486*a*, and the second sleeve 486*b* maybe either electrically conductive or not. In some embodiments, the first and second sleeves 486*a*, 486*b* are through holes formed on the third connection part 480*a* and the fourth connection part 480*b*, respectively. The through holes align the first plug element 446 with the second plug element 466. In the embodiments where the through hole is not electrically conductive, the total length of the first through hole and the second through hole is less than or equal to the total length of the first plug element 446 and the second plug element 466. In some embodiments, the through holes are coated with electrically conductive material to ensure the electrical connection between the first plug element 446 and the second plug element 466.

In some embodiments, referring FIG. 6D, the third connection part 480*a* further comprises an electric conduction piece 487. The first and second sleeves 486*a*, 486*b* are through holes formed on the third connection part 480*a* and the fourth connection part 480*b*, respectively. The electric conduction piece 487 is disposed in the first sleeve 486*a* and the second sleeve 486*b*. The electric conduction piece 487 may be a tube, a slit tube or an elongated element made of electrically conductive material and the tube, the slit tube or the elongated element is disposed in the through holes. Hence, the electric conduction piece 487 electrically connects the first plug element 446 with the second plug element 466 when the first plug element 446 and the second plug element 466 are inserted into the through holes, respectively. In some embodiments, the length of the electric conduction piece 487 is equal to or longer than any of the lengths of the first plug element 446 and the second plug element 466 to make sure the electrical connection among the electric conduction piece 487, the first plug element 446 and the second plug element 466.

Similar to embodiments of FIG. 6C, in the embodiments of FIG. 6D, the first electrical connection portion 444 may comprise a plurality of the first plug elements 446. The second electrical connection portion 464 may comprise a plurality of the second plug elements 466. The third electrical connection portion 484*a* may comprise a plurality of the first sleeves 486*a* corresponding to the plurality of the first plug elements 446. The fourth electrical connection portion 484*b* may comprise a plurality of the second sleeves 486*b* corresponding to the plurality of the second plug elements 466. In some embodiments the third connection part 480*a* may comprise a plurality of the electric conduction pieces 487.

Figure 10A:
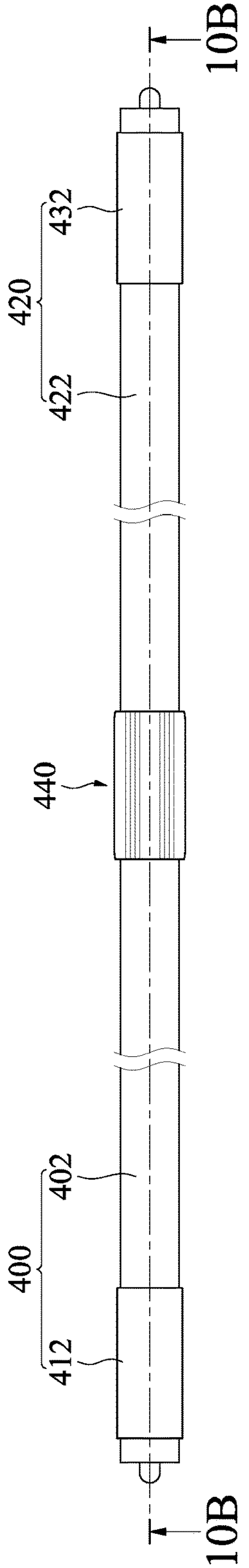
FIG. 10A illustrates a schematic plan view of a LED tube lamp according to some embodiments of the present disclosure.
Figure 10B:
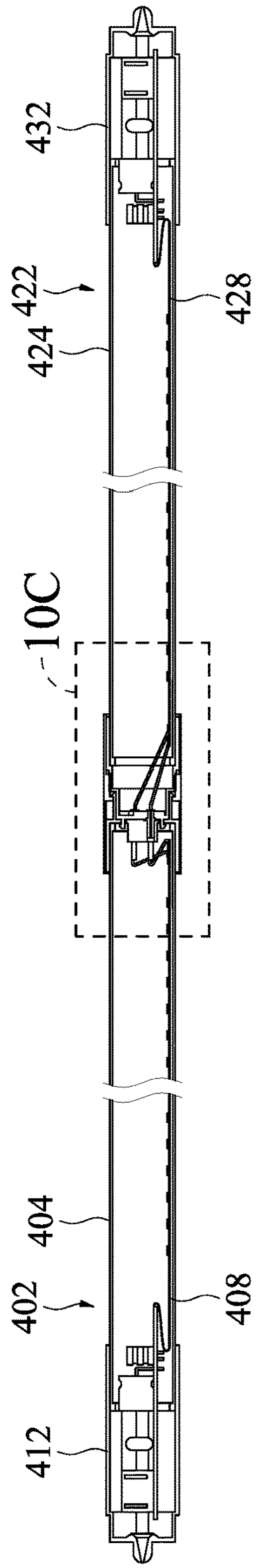
FIG. 10B illustrates a cross-sectional view of the LED tube lamp of FIG. 10A along a section line 10B-10B.
Figure 11A:
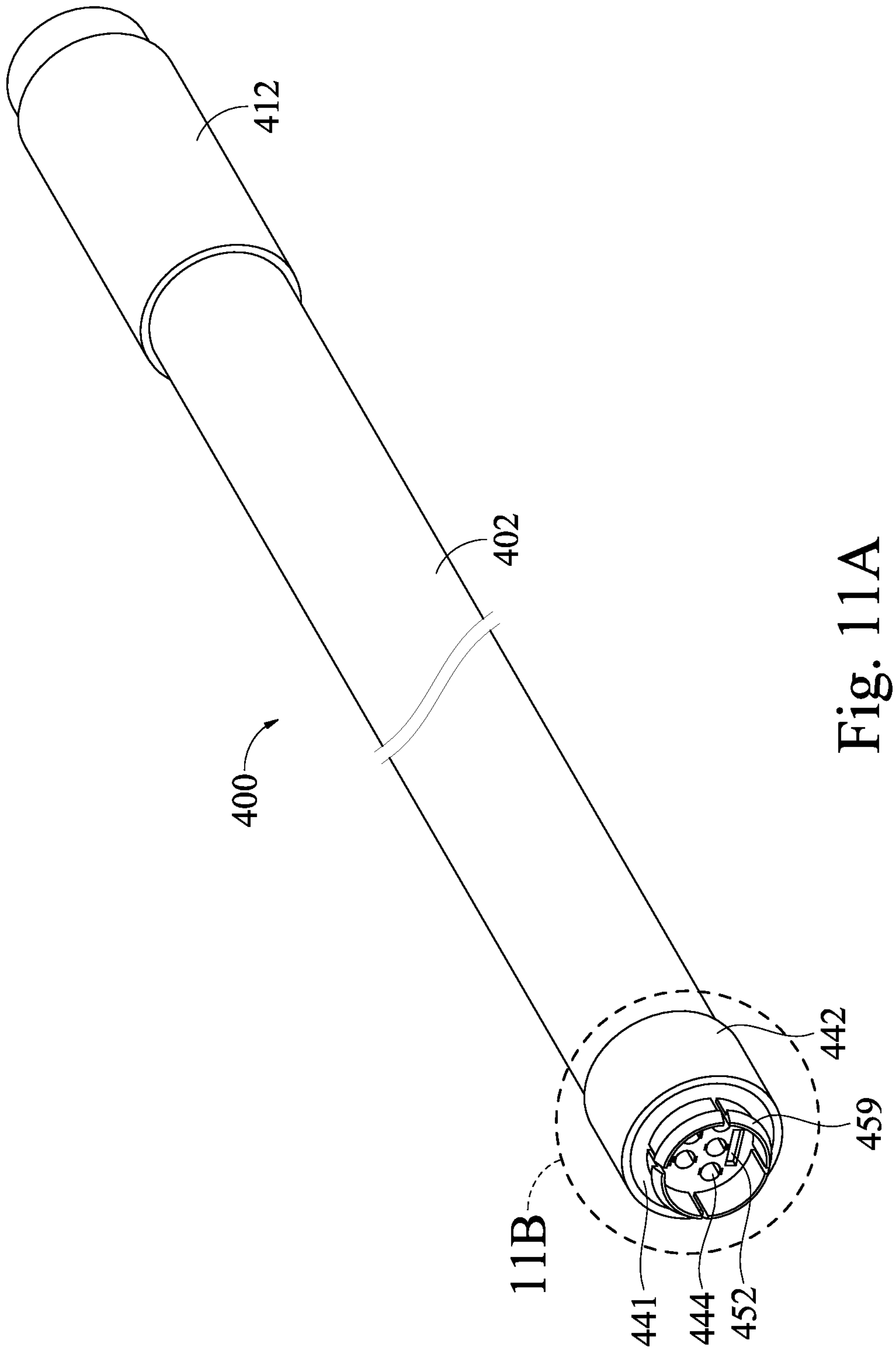
FIG. 11A illustrates a schematic three-dimensional view of a first member and a first connection part according to the embodiments of FIG. 10A.
Figure 12A:
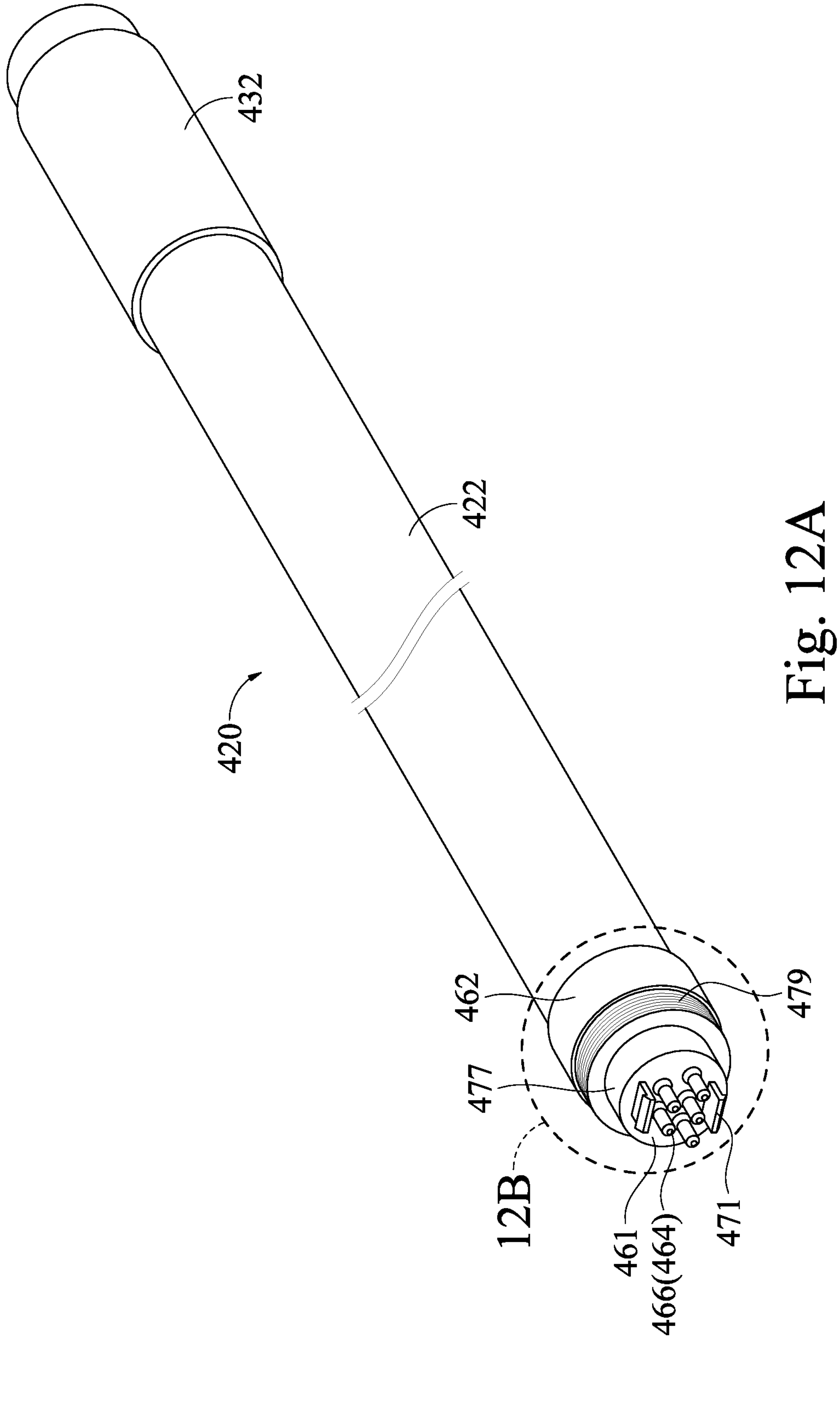
FIG. 12A illustrates a schematic three-dimensional view of a second member and a second connection part according to the embodiments of FIG. 10A.
Figure 13:
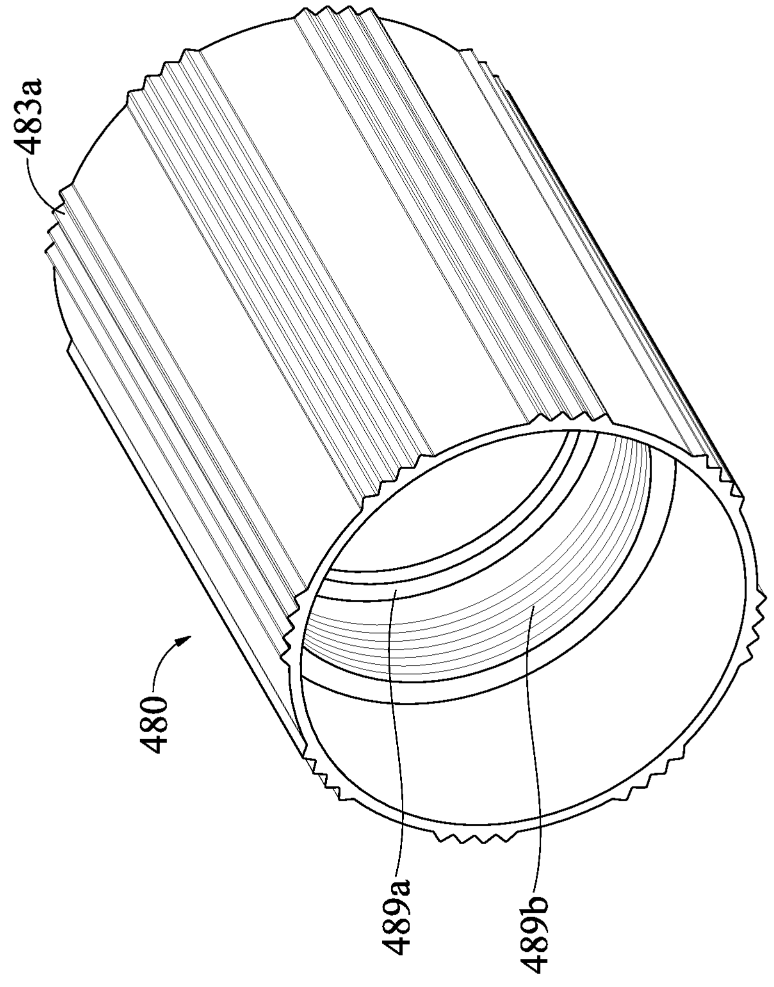
FIG. 13 illustrates a schematic three-dimensional view of a third connection part according to the embodiments of FIG. 10A.

Please refer to FIGS. 10A, 10B, 11A, 12A and 13. FIG. 10A illustrates a schematic plan view of a LED tube lamp according to some embodiments of the present disclosure. FIG. 10B illustrates a cross-sectional view of the LED tube lamp of FIG. 10A along a section line 10B-10B. FIG. 11A illustrates a schematic three-dimensional view of a first member and a first connection part according to the embodiments of FIG. 10A. FIG. 12A illustrates a schematic three-dimensional view of a second member and a second connection part according to the embodiments of FIG. 10A. FIG. 13 illustrates a schematic three-dimensional view of a third connection part according to the embodiments of FIG. 10A.

In some embodiments, an LED tube lamp comprises a first member 400, a second member 420 and a connection member 440. The first member 400 comprises a first lighting part 402 and a first end part 412. The first end part 412 is disposed at an end of the first lighting part 402. The first lighting part 402 comprises a first LED light strip 408. The second member 420 comprises a second lighting part 422 and a second end part 432. The second end part 432 is disposed at an end of the second lighting part 422. The second lighting part 422 comprises a second LED light strip 428. The connection member 440 comprises a first connection part 442, a second connection part 462 and a third connection part 480. The first connection part 442 is disposed at another end of the first lighting part 402. The second connection part 462 is disposed at another end of the second lighting part 422.

Figure 10C:
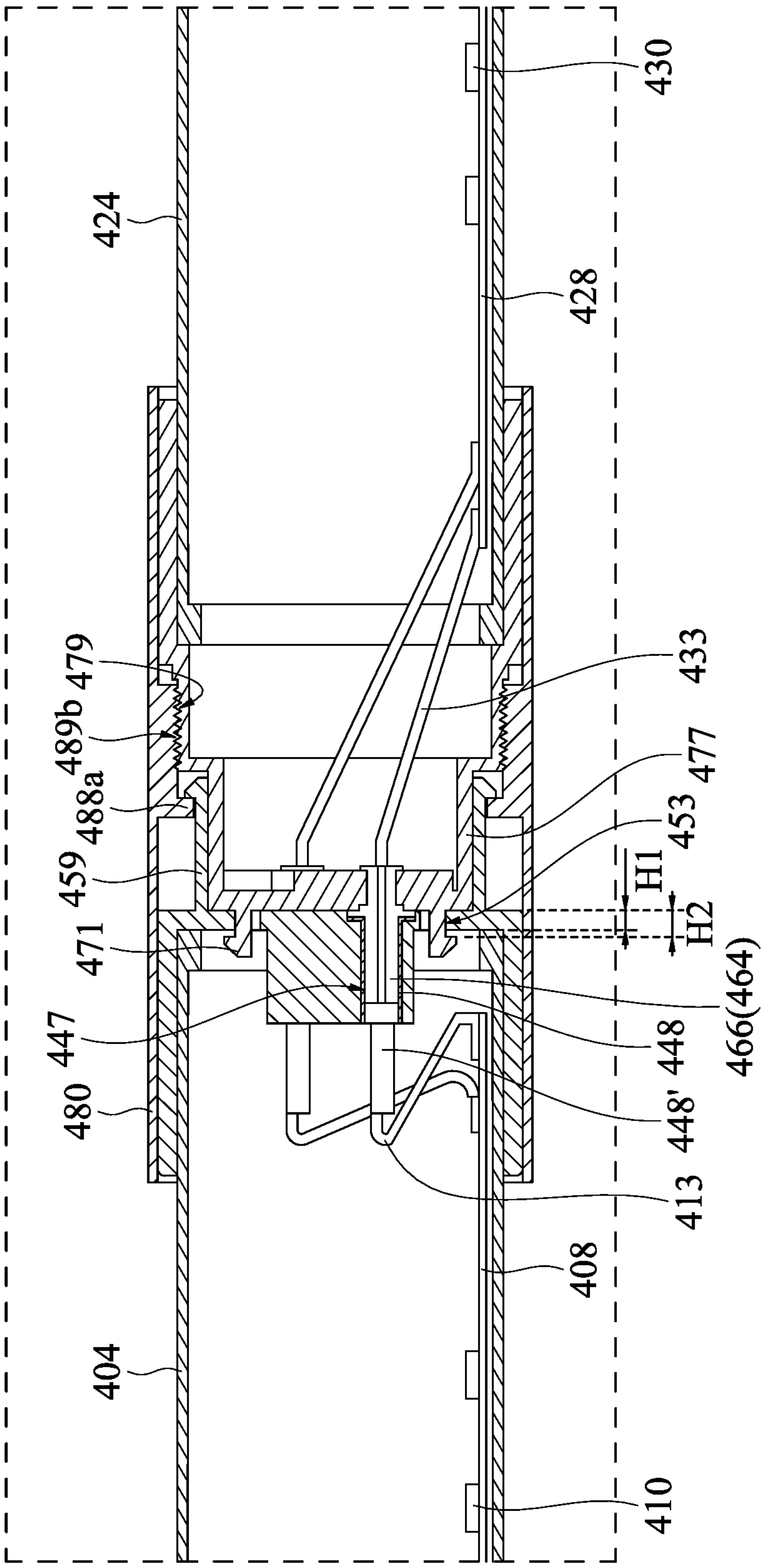
FIG. 10C illustrates a schematic enlarged view of the region 10C shown in FIG. 10B.
Figure 11B:
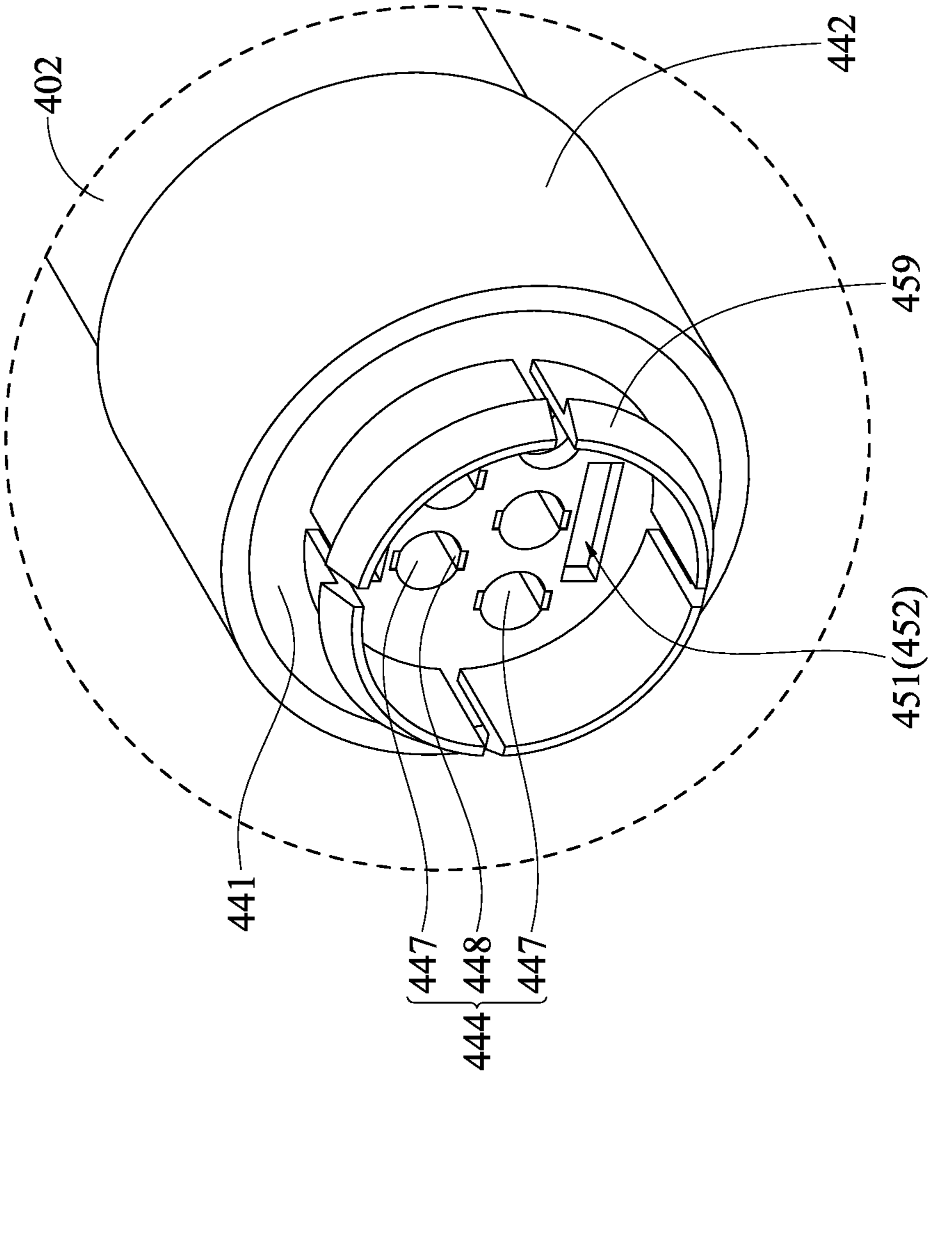
FIG. 11B illustrates a schematic enlarged view of the region 11B shown in FIG. 10A.
Figure 12B:
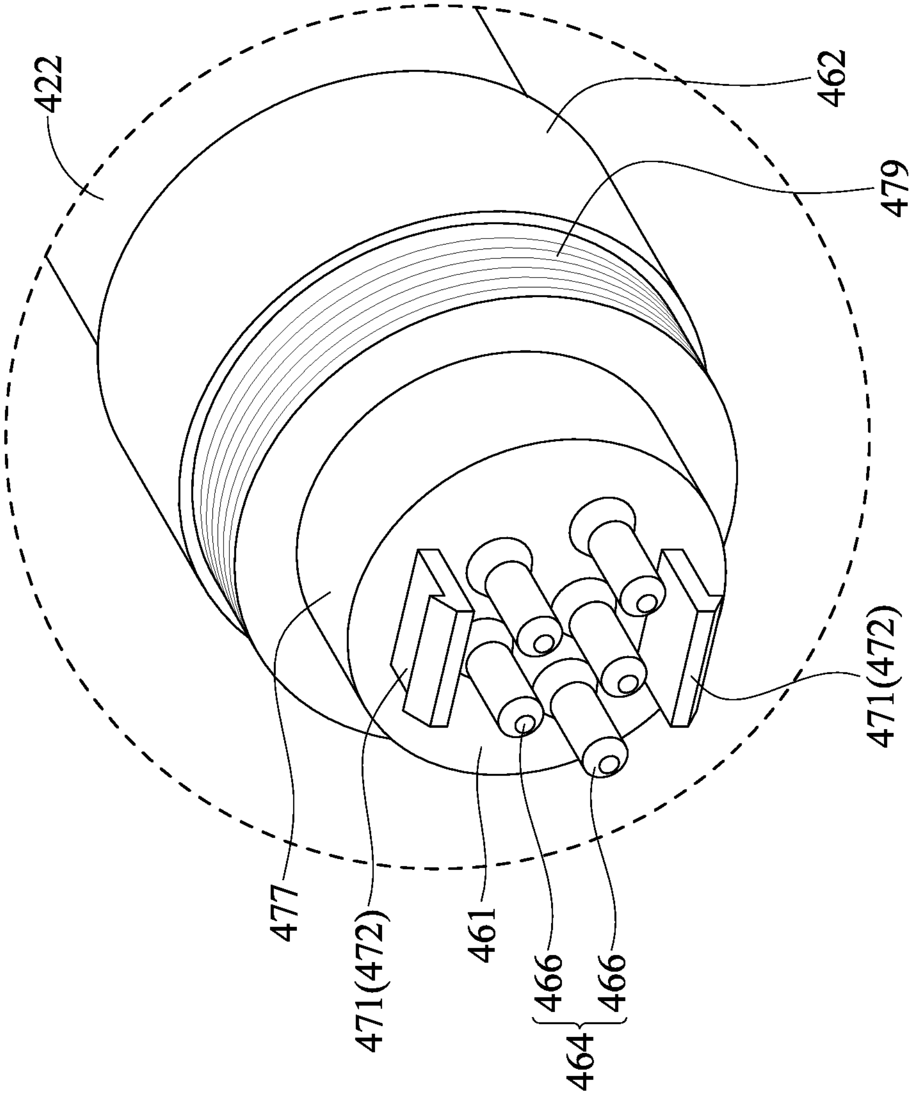
FIG. 12B illustrates a schematic enlarged view of the region 12B shown in FIG. 12A.

Please refer to FIGS. 10C, 11B, 12B and 13. FIG. 10C illustrates a schematic enlarged view of the region 10C shown in FIG. 10B. FIG. 11B illustrates a schematic enlarged view of the region 11B shown in FIG. 10A. FIG. 12B illustrates a schematic enlarged view of the region 12B shown in FIG. 12A.

The first connection part 442 comprises a first electrical connection portion 444 and a first abutting portion 459. The first electrical connection portion 444 is electrically connected to the first LED light strip 408. The second connection part 462 comprises a second electrical connection portion 464 and a first fastening portion 479. The second electrical connection portion 464 is electrically connected to the second LED light strip 428. The second electrical connection portion 464 is configured to be electrically connected with the first electrical connection portion 444. The third connection part 480 comprises a second abutting portion 489*a* and a second fastening portion 489*b*. The second fastening portion 489*b* is configured to be fastened to the first fastening portion 479 to make the first abutting portion 459 abut against the second abutting portion 489*a*. When the second fastening portion 489*b* is fastened to the first fastening portion 479 to make the second abutting portion 489*a* abut against the first abutting portion 459, the second electrical connection portion 464 is electrically connected with the first electrical connection portion 444 and the first member 400 is substantially coaxial to the second member 420. In some embodiments, the distance between the first wall 441 and the second wall 461 is not greater than 5 mm when the second fastening portion 489*b* is fastened to the first fastening portion 479.

The longer the distance between the first wall 441 and the second wall 461, the longer the third connection part 480 and the longer the third dark section. The longer the third dark section does worsen visual lighting effect and increases production costs.

In some embodiments, referring to FIGS. 10C, 11B and 12B, the first fastening portion 479 is a male thread while the second fastening portion 489*b* is a female thread. The first abutting portion 459 comprises a plurality of hook elements. The hook elements are arranged substantially along a circle on the first wall 441 and surround the first electrical connection portion 444 and the first joining portion 452. The hook elements are spaced from each other. The gaps between two adjacent hook elements may be the same or different. The hook directions of the hook elements are radially outward. The second abutting portion 489*a* is an inner flange. When the first connection part 442 is inserted into the left side of the third connection part 480 (left side of FIG. 10C), the hook elements will be radially inwardly pressed by the inner flange and the gaps between two adjacent hook elements make the first abutting portion 459 more easily inserted into the inner flange (the second abutting portion 489*a*). Then, when the second fastening portion 489*b* is fastened to the first fastening portion 479, the flange abuts the hook elements (the first abutting portion 459) to gradually make the first wall 441 close to the second wall 461. In some embodiments, the second joining portion 472 further comprises a neck portion 477, referring to FIG. 12B. The inner diameter of the hook elements is substantially the same as or a little bit greater than the outer diameter of the neck portion 477. Accordingly, when a user assembles the first connection part 442 and the second connection part 462, the neck portion 477 and the hook elements become guiding elements.

In some embodiments, the first electrical connection portion 444 comprises a first receptacle element 447. The second electrical connection portion 464 comprises a second plug element 466. The second plug element 466 extends along the length direction of the second member 420. The first receptacle element 447 is configured to be plugged with the second plug element 466. The second plug element 466 maybe an electric conduction pin and the first receptacle element 447 maybe an electric conduction hole. Accordingly, the first receptacle element 447 is electrically connected with the second plug element 466 when the second fastening portion 489*b* is fastened to the first fastening portion 479. In the some embodiments, referring to FIGS. 11B and 12B, the first electrical connection portion 444 comprises five first receptacle elements 447. The second electrical connection portion 464 comprises five second plug elements 466. The first receptacle elements 447 are respectively electrically connected with the second plug elements 466 when the second fastening portion 489*b* is fastened to the first fastening portion 479. In some embodiment, the first receptacle elements 447 are electrically connected with the first LED light strip 408, respectively. The second plug elements 466 are electrically connected with the second LED light strip 428, respectively. Thus, the quantity of electrical connections in the embodiments is five.

In some embodiments, the first electrical connection portion 444 further comprises a first electric conduction element 448 electrically connected with the first receptacle element 447. Referring to FIG. 11B, the first electric conduction element 448 is disposed inside the first receptacle element 447. Hence, the first electric conduction element 448 enhances the electrical connection between the first receptacle element 447 and the second plug element 466. In some embodiments, referring to 10C, the first electrical connection portion 444 further comprises another first electric conduction element 448' (or called as second electric conduction element). The another first electric conduction element 448' is disposed at the end of the first receptacle element 447 opposite to the end into which the second plug element 466 is inserted. The another first electric conduction element 448' is electrically connected to the first LED light strip 408. Consequently, when the second plug element 466 is inserted into the first receptacle element 447, the electrical connection could be established by the contact between the second plug element 466 with any of the first receptacle element 447, the first electric conduction element 448 and the another electric conduction element 448'. This ensures the electrical connection between the first member 400 and the second member 420. In some embodiments, the first receptacle element 447 is electrically connected with the first LED light strip 408 via the first electric conduction element 448 and a first conductive wire 413. In some embodiments where the first electrical connection portion 444 comprises the first electric conduction element 448 or the another first electric conduction element 448', the first electrical connection portion 444 per se maybe not electrically conductive. In some embodiments, the another first electric conduction element 448' may be implemented in the embodiments shown in FIGS. 3, 6C, 14C, 19C, 21A and 21B.

In some embodiments, the first electrical connection portion 444 comprises plug elements and the second electrical connection portion comprises receptacle elements (not shown on FIGS. 11B and 12B, but could refer to the relationship between elements 471 and 466 of FIG. 5B). In this embodiments, the length of one of the hook elements (first abutting portion 459) along the length direction of the first member 400 maybe longer than that of the plug elements. Consequently, the plug elements are protected by the first abutting portion 459 which surrounds the plug elements.

In some embodiments, referring to FIGS. 10C, 11B and 12B, the first connection part 442 further comprises a first joining portion 452. The second connection part 462 further comprises a second joining portion 472. The first joining portion 452 is configured to connect with the second joining portion 472. When a user assembles the LED tube lamp, the user could firstly connect the first joining portion 452 with the second joining portion 472 and then fasten the first fastening portion 479 with the second fastening portion 489*b* to make the first abutting portion 459 abut against the second abutting portion 489*a*. In some embodiments, the first joining portion 452 comprises a plurality of first hook holes 451 and the second joining portion 472 comprises a plurality of second hook elements 471. The plurality of second hook elements is hooked to the plurality of first hook holes 451, respectively. In the embodiments with the fastening portions

479, 489*b*, referring to FIG. 10C, the first joining portion 452 may be connected with the second joining portion 472 in a loosening manner when the first fastening portion 479 is fastened to the second fastening portion 489*b*. Specifically, as shown in FIG. 10C, the distance H2 from the hook portion of the second hook element 471 to the second wall 461 is greater than the depth H1 of the first hook hole 451.

In some embodiments, the third connection part 480 has a rough surface. For example, referring to FIG. 13, the third connection part 480 has ridges 483*a* or grooves on the outer surface thereof. The ridges 483*a* extend along the length direction of the third connection part 480. Consequently, the friction between the third connection part 480 and the hand of a user is increased.

Figure 14A:
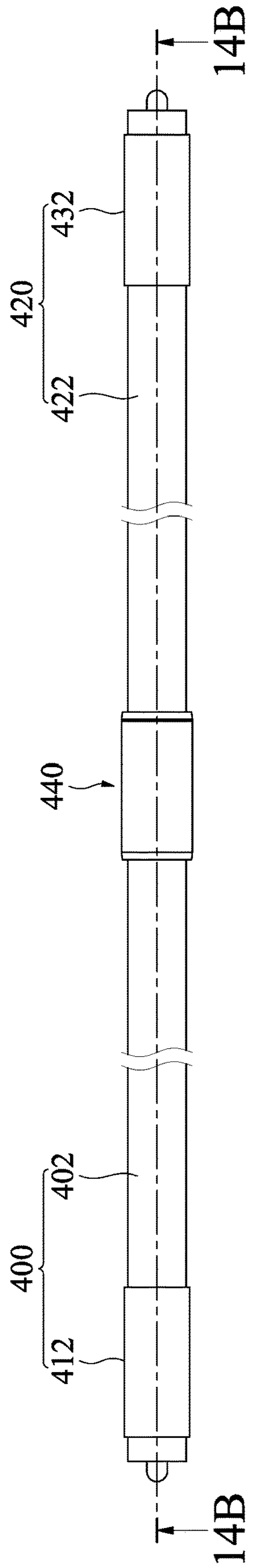
FIG. 14A illustrates a schematic plan view of a LED tube lamp according to some embodiments of the present disclosure.
Figure 14B:
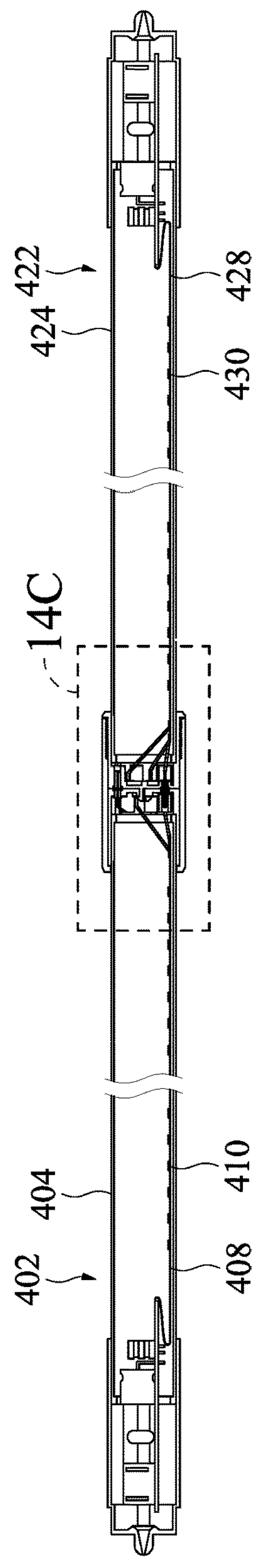
FIG. 14B illustrates a cross-sectional view of the LED tube lamp of FIG. 14A along a section line 14B-14B.
Figure 15A:
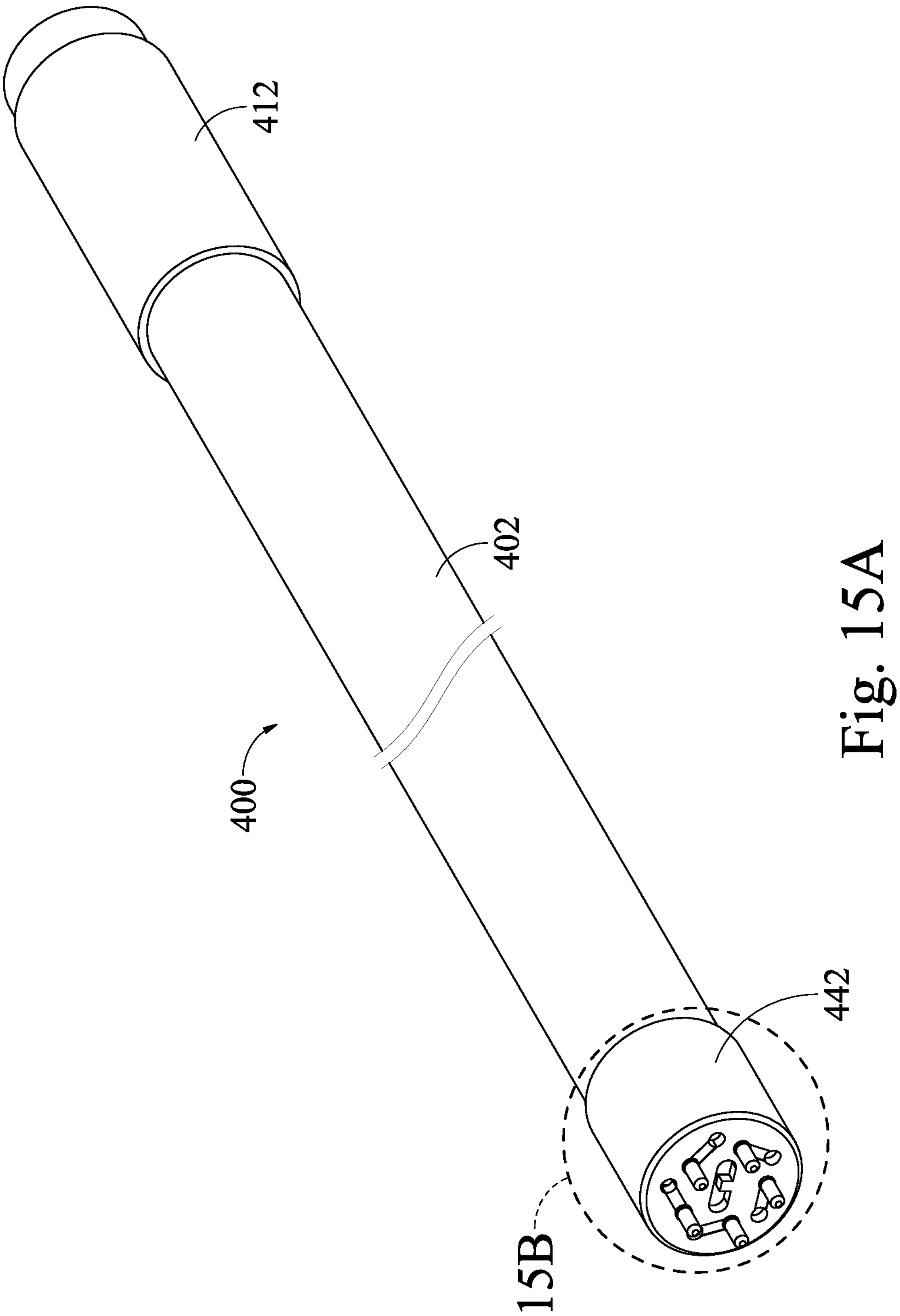
FIG. 15A illustrates a schematic three-dimensional view of a first member and a first connection part according to the embodiments of FIG. 14A.
Figure 16A:
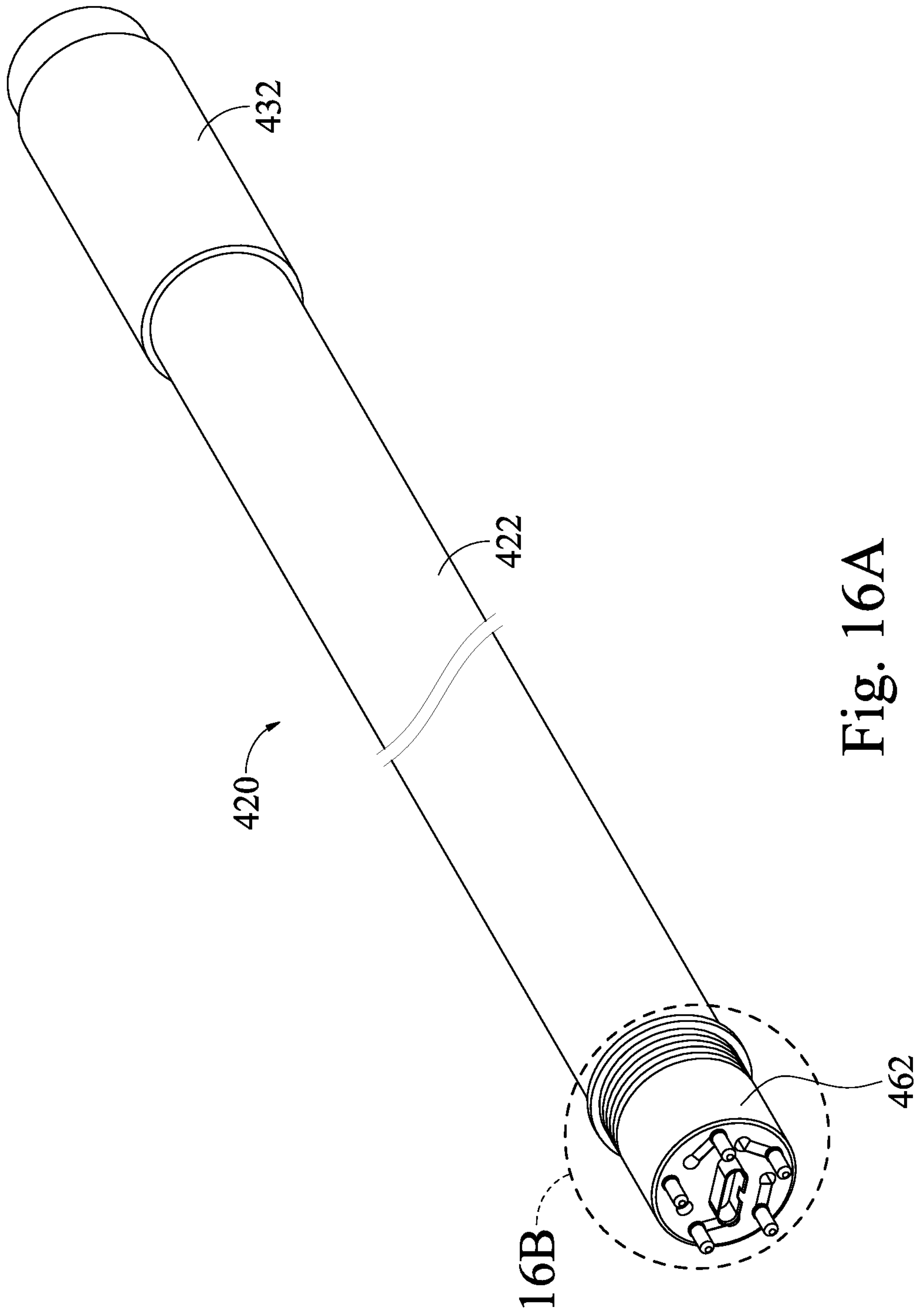
FIG. 16A illustrates a schematic three-dimensional view of a second member and a second connection part according to the embodiments of FIG. 14A.
Figure 18A:
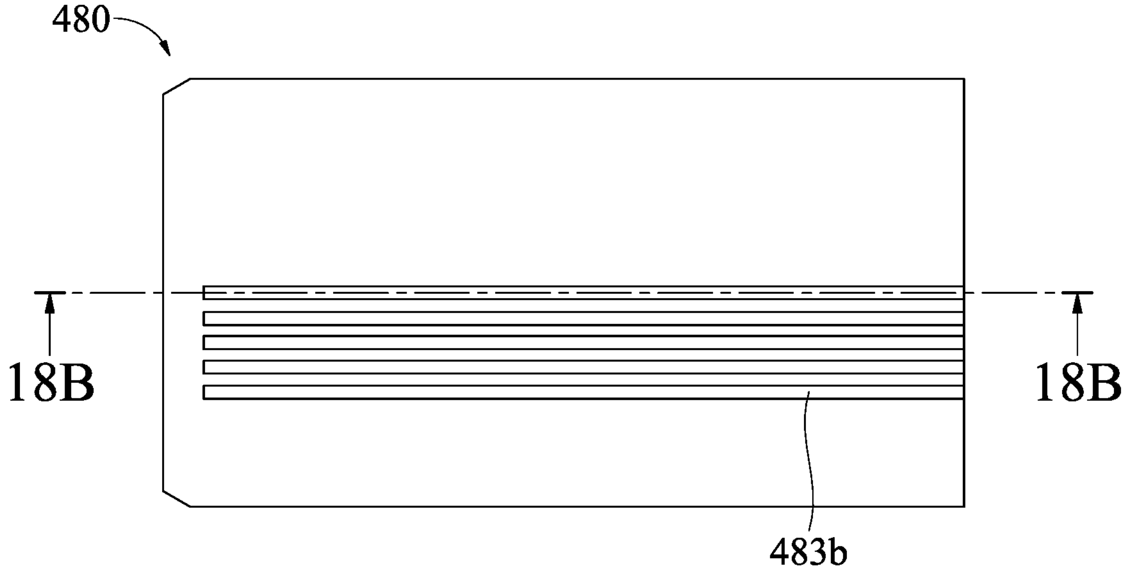
FIG. 18A illustrates a schematic three-dimensional view of a third connection part according to the embodiments of FIG. 14A.

Please refer to FIGS. 14A, 14B, 15A, 16A and 18A. FIG. 14A illustrates a schematic plan view of a LED tube lamp according to some embodiments of the present disclosure. FIG. 14B illustrates a cross-sectional view of the LED tube lamp of FIG. 14A along a section line 14B-14B. FIG. 15A illustrates a schematic three-dimensional view of a first member and a first connection part according to the embodiments of FIG. 14A. FIG. 16A illustrates a schematic three-dimensional view of a second member and a second connection part according to the embodiments of FIG. 14A. FIG. 18A illustrates a schematic three-dimensional view of a third connection part according to the embodiments of FIG. 14A.

In some embodiments, an LED tube lamp comprises a first member 400, a second member 420 and a connection member 440. The first member 400 comprises a first lighting part 402 and a first end part 412. The first end part 412 is disposed at an end of the first lighting part 402. The first lighting part 402 comprises a first LED light strip 408. The second member 420 comprises a second lighting part 422 and a second end part 432. The second end part 432 is disposed at an end of the second lighting part 422. The second lighting part 422 comprises a second LED light strip 428. The connection member 440 comprises a first connection part 442, a second connection part 462 and a third connection part 480. The first connection part 442 is disposed at another end of the first lighting part 402. The second connection part 462 is disposed at another end of the second lighting part 422.

Figure 14C:
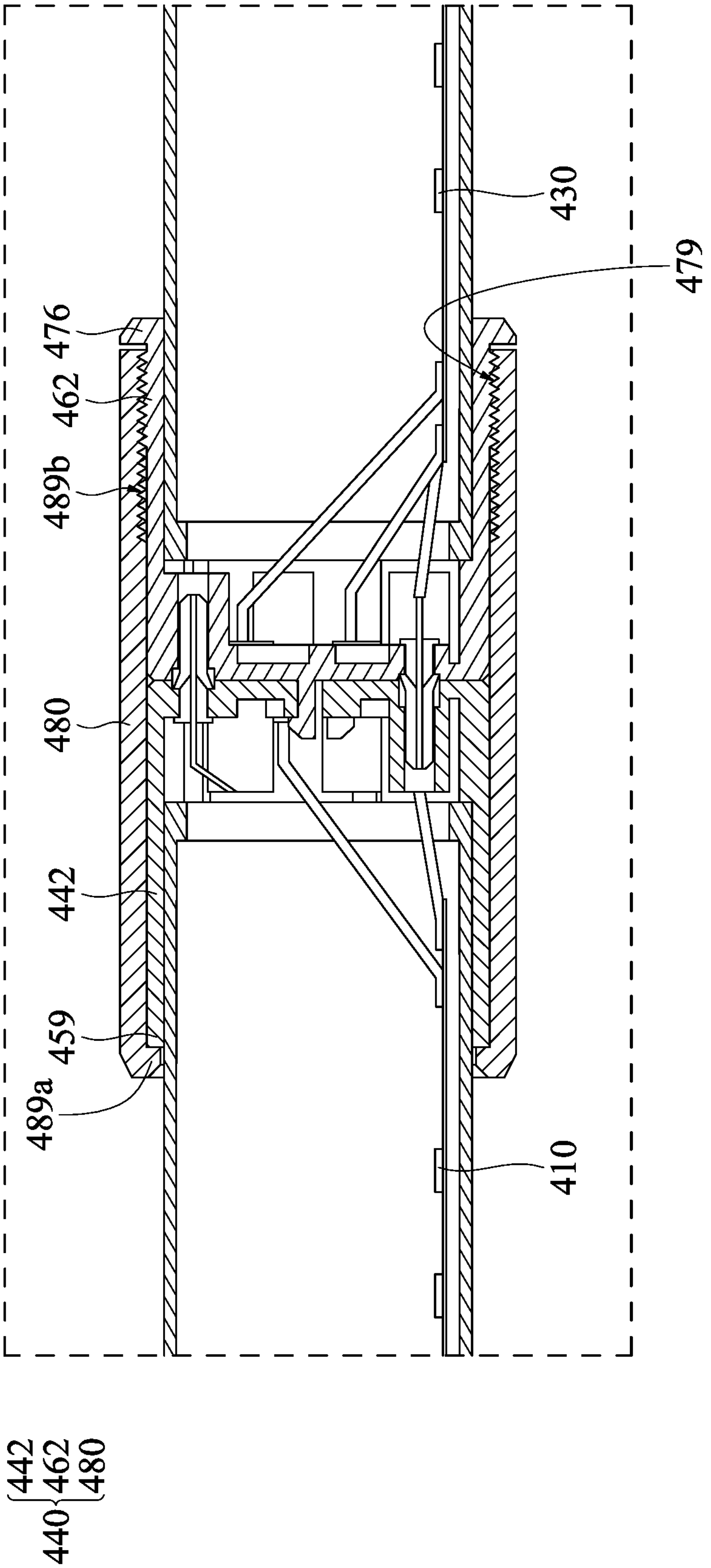
FIG. 14C illustrates a schematic enlarged view of the region 14C shown in FIG. 14B.
Figure 15B:
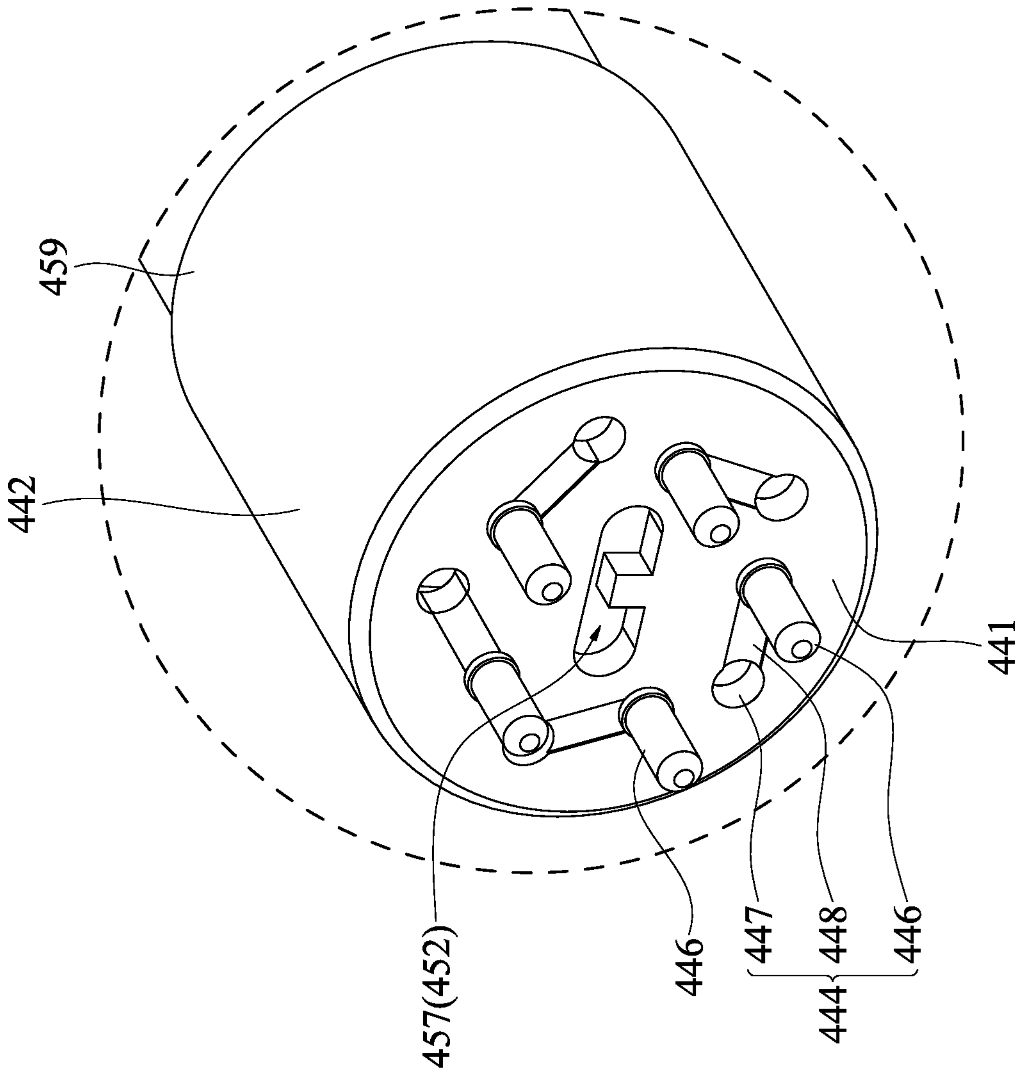
FIG. 15B illustrates a schematic enlarged view of the region 15B shown in FIG. 15A.
Figure 16B:
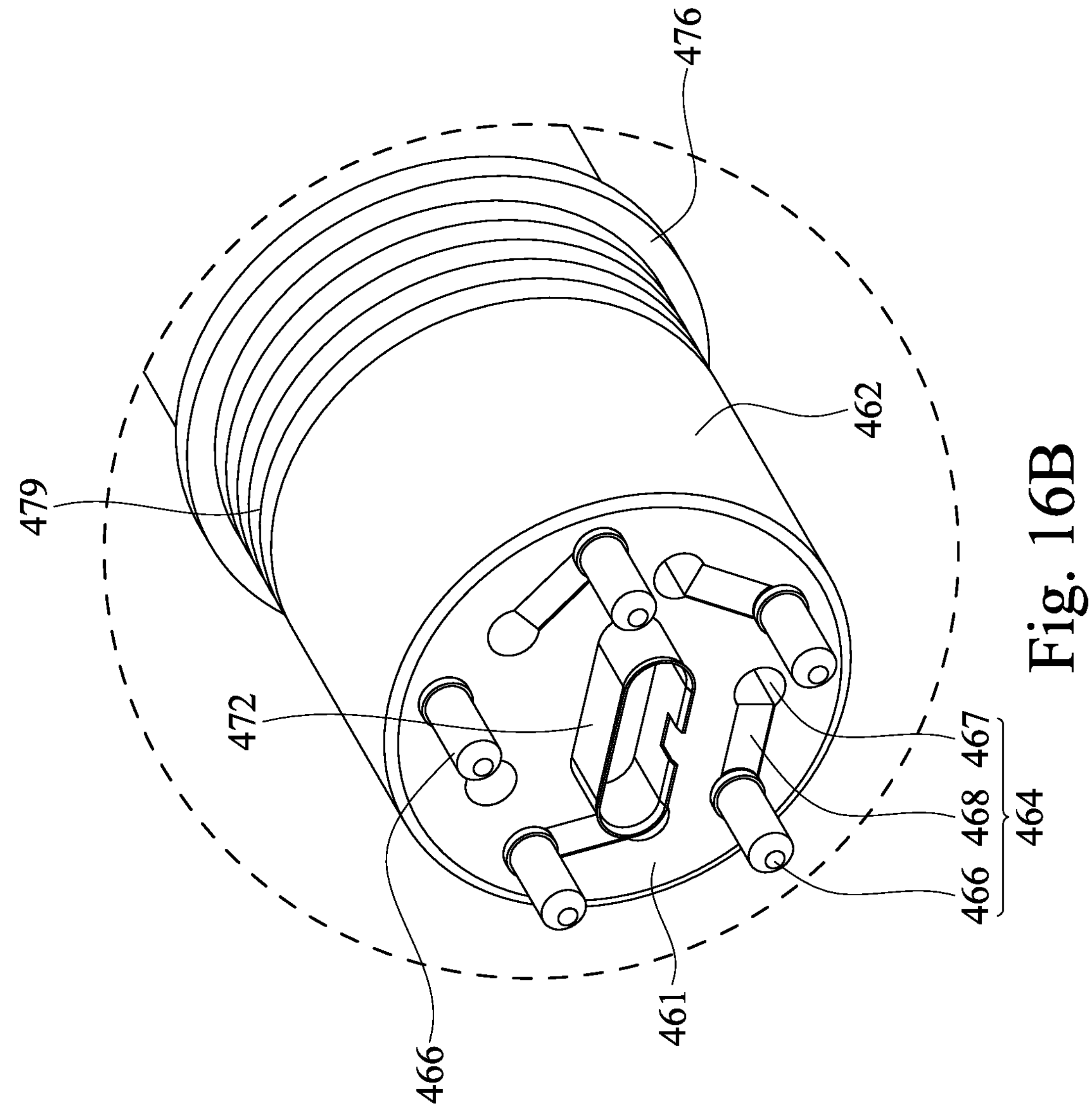
FIG. 16B illustrates a schematic enlarged view of the region 16B shown in FIG. 16A.
Figure 18B:
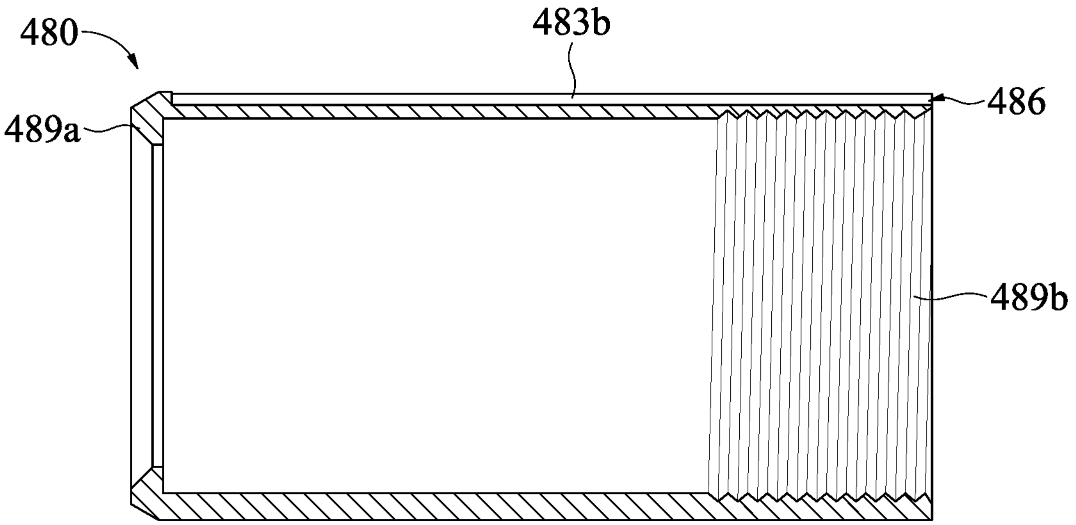
FIG. 18B illustrates a cross-sectional view of the third connection part of FIG. 18A along a section line 18B-18B.

Please refer to FIGS. 14C, 15B, 16B and 18B. FIG. 14C illustrates a schematic enlarged view of the region 14C shown in FIG. 14B. FIG. 15B illustrates a schematic enlarged view of the region 15B shown in FIG. 15A. FIG. 16B illustrates a schematic enlarged view of the region 16B shown in FIG. 16A. FIG. 18B illustrates a cross-sectional view of the third connection part of FIG. 18A along a section line 18B-18B.

The first connection part 442 comprises a first electrical connection portion 444 and a first abutting portion 459. The first electrical connection portion 444 is electrically connected to the first LED light strip 408. The second connection part 462 comprises a second electrical connection portion 464 and a first fastening portion 479. The second electrical connection portion 464 is electrically connected to the second LED light strip 428. The second electrical connection portion 464 is configured to be electrically connected with the first electrical connection portion 444. The third connection part 480 comprises a second abutting portion 489*a* and a second fastening portion 489*b*. The second fastening portion 489*b* is configured to be fastened to the first fastening portion 479 to make the second abutting portion 489*a* abut against the first abutting portion 459. When the second fastening portion 489*b* is fastened to the first fastening portion 479 to make the first abutting portion 459 abut against the second abutting portion 489*a*, the second electrical connection portion 464 is electrically connected with the first electrical connection portion 444 and the first member 400 is substantially coaxial to the second member 420. In some embodiments, the distance between the first wall 441 and the second wall 461 is not greater than 5 mm when the second fastening portion 489*b* is fastened to the first fastening portion 479.

In some embodiments, the first fastening portion 479 is a male thread (FIG. 16B) while the second fastening portion 489*b* is a female thread (FIG. 18B). The first abutting portion 459 is located at an end of the first connection part 442 opposite to the first wall 441 (FIG. 15B). The second abutting portion 489*a* is an inner flange (FIG. 18B). When the second fastening portion 489*b* is fastened to the first fastening portion 479, the flange abuts the end of the first connection part 442 to gradually make the first wall 441 close to the second wall 461. After the first fastening portion 479 is fastened to the second fastening portion 489*b*, the connection between the first connection part 442 and the second connection part 462 is ensured.

In some embodiments, referring to FIGS. 14C and 16B, the second connection part 462 further comprise a stopping portion 476 at an end of the second connection part 462 opposite to the second wall 461. The stopping portion 476 is to prevent the third connection part 480 from being over fastened with the second connection part 462. In some embodiments, the outer diameter of the stopping portion 476 is substantially the same as that of the third connection part 480. Consequently, the outlook of the connection member 440 is visually integral.

In some embodiments, referring to FIGS. 15B and 16B, the first electrical connection portion 444 comprises a first plug element 446, a first receptacle element 447 and a first electric conduction element 448. The second electrical connection portion 464 comprises a second plug element 466, a second receptacle element 467 and a second electric conduction element 468. The first plug element 446 extends along the length direction of the first member 400 and the second plug element 466 extends along the length direction of the second member 420. The first receptacle element 447 is configured to be plugged with the second plug element 466. The second receptacle element 467 is configured to be plugged with the first plug element 446. An end of the first electric conduction element 448 is electrically connected with the first plug element 446 and the other end of the first electric conduction element 448 is disposed inside the first receptacle element 447. An end of the second electric conduction element 468 is electrically connected with the second plug element 466 and the other end of the second electric conduction element 468 is disposed inside the second receptacle element 467. Accordingly, when the second fastening portion 489*b* is fastened to the first fastening portion 479, the first electric conduction element 448, the first plug element 446, the first receptacle element 447, the second electric conduction element 468, the second plug element 466 and the second receptacle element 467 are connected with each other. In the embodiments of FIG. 15B, there are five electrical connections between the first member 400 and the second member 420 for transmission of power and/or control signals.

Figure 17:
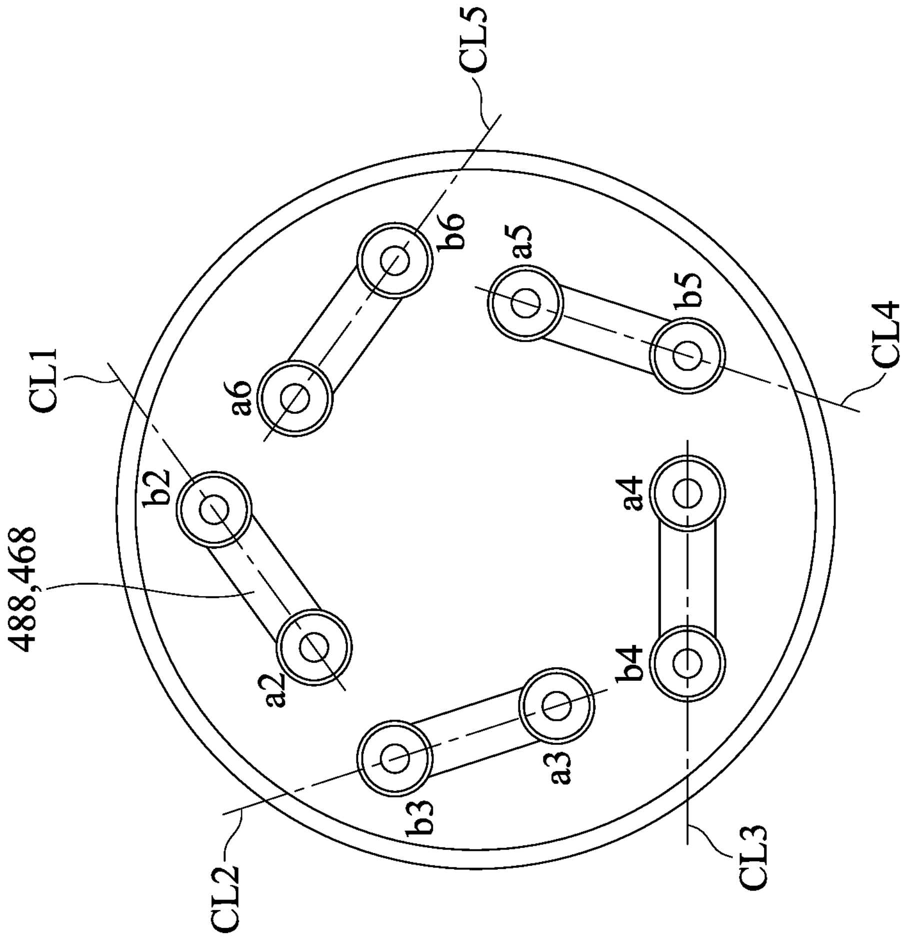
FIG. 17 illustrates a schematic plan view showing connection between each of pairs of a first electrical connection portions and a second electrical connection portions according to the embodiments of FIG. 14A.

Please refer to FIG. 17 which illustrates a schematic plan view showing connection between each of pairs of a first electrical connection portions and a second electrical connection portions according to the embodiments of FIG. 14A. The schematic plan view shows the cross-section where the first connection part 442 is connected with the second connection part 462. In some embodiments, the first connection part 442 comprises a first wall 441. The second connection part 462 comprises a second wall 461. The first electrical connection portion 444 comprises a plurality of first pairs of the first plug element 446 and the first receptacle element 447. The first plug elements 446 are labeled a2, a3, a4, a5, a6, respectively. The first plug elements 446 are arranged substantially along a first circle on the first wall 441. For example, the first circle passes the centers of the first plug elements 446. The second electrical connection portion 464 comprises a plurality of second pairs of the second plug element 466 and the second receptacle element 467. The second plug elements 466 are labeled b2, b3, b4, b5, b6, respectively. The second plug elements 466 are arranged substantially along a second circle on the second wall 461. For example, the second circle passes the centers of the second plug elements 466. The first circle and the second circle are substantially concentric. The diameter of the second circle is greater than that the first circle. In some embodiments, the diameter of the second circle equals to or is smaller than that the first circle. In some embodiments, the first plug element 446 and the first receptacle element 447 of each first pair are arrange along a first line CL1, CL2, CL3, CL4, CL5. For example, the first lines CL1, CL2, CL3, CL4, CL5 respectively pass the centers of the first plug elements 446 and the centers of the first receptacle elements 447. The first lines CL1, CL2, CL3, CL4, CL5 are not parallel to each other. Similarly, the second plug element 466 and the second receptacle element 467 of each second pair are along a second line. For example, the second lines respectively pass the centers of the second plug element 466 and the centers of the second receptacle element 467. The second lines are not parallel to each other.

In some embodiments, referring to FIGS. 15B and 16B, the first connection part 442 further comprises a first joining portion 452. The second connection part 462 further comprises a second joining portion 472. In the embodiment of 15B, the first joining portion 452 comprises a fixing hole 457 with a protrusion in the lower middle of the fixing hole 457. The second joining portion 472 comprises a fixing element with a recession corresponding to the protrusion of the fixing hole 457. With the protrusion of the fixing hole 457 and the recession of the fixing element (or called as mismatch-proof structure), users will not mismatch the first member 400 and the second member 420.

In some embodiments, referring FIGS. 15B and 16B. The quantity of each of the joining portions 452, 472 is one. The first electrical connection portions 444 surround the first joining portion 452 and the second electrical connection portions 464 surround the second joining portion 472.

In some embodiments, referring FIG. 18A, the third connection part 480 has grooves 483*b* on the outer surface thereof to form a rough surface. The grooves 483*b* extend along the length direction of the third connection part 480. Consequently, the friction between the third connection part 480 and the hand of a user is increased.

During assembly of the LED tube lamp, referring to FIG. 14C, the first member 400 having the first connection part 442 is inserted into the third connection part 480 from the left side of the third connection part 480. Then, the second member 420 having the second connection part 462 is inserted into the third connection part 480 from the right side of the third connection part 480. The first electrical connection portion 444 and the first joining portion 452 are connected with the second electrical connection portion 464 and the second joining portion 472, respectively. Next, the third connection part 480 is fastened with the second connection part 462 by the first fastening portion 479 and the second fastening portion 489*b*. In the process that the first fastening portion 479 is being fastened the second fastening portion 489*b*, the second abutting portion 489*a* abuts the first abutting portion 459 to ensure the first wall 441 is contact with the second wall 461 and ensure that the first member 400 is substantially coaxial to the second member 420

Figure 19A:
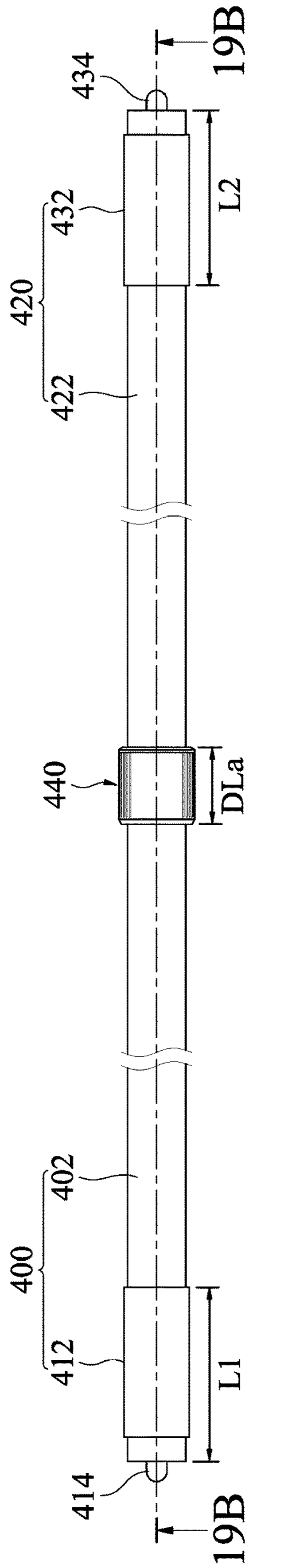
FIG. 19A illustrates a schematic plan view of a LED tube lamp according to some embodiments of the present disclosure.
Figure 19B:
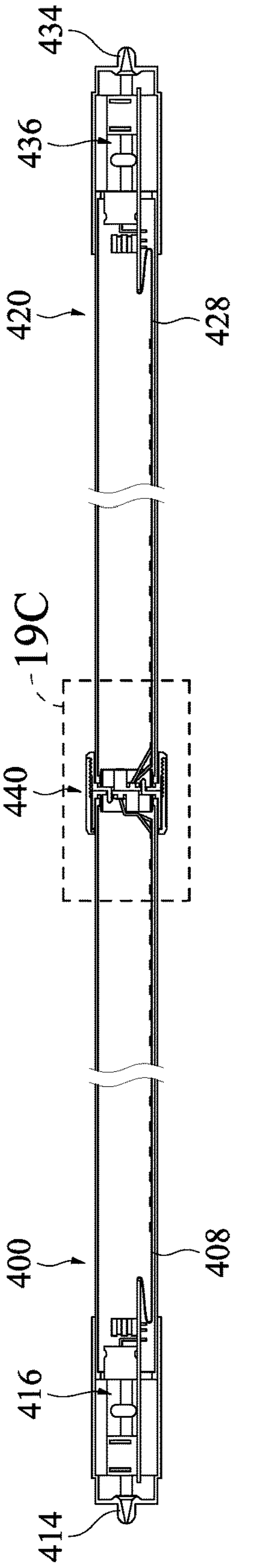
FIG. 19B illustrates a cross-sectional view of the LED tube lamp of FIG. 19A along a section line 19B-19B.
Figure 20A:
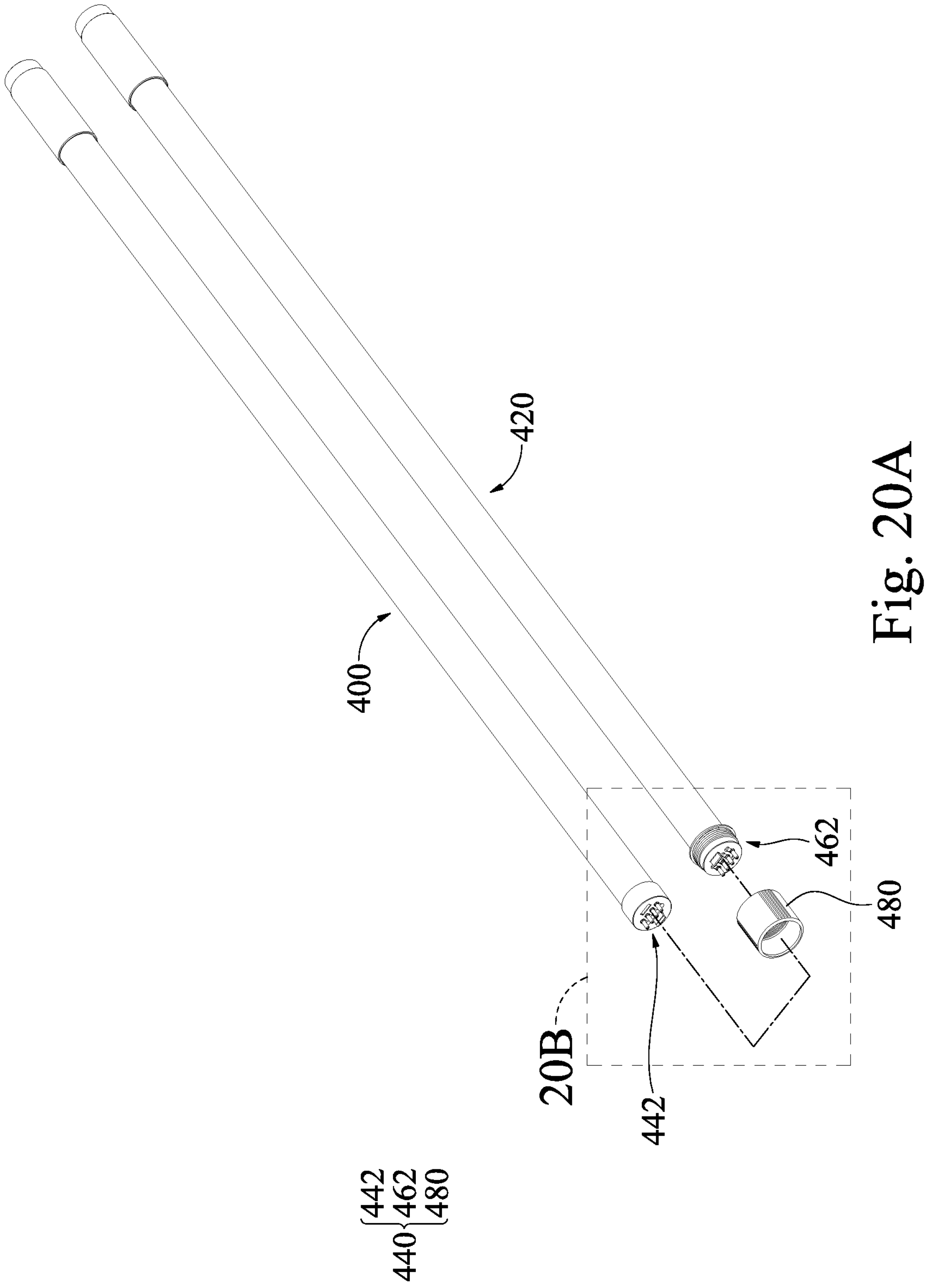
FIG. 20A illustrates a schematic three-dimensional exploded view of the LED tube lamp according to the embodiments of FIG. 19A.

Please refer to FIGS. 19A, 19B and 20A. FIG. 19A illustrates a schematic plan view of a LED tube lamp according to some embodiments of the present disclosure. FIG. 19B illustrates a cross-sectional view of the LED tube lamp of FIG. 19A along a section line 19B-19B. FIG. 20A illustrates a schematic three-dimensional exploded view of the LED tube lamp according to the embodiments of FIG. 19A.

In some embodiments, an LED tube lamp comprises a first member 400, a second member 420 and a connection member 440. The first member 400 comprises a first lighting part 402 and a first end part 412. The first end part 412 is disposed at an end of the first lighting part 402. The first lighting part 402 comprises a first LED light strip 408. The second member 420 comprises a second lighting part 422 and a second end part 432. The second end part 432 is disposed at an end of the second lighting part 422. The second lighting part 422 comprises a second LED light strip 428. The connection member 440 comprises a first connection part 442, a second connection part 462 and a third connection part 480. The first connection part 442 is disposed at another end of the first lighting part 402. The second connection part 462 is disposed at another end of the second lighting part 422.

In some embodiments, the total length TLa of the LED tube lamp is greater than 2,300 mm and not greater than 2,400 mm. The length DLa of the connection member 440 is not greater than 40 mm, 38 mm, 35 mm or 33 mm. The LED tube lamp with the length design would have a curvature of the LED tube lamp less than 0.001. In some embodiments, the LED tube lamp where the ratio of the length DLa of the connection member 440 to the total length TLa of the LED tube lamp is not greater than 1.4% or 1.5% could obtains a curvature not greater than 0.001.

In some embodiments, referring to FIG. 19A, a unit weight of a portion of the first member 400 corresponding to the first end part 412 is greater than or equal to a unit weight of a portion of the first and second members 400, 420 corresponding to the connection member 440. A unit weight of a portion of the second member 420 corresponding to the second end part 432 is greater than or equal to the unit weight of a portion of the first and second members 400, 420 corresponding to the connection member 440. The portion of the first member 400 corresponding to the first end part 412 is the portion of the first member 400 within the length L1 shown on FIG. 19A and thus comprises components within the length L1 including the first end part 412 and components inside the first end part 412 within the length L1 (hereinafter referred to the first weight portion). The portion of the first and second members 400, 420 corresponding to the connection member 440 is the portion of the first and second members 400, 420 corresponding to the length DLa of the connection member 440 shown on FIG. 19A (hereinafter referred to the connection weight portion) and thus comprises components within the length DLa including the first connection part 442, the second connection part 462 and the third connection part 480 (if any). The portion of the second member 420 corresponding to the second end part 432 is the portion of the second member 420 within the length L2 shown on FIG. 19A and thus comprises the second end part 432 and components inside the second end part 432 within the length L2 (hereinafter referred to the second weight portion). Hence, the unit weight of the portion of the first member 400 corresponding to the first end part 412 is the ratio of the weight to the length of the first weight portion. The unit weight of the portion of the first and second members 400, 420 corresponding to the connection member 440 is the ratio of the weight to the length of the connection weight portion. The unit weight of a portion of the second member 420 corresponding to the second end part 432 is the ratio of the weight to the length of the second weight portion. Accordingly, based on the weight breakdown of the LED tube lamp, the center of the LED tube lamp which maybe the bending point of the LED tube lamp is lighter than other portions of the LED tube lamp. The LED tube lamp has less bending risk during use. In addition, in some embodiments, the LED tube lamp has the third connection part 480 which sleeves at least a portion of the first connection part 442 and the second connection part 462 (the center of the LED tube lamp). The mechanical strength of the center of the LED tube lamp is enhanced. In some embodiments, the weight of the components within the length DLa of the connection member 440 is not greater 0.5 times than the total weight of the LED tube lamp.

Figure 19C:
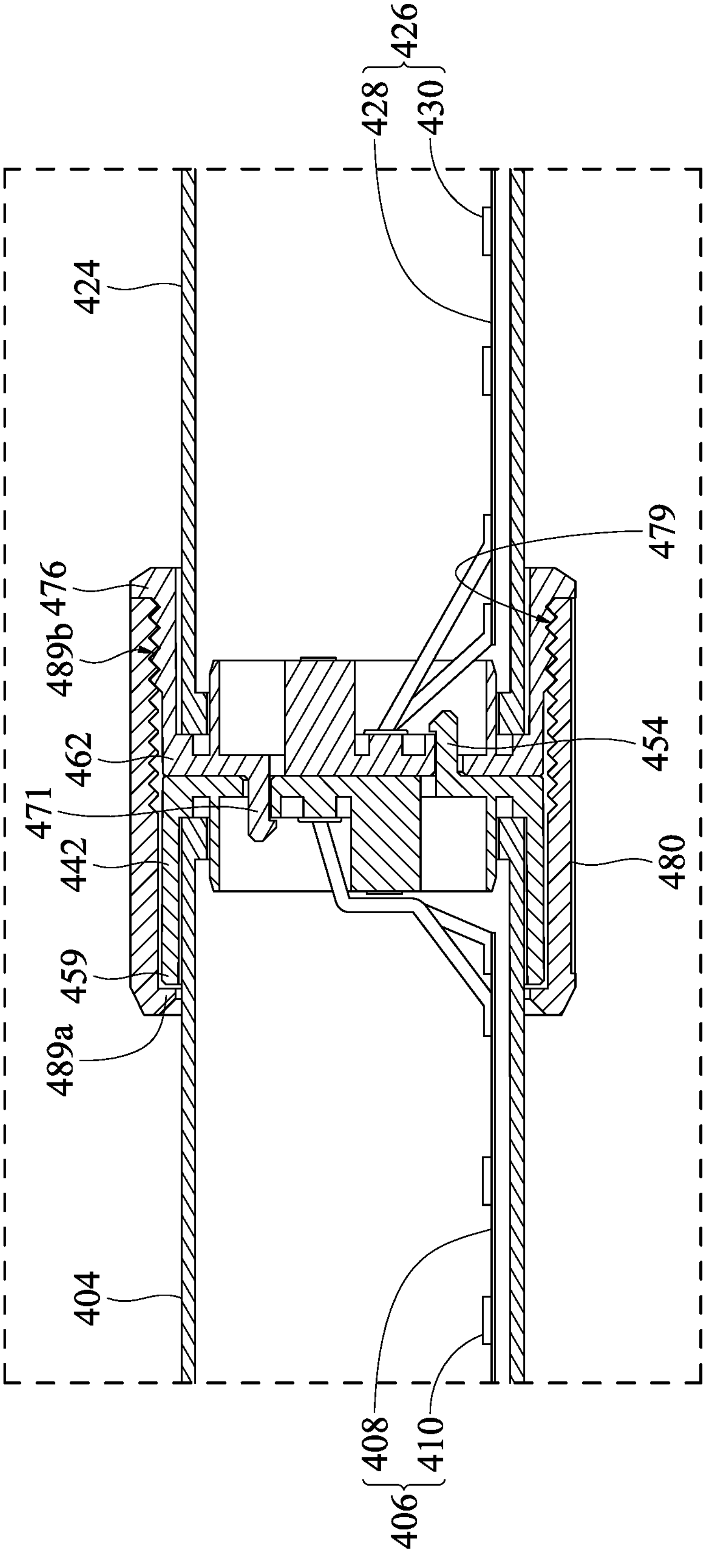
FIG. 19C illustrates a schematic enlarged view of the region 19C shown in FIG. 19B.
Figure 20B:
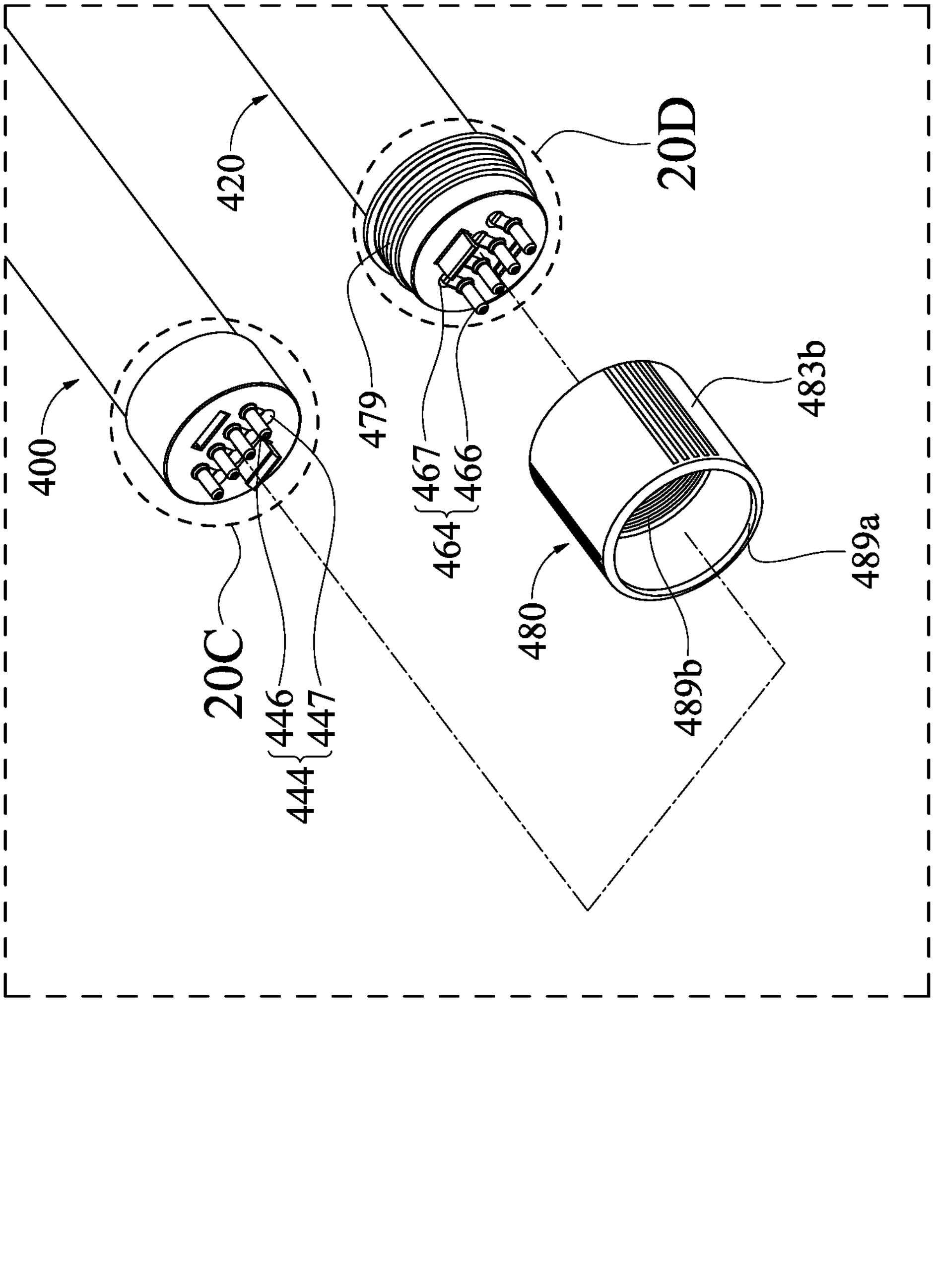
FIG. 20B illustrates a schematic enlarged view of the region 20B shown in FIG. 20A.
Figure 20D:
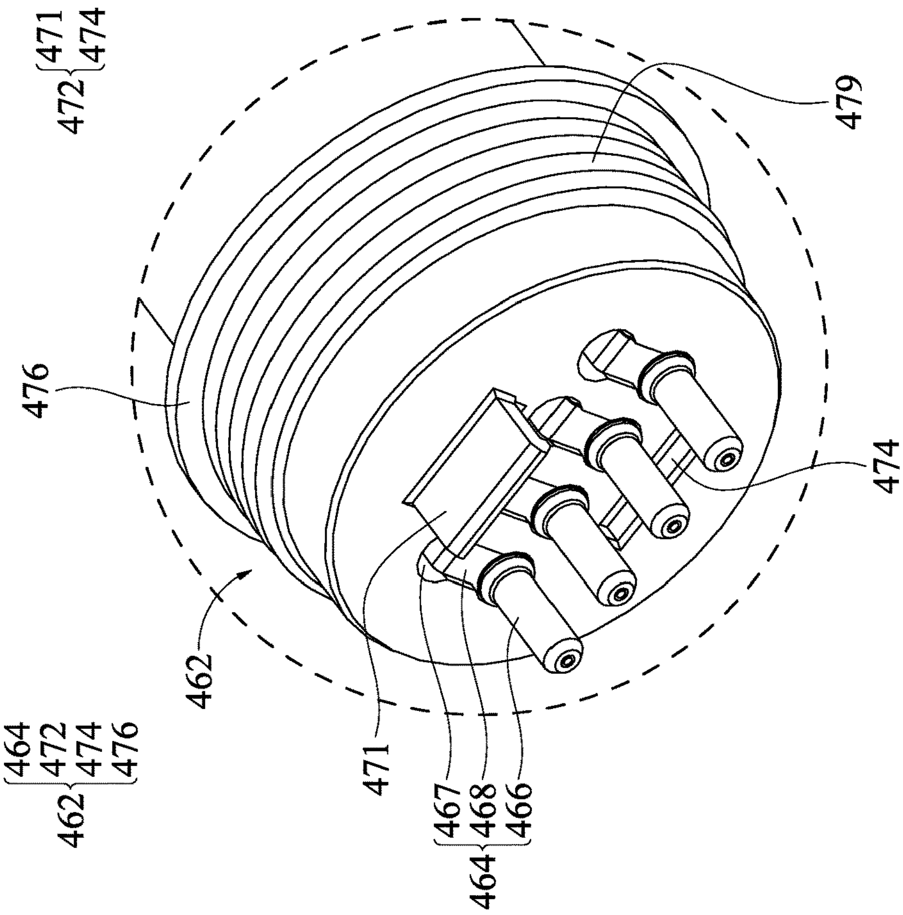
FIG. 20D illustrates a schematic enlarged view of the region 20D shown in FIG. 20B.
Figure 20C:
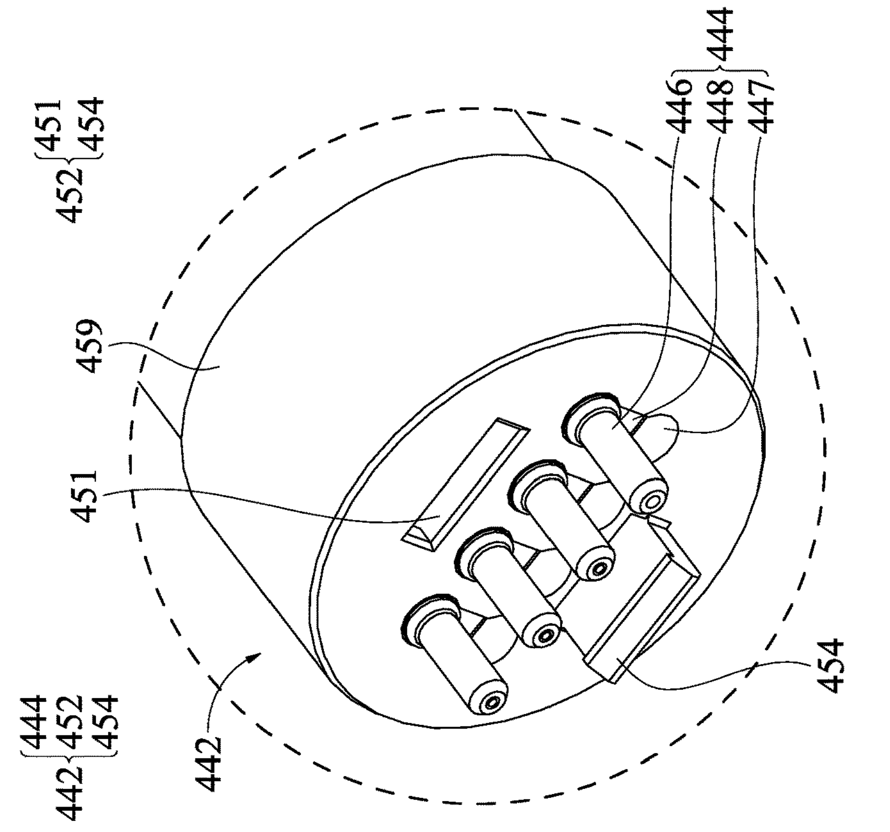
FIG. 20C illustrates a schematic enlarged view of the region 20C shown in FIG. 20B.

Please refer to FIGS. 19C, 20B, 20C and 20D. FIG. 19C illustrates a schematic enlarged view of the region 19C shown in FIG. 19B. FIG. 20B illustrates a schematic enlarged view of the region 20B shown in FIG. 20A. FIG. 20C illustrates a schematic enlarged view of the region 20C shown in FIG. 20B. FIG. 20D illustrates a schematic enlarged view of the region 20D shown in FIG. 20B.

The first connection part 442 comprises a first electrical connection portion 444 a first joining portion 452 and a first abutting portion 459. The first electrical connection portion 444 is electrically connected to the first LED light strip 408. The second connection part 462 comprises a second electrical connection portion 464, a second joining portion 472 and a first fastening portion 479. The second electrical connection portion 464 is electrically connected to the second LED light strip 428. The second electrical connection portion 464 is configured to be electrically connected with the first electrical connection portion 444. The third connection part 480 comprises a second abutting portion 489*a* and a second fastening portion 489*b*. The second fastening portion 489*b* is configured to be fastened to the first fastening portion 479 to make the second abutting portion 489*a* abut against the first abutting portion 459. When the second fastening portion 489*b* is fastened to the first fastening portion 479 to make the first abutting portion 459 abut against the second abutting portion 489*a*, the second electrical connection portion 464 is electrically connected with the first electrical connection portion 444 and the first member 400 is substantially coaxial to the second member 420.

In some embodiments, the first joining portion 452 comprises a first hook hole 451 and a first hook element 454. The second joining portion 472 comprises a second hook element 471 and a second hook hole 474. The first hook hole 451 is configured to be connected with the second hook element 471. The first hook element 454 is configured to be connected with the second hook hole 474. Hence, when a user assembles the first member 400 and the second member 420, the user could connect the hook elements 454, 471 with the hook holes 474, 451.

In some embodiments, the first electrical connection portion 444 comprises a plurality of first sets of a first plug element 446, a first receptacle element 447 and a first electric conduction element 448. The second electrical connection portion 464 comprises a plurality of second sets of a second plug element 466, a second receptacle element 467 and a second electric conduction element 468. The first plug element 446, the first receptacle element 447 and the first electric conduction element 448 of each of the first sets are electrically connected with each other. The second plug element 466, the second receptacle element 467 and the second electric conduction element 468 of each of the second sets are electrically connected with each other. The first electrical connection portion 444 comprises four first sets and four second sets to provide four electrical connections between the first member 400 and the second member 420 for transmission of electric power and/or control signals. In some embodiments, the four first plug elements 446 are arranged in a row on the first wall 441. The first hook hole 451 and the first hook element 454 are arranged on the two opposite sides of the row on the first wall 441. The four second plug elements 466 are arranged in a row. The second hook element 471 and the second hook hole 474 are arranged on the two opposite sides of the row on the second wall 461.

In some embodiments, referring to FIGS. 21A and 21B, FIGS. 21A and 21B respectively illustrate schematic partial three-dimensional views of a first connection part and a second connection part according to some embodiments of the present disclosure. The first connection part 442 comprises a first electrical connection portion 444 and a first joining portion 452. The first electrical connection portion 444 is electrically connected to the first LED light strip 408. The second connection part 462 comprises a second electrical connection portion 464 and a second joining portion 472. The second electrical connection portion 464 is electrically connected to the second LED light strip 428. The second electrical connection portion 464 is configured to be electrically connected with the first electrical connection portion 444.

The first joining portion 452 comprises a first hook hole 451. The second joining portion 472 comprises a second hook element 471. The first hook hole 451 is configured to be connected with the second hook element 471. Hence, when a user assembles the first member 400 and the second member 420, the user could connect the second hook element 471 with the first hook holes 451.

The first electrical connection portion 444 comprises a plurality of first plug element 446. The second electrical connection portion 464 comprises a plurality of second pairs of a second receptacle element 467 and a second electric conduction element 468. The first plug element 446 is electrically connected to the first LED light strip 408. The second plug element 466, the second receptacle element 467 and the second electric conduction element 468 of each of the second pairs are electrically connected with each other. The first electrical connection portion 444 comprises four first plug elements 446 and four second pairs to provide four electrical connections between the first member 400 and the second member 420 for transmission of electric power and/or control signals. In some embodiments, the four first plug elements 446 are arranged in a row on the first wall 441. The first hook hole 451 is on one side of the row on the first wall 441. The four second plug elements 466 are arranged in a row. The second hook element 471 is arranged on one side of the row on the second wall 461.

Figure 22:
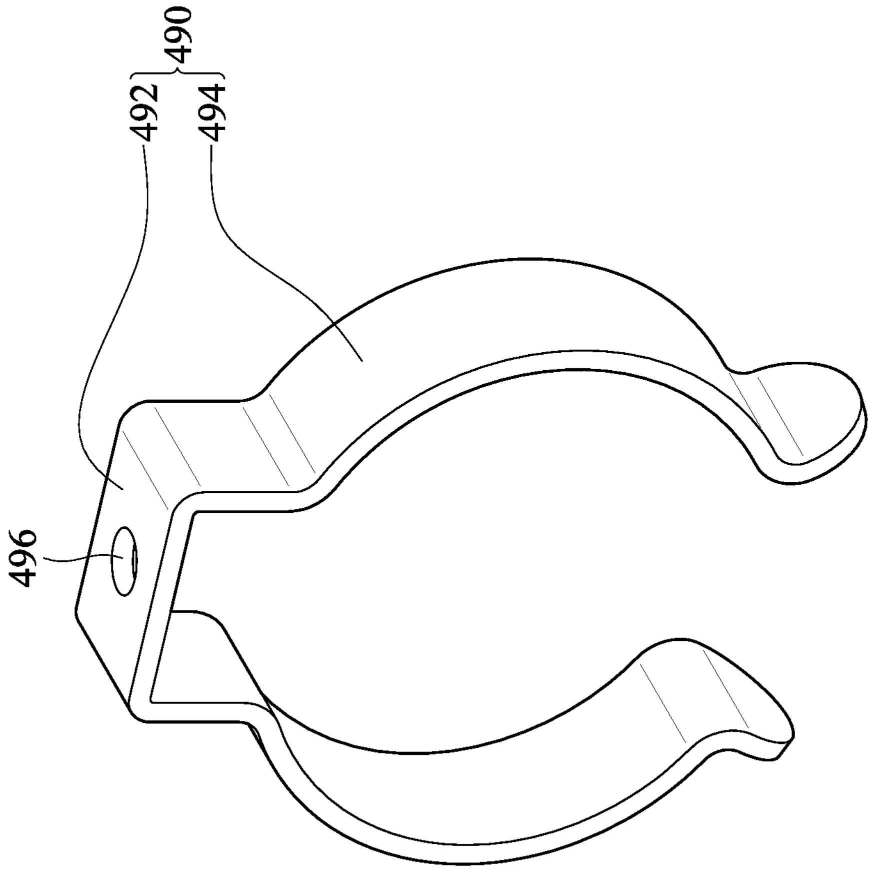
FIG. 22 illustrates a schematic three-dimensional view of a clamping member according to some embodiments of the present disclosure.

Please refer to FIG. 22 which illustrates a schematic three-dimensional view of a clamping member according to some embodiments of the present disclosure. The clamping member 490 comprises a clamping portion 492 and a fixing portion 494. The fixing portion 494 has a lock hole 496. The clamping portion 492 is configured to hold the LED tube lamp. For example, the clamping portion 492 may hold the connection member 440, the first member 400 or the second member 420. Users could fix the clamping member 490 on a lampshade by locking a screw through the lock hole onto the lampshade. Consequently, the clamping member 490 could maintain the coaxial situation between the first member 400 and the second member 420.

Having described at least one of the embodiments with reference to the accompanying drawings, it will be apparent to those skills that the invention is not limited to those precise embodiments, and that various modifications and variations can be made in the presently disclosed LED tube lamp without departing from the scope or spirit of the invention. Thus, it is intended that the present disclosure cover modifications and variations of this disclosure provided they come within the scope of the appended claims and their equivalents. Specifically, one or more limitations recited throughout the specification can be combined in any level of details to the extent they are described to improve the LED tube lamp.

What is claimed is:

1. An LED tube lamp, comprising:

a first member, comprising a first lighting part and a first end part, the first end part disposed at an end of the first lighting part, the first lighting part comprising a first LED light strip;

a second member, comprising a second lighting part and a second end part, the second end part disposed at an end of the second lighting part, the second lighting part comprising a second LED light strip; and a connection member, comprising:

a first connection part, disposed at another end of the first lighting part, the first connection part comprising a first electrical connection portion and a first joining portion, the first electrical connection portion electrically connected to the first LED light strip; and a second connection part, disposed at another end of the second lighting part, the second connection part comprising a second electrical connection portion and a second joining portion, the second electrical connection portion electrically connected to the second LED light strip, wherein the second electrical connection portion is configured to be electrically connected with the first electrical connection portion, the second joining portion is configured to be connected with the first joining portion to make the first member substantially coaxial to the second member, wherein the first electrical connection portion comprises a first plug element and a first receptacle element, the first plug element and the first receptacle element are respectively electrically connected to the first LED light strip, the second electrical connection portion comprises a second plug element and a second receptacle element, the second plug element and the second receptacle element are respectively electrically connected to the second LED light strip, the first plug element is configured to match and be electrically connected to the second receptacle element, and the second plug element is configured to match and be electrically connected to the first receptacle element, wherein the first connection part comprises a first wall, the second connection part comprises a second wall, the first electrical connection portion comprises a plurality of first pairs of the first plug element and the first receptacle element, the first plug elements are arranged substantially along a first circle on the first wall; the second electrical connection portion comprises a plurality of second pairs of the second plug element and the second receptacle element, the second plug elements are arranged substantially along a second circle on the second wall; the second circle is greater than the first circle.

2. The LED tube lamp according to claim 1, wherein the first lighting part comprises a plurality of LED chips on the first LED light strip, the second lighting part comprises a plurality of LED chips on the second LED light strip, and a shortest distance between one of the LED chips on the first LED light strip and one of the LED chips on the second LED light strip is greater than or equal to a length of the connection member.

3. The LED tube lamp according to claim 2, wherein beam angles of the two LED chips having the shortest distance are $\alpha$ and $\beta$, respectively, a height of the first member is H, the length of the connection member is smaller than $(H*\tan(0.5\alpha)+H*\tan(0.5\beta))$.

4. The LED tube lamp according to claim 1, wherein a unit weight of a portion of the first member corresponding to the first end part is greater than or equal to a unit weight of a portion of the first and second members corresponding to the connection member, and a unit weight of a portion of the second member corresponding to the second end part is greater than or equal to the unit weight of a portion of the first and second members corresponding to the connection member.

5. The LED tube lamp according to claim 1, wherein a ratio of a length of the connection member to a length of the LED tube lamp is less than 1.5%.

6. The LED tube lamp according to claim 1, wherein the first electrical connection portion further comprises a first electric conduction element disposed in the first receptacle element, the first receptacle element is electrically connected to the first LED light strip via the first electric conduction element, the second plug element is electrically connected to the first electric conduction element when the second plug element matches the first receptacle element, the second electrical connection portion further comprises a second electric conduction element disposed in the second receptacle element, and the first plug element is electrically connected to the second electric conduction element when the first plug element matches the second receptacle element.

7. The LED tube lamp according to claim 1, wherein the first lighting part comprises a first conductive wire connecting the first LED light strip with the first plug element, and the second lighting part comprises a second conductive wire connecting the second LED light strip with the second plug element.

8. The LED tube lamp according to claim 1, wherein the first electrical connection portion comprises a plurality of first pairs of the first plug element and the first receptacle element, the first plug element and the first receptacle element of each first pair are arranged along a first line, the first lines are parallel to each other; the second electrical connection portion comprises a plurality of second pairs of the second plug element and the second receptacle element, the second plug element and the second receptacle element of each second pair are arranged along a second line, and the second lines are parallel to each other.

9. The LED tube lamp according to claim 1, wherein the first plug element and the first receptacle element of each first pair are along a first line, the first lines are not parallel to each other.

10. The LED tube lamp according to claim 1, wherein the first electrical connection portion further comprises a plurality of first electric conduction elements respectively disposed in the first receptacle elements, the first plug elements are electrically connected to the first LED light strip respectively via the plurality of first electric conduction elements, the second plug elements are respectively electrically connected to the first electric conduction elements when the second plug elements respectively match the first receptacle elements;

the second electrical connection portion further comprises a plurality of second electric conduction elements respectively disposed in the second receptacle elements, the second plug elements are electrically connected to the second LED light strip respectively via the plurality of second electric conduction elements, and the first plug elements are respectively electrically connected to the plurality of second electric conductions elements when the first plug elements respectively match the second receptacle elements.

11. The LED tube lamp according to claim 1, wherein the first electrical connection portion comprises a plurality of first pairs of the first plug element and the first receptacle element, the second electrical connection portion comprises a plurality of second pairs of the second plug element and the second receptacle element, the first plug elements are arranged substantially along a line and the second plug elements are arranged substantially along a line.

12. An LED tube lamp, comprising:

a first member, comprising a first lighting part and a first end part, the first end part disposed at an end of the first lighting part, the first lighting part comprising a first LED light strip;

a second member, comprising a second lighting part and a second end part, the second end part disposed at an end of the second lighting part, the second lighting part comprising a second LED light strip; and a connection member, comprising:

a first connection part, disposed at another end of the first lighting part, the first connection part comprising a first electrical connection portion and a first joining portion, the first electrical connection portion electrically connected to the first LED light strip; and a second connection part, disposed at another end of the second lighting part, the second connection part comprising a second electrical connection portion and a second joining portion, the second electrical connection portion electrically connected to the second LED light strip, wherein the second electrical connection portion is configured to be electrically connected with the first electrical connection portion, the second joining portion is configured to be connected with the first joining portion to make the first member substantially coaxial to the second member, wherein the first electrical connection portion comprises a first plug element and a first receptacle element, the first plug element and the first receptacle element are respectively electrically connected to the first LED light strip, the second electrical connection portion comprises a second plug element and a second receptacle element, the second plug element and the second receptacle element are respectively electrically connected to the second LED light strip, the first plug element is configured to match and be electrically connected to the second receptacle element, and the second plug element is configured to match and be electrically connected to the first receptacle element, wherein the first electrical connection portion comprises a plurality of first pairs of the first plug element and the first receptacle element, the second electrical connection portion comprises a plurality of second pairs of the second plug element and the second receptacle element, the first plug elements surround the first joining portion, and the second plug elements surround the second joining portion.

13. The LED tube lamp according to claim 12, wherein the first electrical connection portion comprises a plurality of first receptacle elements, the second electrical connection portion comprises a plurality of second plug elements, the plurality of first receptacle elements is electrically connected to the first LED light strip, the plurality of second plug elements is electrically connected to the second LED light strip, and the plurality of first receptacle elements matches and are electrically connected to the plurality of second plug elements, respectively.

14. The LED tube lamp according to claim 13, wherein the first electrical connection portion further comprises a plurality of first electric conduction elements and a plurality of second electric conduction elements, the plurality of first electric conduction elements is respectively disposed inside the plurality of first receptacle elements; the plurality of second electric conduction elements is respectively disposed at an end of the plurality of first receptacle elements and respectively electrically connected to the first LED light strip; the plurality of second plug elements is connected to at least one of the plurality of first electric conduction elements and the plurality of second electric conduction elements.

15. The LED tube lamp according to claim 14, wherein each of the plurality of second plug elements is an electric conduction pin and each of the plurality of first receptacle elements is an electric conduction hole.

16. The LED tube lamp according to claim 12, wherein the first joining portion comprises a plurality of first hook holes, the second joining portion comprises a plurality of second hook elements, the plurality of second hook elements is configured to be hooked to the plurality of first hook holes, respectively.

17. The LED tube lamp according to claim 16, wherein the first hook holes surround the first electrical connection portion, and the second hook elements surround the second electrical connection portion.

18. An LED tube lamp, comprising:

a first member, comprising a first lighting part and a first end part, the first end part disposed at an end of the first lighting part, the first lighting part comprising a first LED light strip;

a second member, comprising a second lighting part and a second end part, the second end part disposed at an end of the second lighting part, the second lighting part comprising a second LED light strip; and a connection member, comprising:

a first connection part, disposed at another end of the first lighting part, the first connection part comprising a first electrical connection portion and a first joining portion, the first electrical connection portion electrically connected to the first LED light strip; and a second connection part, disposed at another end of the second lighting part, the second connection part comprising a second electrical connection portion and a second joining portion, the second electrical connection portion electrically connected to the second LED light strip, wherein the second electrical connection portion is configured to be electrically connected with the first electrical connection portion, the second joining portion is configured to be connected with the first joining portion to make the first member substantially coaxial to the second member, wherein the first connection part comprises a first wall, the second connection part comprises a second wall, the first electrical connection portion and the first joining portion are on the first wall, the second electrical connection portion and the second joining portion are on the second wall, and the first joining portion comprises a first hook element and a first hook hole; the second joining portion comprises a second hook hole and a second hook element; the first hook hole is configured to be connected with the second hook element; and the first hook element is configured to be connected with the second hook hole.

19. The LED tube lamp according to claim 17, wherein the first electrical connection portion comprises a plurality of first plug elements and a plurality of first receptacle elements, the second electrical connection portion comprises a plurality of the second plug elements and a plurality of second receptacle elements, the first plug elements are arranged substantially along a line and the second plug elements are arranged substantially along a line.

20. An LED tube lamp, comprising:

a first member, comprising a first lighting part and a first end part, the first end part disposed at an end of the first lighting part, the first lighting part comprising a first LED light strip;

a second member, comprising a second lighting part and a second end part, the second end part disposed at an end of the second lighting part, the second lighting part comprising a second LED light strip; and a connection member, comprising:

a first connection part, disposed at another end of the first lighting part, the first connection part comprising a first electrical connection portion and a first joining portion, the first electrical connection portion electrically connected to the first LED light strip; and a second connection part, disposed at another end of the second lighting part, the second connection part comprising a second electrical connection portion and a second joining portion, the second electrical connection portion electrically connected to the second LED light strip, wherein the second electrical connection portion is configured to be electrically connected with the first electrical connection portion, the second joining portion is configured to be connected with the first joining portion to make the first member substantially coaxial to the second member, wherein the connection member further comprises a third connection part, the third connection part covers at least a portion of the first connection part and at least a portion of the second connection part.

21. The LED tube lamp according to claim 20, wherein the first connection part further comprises a first abutting portion, the second connection part further comprises a first fastening portion, the third connection part comprises a second fastening portion and a second abutting portion, the first fastening portion is configured to be fastened to the second fastening portion to make the first abutting portion abut against the second abutting portion.

22. The LED tube lamp according to claim 21, wherein the first connection part comprises a first wall, the second connection part comprises a second wall, the first wall substantially contacts the second wall when the first fastening portion is fastened to the second fastening portion.

23. The LED tube lamp according to claim 22, wherein the first joining portion is connected with the second joining portion when the first fastening portion is fastened to the second fastening portion.

24. The LED tube lamp according to claim 21, wherein the first connection part comprises a first wall, the second connection part comprises a second wall, a distance between the first wall and the second wall is not greater than 5 mm when the first fastening portion is fastened to the second fastening portion.

25. The LED tube lamp according to claim 21, wherein the first connection part comprises a first wall, the second connection part comprises a second wall, the first electrical connection portion and the first joining portion are on the first wall, the second electrical connection portion and the second joining portion are on the second wall; and the first abutting portion includes a plurality of hook elements, the second abutting portion is a flange inside the third connection part, the plurality of hook elements is arranged substantially along a circle on the first wall and surrounds the first electrical connection portion and the first joining portion.

26. The LED tube lamp according to claim 25, wherein the hook elements are spaced from each other.

27. The LED tube lamp according to claim 21, wherein the first electrical connection portion comprises a plurality of first plug elements and a plurality of a first receptacle elements, the second electrical connection portion comprises a plurality of second plug elements and a plurality of a second receptacle elements, the first plug elements surround the first joining portion, the second plug elements surround the second joining portion, the first plug elements and the first receptacle elements are respectively electrically connected to the first LED light strip, the second plug elements and the second receptacle elements are respectively electrically connected to the second LED light strip, the first plug elements are configured to match and be electrically connected to the second receptacle elements respectively, and the second plug elements are configured to match and be electrically connected to the first receptacle elements respectively.

28. The LED tube lamp according to claim 27, wherein the first plug elements are arranged substantially along a first circle, the second plug elements are arranged substantially along a second circle, and the first circle is smaller than the second circle.

29. An LED tube lamp, comprising:

a first member, comprising a first lighting part and a first end part, the first end part disposed at an end of the first lighting part, the first lighting part comprising a first LED light strip;

a second member, comprising a second lighting part and a second end part, the second end part disposed at an end of the second lighting part, the second lighting part comprising a second LED light strip; and a connection member, comprising:

a first connection part, disposed at another end of the first lighting part, the first connection part comprising a first electrical connection portion and a first joining portion, the first electrical connection portion electrically connected to the first LED light strip; and a second connection part, disposed at another end of the second lighting part, the second connection part comprising a second electrical connection portion and a second joining portion, the second electrical connection portion electrically connected to the second LED light strip; and a third connection part, comprising a third electrical connection portion and at least two third joining portions, wherein the at least two third joining portions are connected to the first joining portion and the second joining portion respectively to make the first electrical connection portion be electrically connected to the second electrical connection portion via the third electrical connection portion and to make the first member substantially coaxial to the second member.

30. The LED tube lamp according to claim 29, wherein the first joining portion comprises a first engaging element, the second joining portion comprises a second engaging element, the at least two third joining portions comprises a first butting element and a second butting element, the first engaging element is configured to engage with the first butting element, the second engaging element is configured to engage with the second butting element.

31. The LED tube lamp according to claim 30, wherein the first electrical connection portion comprises a first plug element, the second electrical connection portion comprises a second plug element, the third electrical connection portion comprises a sleeve; when the first engaging element is engaged with the first butting element, and the second engaging element is engaged with the second butting element, the sleeve aligns the first plug element with the second plug element as well as makes the first plug element connected with the second plug element.

32. The LED tube lamp according to claim 30, wherein the first electrical connection portion further comprises a first plug element, the second electrical connection portion comprises a second plug element, the third electrical connection portion comprises a sleeve which is electrically conductive; when the first engaging element is engaged with the first butting element and the second engaging element is engaged with the second butting element, the sleeve aligns and electrically connects the first plug element with the second plug element.

33. The LED tube lamp according to claim 29, wherein the first connection part comprises a first wall, the second connection part comprises a second wall, the first wall faces the second wall when the first engaging element is engaged with the first butting element and the second engaging element is engaged with the second butting element; the first joining portion is adjacent to the first wall, and the second joining portion is adjacent to the second wall.

34. The LED tube lamp according to claim 29, wherein the first connection part comprises a first wall, the second connection part comprises a second wall, the third connection part 1180 has a first bottom wall and a second bottom wall opposite to the first bottom wall; the first wall is close to or in contact with the first bottom wall when the first engaging element is engaged with the first butting element; the second wall is close to or in contact with the second bottom wall when the second engaging element is engaged with the second butting element.

35. An LED tube lamp, comprising:

a first member, comprising a first lighting part, and a first end part disposed at an end of the first lighting part, the first lighting part comprising a first LED light strip;

a second member, comprising a second lighting part, a second end part disposed at an end of the second lighting part and the second lighting part comprising a second LED light strip; and a connection member, comprising:

a first connection part, disposed at another end of the first lighting part, the first connection part comprising a first electrical connection portion and a first joining portion, the first electrical connection portion electrically connected to the first LED light strip;

a second connection part, disposed at another end of the second lighting part, the second connection part comprising a second electrical connection portion and a second joining portion, the second electrical connection portion electrically connected to the second LED light strip;

a third connection part, comprising a third electrical connection portion and at least two third joining portions; and a fourth connection part, comprising a fourth electrical connection portion and at least two fourth joining portions, wherein the first joining portion, the second joining portion, the at least two third joining portions and the at least two fourth joining portions are joined together to make the first electrical connection portion be electrically connected to the second electrical connection portion via the third electrical connection portion and the fourth electrical connection portion, and to make the first member substantially coaxial to the second member.

36. The LED tube lamp according to claim 35, wherein the at least two third joining portions comprise a first butting element and a first fixing element; the at least two fourth joining portions comprise a second butting element and a second fixing element; the first joining portion comprises a first engaging element; the second joining portion comprises a second engaging element; the first engaging element is configured to engage with the first butting element; the second engaging element is configured to engage with the second butting element; the first fixing element is configured to be connected with the second fixing element; when the engaging elements are engaged with the butting elements, and the first fixing element is connected with the second fixing element, the first member is substantially coaxial to the second member.

37. The LED tube lamp according to claim 36, wherein the first fixing element and the second fixing element are a recession and a hook, respectively.

38. The LED tube lamp according to claim 36, wherein the first electrical connection portion comprises a first plug element; the second electrical connection portion comprises a second plug element; the third electrical connection portion comprises a first sleeve; the fourth electrical connection portion comprises a second sleeve; when the engaging elements are engaged with the butting elements and the first fixing element is connected with the second fixing element, the first sleeve and the second sleeve align the first plug element with the second plug element as well as make the first plug element electrically connected with the second plug element.

39. The LED tube lamp according to claim 38, wherein the first sleeve is a through hole formed on the third connection part and the second sleeve is a through hole formed on the fourth connection part.

40. The LED tube lamp according to claim 39, wherein the through holes are coated with electrically conductive material.

41. The LED tube lamp according to claim 39, wherein a total length of the first through hole and the second through hole is less than or equal to a total length of the first plug element and the second plug element.

42. The LED tube lamp according to claim 39, wherein the third connection part further comprises an electric conduction piece disposed in the first sleeve and the second sleeve; the electric conduction piece electrically connects the first plug element with the second plug element when the first plug element and the second plug element are inserted into the through holes, respectively.

43. The LED tube lamp according to claim 39, wherein a length of the electric conduction piece is equal to or longer than any of lengths of the first plug element and the second plug element.

44. The LED tube lamp according to claim 35, wherein the at least two third joining portions comprise a plurality of first butting elements and a plurality of first fixing elements; the at least two fourth joining portions comprise a plurality of second butting elements and a plurality of second fixing elements; the first joining portion comprises a plurality of first engaging elements; the second joining portion comprises a plurality of second engaging elements; the plurality of first engaging elements is configured to engage with the plurality of first butting elements; the plurality of second engaging elements is configured to engage with the plurality of second butting elements; the plurality of first fixing elements is configured to be connected with the plurality of second fixing elements; when the plurality of engaging elements is engaged with the plurality of butting elements, and the plurality of first fixing elements is connected with the plurality of second fixing elements, the first member is substantially coaxial to the second member.

* * * * *